(12) United States Patent
Petro et al.

(10) Patent No.: US 6,301,597 B1
(45) Date of Patent: Oct. 9, 2001

(54) METHOD AND APPARATUS FOR SATURATION IN AN N-NARY ADDER/SUBTRACTOR

(75) Inventors: Anthony M. Petro; James S. Blomgren, both of Austin, TX (US)

(73) Assignee: Intrinsity, Inc., Austin, TX (US)

( * ) Notice: Subject to any disclaimer, the term of this patent is extended or adjusted under 35 U.S.C. 154(b) by 0 days.

(21) Appl. No.: 09/195,024

(22) Filed: Nov. 18, 1998

Related U.S. Application Data

(60) Provisional application No. 60/065,634, filed on Nov. 8, 1997.

(51) Int. Cl.[7] .................................................... G06F 7/50
(52) U.S. Cl. ............................................ 708/552; 708/670
(58) Field of Search ................................ 708/552, 553, 708/518, 670

(56) References Cited

U.S. PATENT DOCUMENTS

| | | |
|---|---|---|
| 5,164,914 | 11/1992 | Anderson . |
| 5,299,145 * | 3/1994 | Yoshida ................................ 708/670 |
| 5,448,509 | 9/1995 | Lee et al. . |
| 5,463,571 * | 10/1995 | Kim et al. ............................ 708/670 |
| 5,463,572 * | 10/1995 | Kim et al. ............................ 708/670 |
| 5,463,573 * | 10/1995 | Yoshida ................................ 708/670 |
| 5,467,298 * | 11/1995 | Yoshida ................................ 708/670 |
| 5,847,978 * | 12/1998 | Ogura et al. ......................... 708/552 |
| 5,887,181 * | 3/1999 | Volkonsky ............................ 708/552 |

* cited by examiner

Primary Examiner—David H. Malzahn
(74) Attorney, Agent, or Firm—Booth & Wright, L.L.P.; Matthew J. Booth; Karen S. Wright

(57) ABSTRACT

An apparatus and method for performing saturating addition or subtraction on two signed or unsigned operands using N-NARY logic. The two operands may be selectably partitioned into 8-bit, 16-bit, 32-bit, or 64-bit operands. For multiple partitions, carry propagation is interrupted on partition boundaries so that partitions may be saturated independently.

28 Claims, 30 Drawing Sheets

METHOD AND APPARATUS FOR SATURATION IN AN N-NARY ADDER/SUBTRACTOR

This application claims the benefits of the earlier filed U.S. Provisional Application Ser. No. 60/065634, filed Nov. 18, 1997, which is incorporated by reference for all purposes into this application.

BACKGROUND OF THE INVENTION

1. Field of the Invention

The present invention relates to digital computing, and more particularly to an apparatus and method for saturation in an N-NARY adder/subtractor.

2. Description of the Related Art

Where wide adders exist in a design, it is desirable for some computation workloads (such as graphics processing) to selectively partition the adders such that they may perform several independent operations in parallel on a set of operands. Also useful in these workloads is the independent feature of saturating arithmetic.

U.S. Pat. No. 5,448,509, issued to Lee et al., describes a system for handling positive and negative overflow and performing saturation. However, Lee '509 suffers several shortcomings that are overcome by the present invention. First, Lee '509 is not partitionable while the present invention is partitionable. Also, Lee '509 restricts itself to several rather unusual combinations of inputs and outputs: the addition of an unsigned operand to a signed operand to produce an unsigned saturable result, and the addition of two signed operands to produce a positive-only signed result. In the latter case, the Lee '509 invention deprives the result of half its possible range. This is because Lee '509 saturates underflow at zero, rather than the largest negative number, $-2^{(N-1)}$. While Lee '509 saturates overflow at $2^{(N-1)}-1$, the usual value for signed overflow, the zero saturation for underflow deprives the result of half of its possible range. In contrast, the present invention provides a saturating capability that takes signed inputs to produce a full range signed output or takes unsigned inputs and produces an unsigned output. Finally, Lee '509 examines the final result of the arithmetic operation to determine overflow or underflow. In contrast, the present invention discloses a more efficient method of determining overflow and underflow through the use of carry-lookahead logic to detect overflow/underflow before the result is computed.

The present invention also discloses a more desirable approach than that described in U.S. Pat. No. 5,164,914, issued to Daryl E. Anderson. Anderson '914 describes an approach for a saturating adder in which the carry into the most significant result bit is used to detect overflow. Because Anderson '914 does not disclose a partitionable adder, and because Anderson '914 restricts itself to signed saturation, it has limited usefulness.

The invention described herein combine a selectable arithmetic operation (addition, subtraction) and selectable saturating modes (signed, unsigned) with selectable partitioning (8-bit, 16-bit, 32-bit). The present invention also provides selectable add/subtract capability for a 64-bit partition, but does not support saturation for 64-bit partitioning. The present invention is implemented in the dynamic N-NARY logic design style, to create a versatile high-performance adder/subtractor. The present invention overcomes the deficiencies of the prior art in that it combines signed and unsigned saturating arithmetic with partitionability, which allows the adder/subtractor to perform a larger number of narrow additions or a smaller number of wider additions.

SUMMARY OF THE INVENTION

The present invention provides an apparatus and method for performing saturating arithmetic on two unsigned operands using N-NARY logic. In an alternative embodiment, signed saturation may be selectably performed. In such case, saturation may be deselected, but if saturation is selected then it will be performed for either signed or unsigned addition or subtraction. The two operands may be selectably partitioned into 8-bit, 16-bit, 32-bit, or 64-bit operands. For multiple partitions, carry propagation is interrupted on partition boundaries so that partitions may be saturated independently.

For unsigned arithmetic, the arithmetic result of the operation on the two operands is forced to an overflow saturation constant if an overflow occurs and an underflow saturation constant if an underflow occurs. For signed arithmetic, the arithmetic result of the operation on the two operands is forced to the same overflow saturation constant discussed above for all but the most significant N-NARY grouping of bits within a partition. For the most significant N-NARY grouping of bits within a partition, the arithmetic result is forced to an overflow saturation constant that reflects the proper value of the sign bit. Similarly, signed underflow involves either the underflow saturation constant discussed above or a constant that reflects the proper value of the sign bit for the most significant N-NARY grouping within a partition.

The apparatus will perform saturation for either addition or subtraction operations, for either signed or unsigned operands that may be divided into one or more partitions. Each selectable feature described herein may be implemented singly, or in combination with other selectable features.

DETAILED DESCRIPTION OF THE INVENTION

Figure 1:
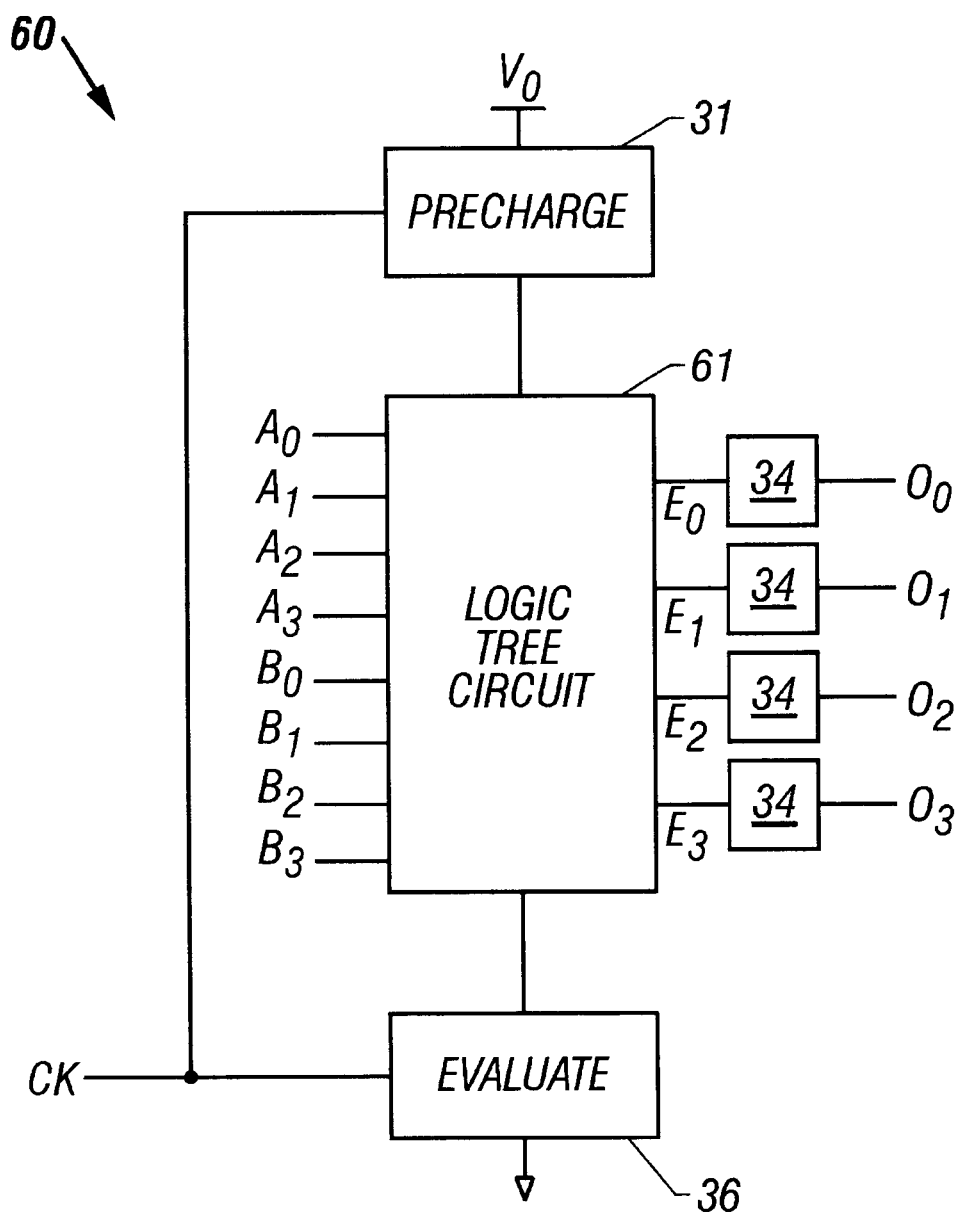
FIG. 1 is a block diagram of an N-NARY gate.

The present invention relates to a dynamic partitionable saturating adder/subtractor. This disclosure describes numerous specific details that include specific formats, structures, circuits, and logic functions in order to provide a thorough understanding of the present invention. One skilled in the art will appreciate that one may practice the present invention without these specific details. Additionally, this disclosure does not describe in detail the N-NARY design style nor some well-known structures, such as P-FETs and N-FETs, in order not to obscure the present invention.

Partitioning

For certain workloads, such as but not limited to graphics processing, certain data elements to be processed may be represented in a number of bits smaller than the maximum width of the operational unit. One example of such a case is 24-bit graphics processing, where each pixel data element is represented by one independent 8-bit quantity for each of the three colors green, red, and blue. A processor may include a wider adder/subtractor (32-bit or 64-bit) to handle larger operands, but this additional capacity is of no use when operating on a single pair of 8-bit operands. Performance on these workloads could be improved by allowing the wide adder/subtractor to perform a larger number of narrower operations, when needed. An adder/subtractor thus partitioned could perform several operations in parallel, increasing adder throughput over the case where each narrow addition or subtraction is performed serially. The present invention supplies a dynamically selectable partitioning capability that allows partitions of 64, 32, 16, or 8 bits. The preferred embodiment of the present invention therefore allows one or more partitioned arithmetic operations to occur in parallel. Although the preferred embodiment performs the same operation for all partitions, a select feature could easily be added to selectably allow either addition or subtraction to occur for a particular partition, such that addition and subtraction could be performed by different partitions of the adder, in parallel, during the same instruction cycle.

Saturating Arithmetic

In addition to utilizing partitioning concepts, workloads such as graphics processing often make use of saturating arithmetic, whereby arithmetic results that are too large (overflow) or too small (underflow) to be represented in the number of available bits are forced to a maximum or minimum value, respectively. This saturation capability is in contrast to the traditional approach, which is to "wrap around" the over- or underflow value such that only the low-order bits of the result are actually represented. For example in graphics processing, colors on a continuum ranging from black to white can be represented by decreasing values where the maximum value represents white and the minimum value represents black. In such cases, saturating arithmetic ensures that results larger than the maximum value will be represented as white and that results smaller than the minimum value will be represented as black. In contrast, traditional arithmetic would "wrap around" and cause unwanted transitions from white to black (overflow) and black to white (underflow).

The specific preferred embodiment of the present invention is a 64-bit adder/subtractor that may be partitioned into one 64-bit operation, two 32-bit operations, four 16-bit operations, or eight 8-bit operations. Saturation is available to 32-bit, 16-bit, and 8-bit operations, but not 64-bit operations. Saturated outputs along with the saturation mode, explained below, are selectable independently of the partition size.

Saturation Modes

Different saturation modes yield slightly different results in saturation. N-bit operations on unsigned 2's complement numbers saturate to an overflow value of $2^N-1$, which is the maximum unsigned value. Such operations saturate to an underflow value of 0, the minimum unsigned value. N-bit operations on signed 2's complement numbers yield different saturation results. N-bit operations on signed 2's complement numbers saturate to an overflow value of $2^{(N-1)}-1$, the maximum positive value. Such operations saturate to an underflow value of $-2^{(N-1)}$, the maximum negative value.

Since workloads such as graphics processing often make use of partitionable data and saturating arithmetic, a fast adder/subtractor combining both of these features (including support for the various saturation modes described above) increases processing performance. The performance of such an adder may be improved by implementing it in dynamic 1-of-4 logic.

Traditional Binary Addition

In most computer systems, addition and subtraction of numbers is supported. In systems using traditional binary logic, the truth table for one-bit addition is set forth in Table 1.

TABLE 1

| A | B | A + B |
|---|---|-------|
| 0 | 0 | 0 |
| 0 | 1 | 1 |
| 1 | 0 | 1 |
| 1 | 1 | 0* |

In the last row of Table 1, a carry condition occurs. That is, the result is 0, but a carry into the next-higher-order bit position, corresponding to a decimal value of 2, has conceptually occurred.

In addition to single bits, the addition operation may be performed on multiple bits, including addition of two two-bit values. The truth table for such an operation is set forth in Table 2, where the first operand A is a two-bit value comprising bits $A_0$ and $A_1$. The second operand, B, is a two-bit value comprising bits $B_0$ and $B_1$.

TABLE 2

| $A_1$ | $A_0$ | $B_1$ | $B_0$ | A = Decimal Value | B = Decimal Value | A + B | A + B = Dec. Value |
|---|---|---|---|---|---|---|---|
| 0 | 0 | 0 | 0 | 0 | 0 | 00 | 0 |
| 0 | 0 | 0 | 1 | 0 | 1 | 01 | 1 |
| 0 | 0 | 1 | 0 | 0 | 2 | 10 | 2 |
| 0 | 0 | 1 | 1 | 0 | 3 | 11 | 3 |
| 0 | 1 | 0 | 0 | 1 | 0 | 01 | 1 |
| 0 | 1 | 0 | 1 | 1 | 1 | 10 | 2 |
| 0 | 1 | 1 | 0 | 1 | 2 | 11 | 3 |
| 0 | 1 | 1 | 1 | 1 | 3 | 00* | 0 |
| 1 | 0 | 0 | 0 | 2 | 0 | 10 | 2 |
| 1 | 0 | 0 | 1 | 2 | 1 | 11 | 3 |
| 1 | 0 | 1 | 0 | 2 | 2 | 00* | 0 |
| 1 | 0 | 1 | 1 | 2 | 3 | 01* | 1 |
| 1 | 1 | 0 | 0 | 3 | 0 | 11 | 3 |
| 1 | 1 | 0 | 1 | 3 | 1 | 00* | 0 |
| 1 | 1 | 1 | 0 | 3 | 2 | 01* | 1 |
| 1 | 1 | 1 | 1 | 3 | 3 | 10* | 2 |

Each output value in the "A+B" column of Table 2 indicated with an asterisk denotes a carry condition where a logical one has conceptually carried into the next-higher-order bit (the bit position corresponding to a decimal value of four).

N-NARY Logic

The N-NARY logic family supports a variety of signal encodings, including 1-of-4. The N-NARY logic family is described in a copending patent application, U.S. patent application Ser. No. 09/019,355, filed Feb. 5, 1998, now U.S. Pat. No. 6,066,965, and titled "Method and Apparatus for a N-NARY logic Circuit Using 1-of-4 Signals", which is incorporated herein for all purposes and is hereinafter referred to as "The N-NARY Patent." In 1-of-4 encoding, four wires are used to indicate one of four possible values. In contrast, traditional static logic design uses two wires to indicate four values, as is demonstrated in Table 2. In Table 2, the $A_0$ and $A_1$ wires are used to indicate the four possible values for operand A: 00, 01, 10, and 11. The two B wires are similarly used to indicate the same four possible values for operand B. "Traditional" dual-rail dynamic logic also uses four wires to represent two bits, but the dual-rail scheme always requires two wires to be asserted. In contrast, N-nary logic only requires assertion of one wire. The benefits of N-NARY logic over dual-rail dynamic logic, such as reduced power and reduced noise, should be apparent from a reading of The N-NARY Patent.

All signals in N-NARY logic, including 1-of-4, are of the 1-of-N form where N is any integer greater than one. A 1-of-4 signal requires four wires to encode four values (0–3 inclusive), or the equivalent of two bits of information. More than one wire will never be asserted for a 1-of-N signal. Similarly, N-NARY logic requires that a high voltage be asserted for all values, even 0.

Any one N-NARY gate may comprise multiple inputs and/or outputs. In such a case, a variety of different N-NARY encodings may be employed. For instance, consider a gate that comprises two inputs and two outputs, where the inputs are a 1-of-4 signal and a 1-of-2 signal and the outputs comprise a 1-of-4 signal and a 1-of-3 signal. Various variables, including P, Q, R, and S, may be used to describe the encoding for these inputs and outputs. One may say that one input comprises 1-of-P encoding and the other comprises 1-of-Q encoding, wherein P equals two and Q equals four. Similarly, the variables R and S may be used to describe the outputs. One might say that one output comprises 1-of-R encoding and the other output comprises 1-of-S encoding, wherein R equals four and S equals 3. Through the use of these, and other, additional variables, it is possible to describe multiple N-NARY signals that comprise a variety of different encodings.

N-NARY Logic Circuits

N-NARY logic may be used to create circuits to perform a desired function. The present invention utilizes N-NARY logic in the preferred embodiment of a 4-level 64-bit dynamic partitionable saturating adder/subtractor. A background discussion of N-NARY circuits is in order before discussing the adder/subtractor of the present invention.

FIG. 1 illustrates an N-NARY logic gate 60 that uses two sets of 1-of-N signals for the inputs and produces one 1-of-N signal for the output. In gate 60, the A and B inputs comprise four wires each, with each set of wires representing 2 bits (one dit) of data. A is a one-dit input, B is a one-dit input, and O is a one-dit output. In other words, the gate 60 depicted in FIG. 1 comprises 4 input bits (2 dits) and 2 output bits (one dit).

Figure 2:
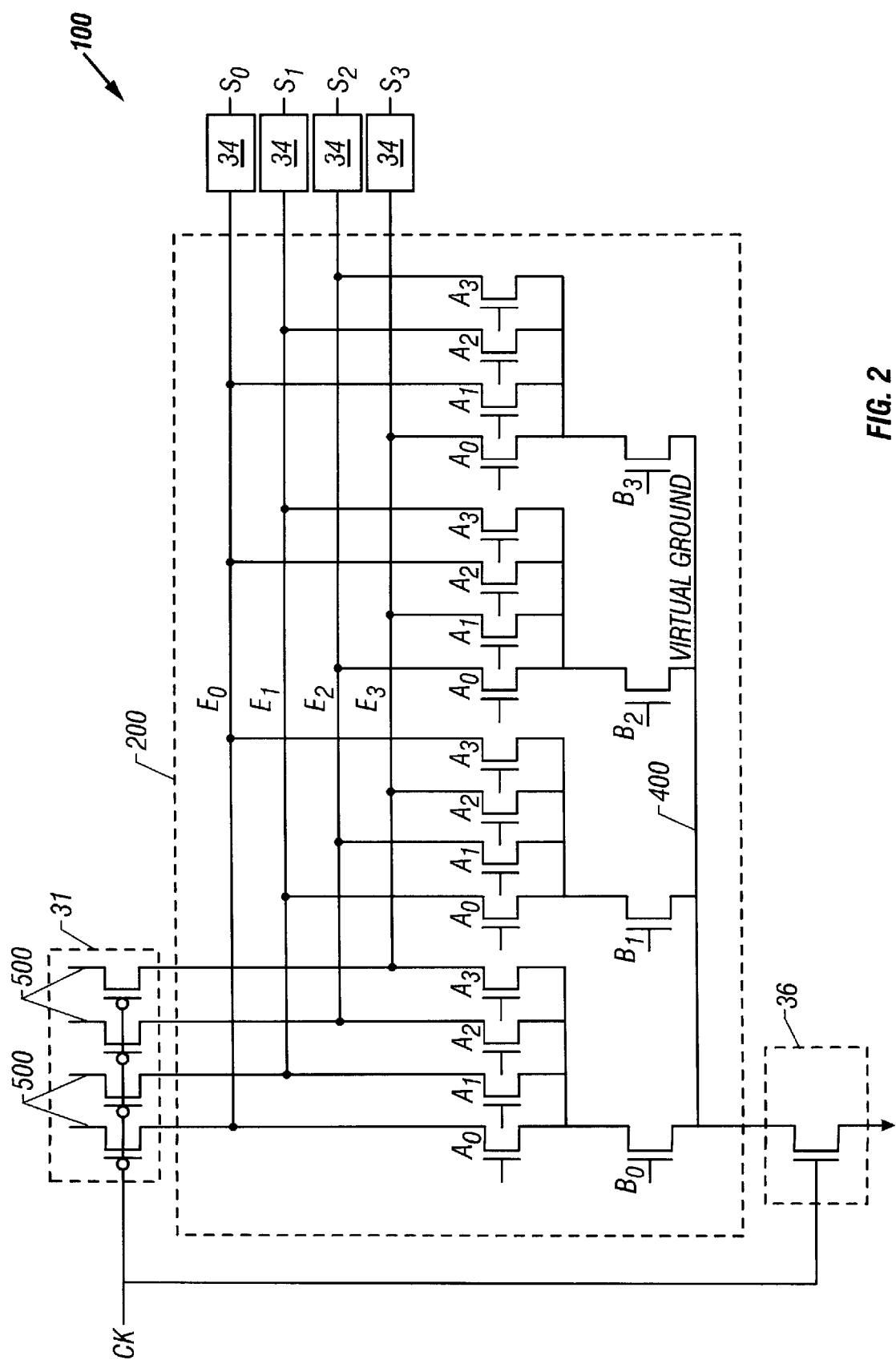
FIG. 2 is an illustration of an N-NARY adder gate.

Referring to FIG. 1, each N-NARY dit logic circuit 60 comprises a logic tree circuit 61, a precharge circuit 31, and an evaluate circuit 36. The logic tree circuit 61 performs a logic function on the two 1-of-4 input signals that could comprise a variety of functions, for example, the Boolean logic functions AND/NAND and OR/NOR, or the more complex add/subtract/carry-propagate function of the present invention. The logic gates of the N-NARY family are clocked pre-charge (CP) gates. FIG. 2 illustrates that each input into the logic tree circuit 61 $A_0$–$A_3$, $B_0$–$B_3$ is coupled to at least one N-channel field effect transistor (NFET) $A_0$–$A_3$, $B_0$–$B_3$. Referring back to FIG. 1, the logic tree circuit 61 therefore comprises one or more N-channel FETS. Coupled to the wires of the 1-of-4 output signal are the output buffers 34 that aid in driving additional circuits that couple to the output signal. The preferred embodiment of the present invention uses a circuit with an inverting function as the output buffer 34.

Referring again to FIG. 1, a precharge circuit 31 couples to the logic tree circuit 61 and precharges the dynamic logic of the logic tree circuit 61. The precharge circuit 31 comprises one or more FETs with the preferred embodiment of the circuit comprising P-channel FETs (PFETs). Each evaluation path of the logic tree circuit 61 has its own precharge PFET, shown as 500 in FIG. 2. The PFETs 500 of the precharge circuit 31 quickly and fully precharge all of the dynamic logic in the logic tree circuit 61 during the precharge phase of the clock cycle.

FIG. 2 is a diagram of an N-NARY adder gate. FIG. 2 illustrates that the precharge PFET 500 for an evaluation node E of an N-NARY circuit is connected to positive high voltage, Vcc, and is used to create conductive paths between the evaluation node E and Vcc. Each precharge PFET 500 is coupled to an input, the pre-charge signal. When the pre-charge signal for any evaluate node has a low voltage, then there is a conductive path between Vcc and the evaluation node E. Coupled to the precharge circuit 31 is the clock signal CK. A low clock signal on CK will cause the FETs in the logic tree circuit 32 to charge when using P-channel FETs in the precharge circuit 31.

An evaluate circuit 36 couples to the logic tree circuit 61 and controls the evaluation of the logic tree circuit 61. The evaluate circuit 36 comprises one or more FETs connected to the CK signal, with the preferred embodiment of the evaluate circuit comprising a single N-channel FET. The single N-FET acts as an evaluation transistor that is used to control when the gate is sensitive to inputs, helps avoid races between other devices, and prevents excessive power consumption. During the precharge phase, the evaluate circuit 36 receives a low value so that no path to Vss may exist through the NFET(s) of the logic tree circuit 61. During the evaluate phase, the evaluate circuit 36 receives a high signal so that a path to Vss through the NFET(s) of the logic tree circuit 61 may exist. Coupled to the evaluate circuit 36 is the clock signal CK. A high clock signal on CK will cause the FETs in the logic tree circuit 61 to evaluate when using N-channel FETs in the evaluate circuit 36. In other words, when the clock signal is high, the evaluate circuit 36 evaluates the logic tree circuit 61.

Figure 3:
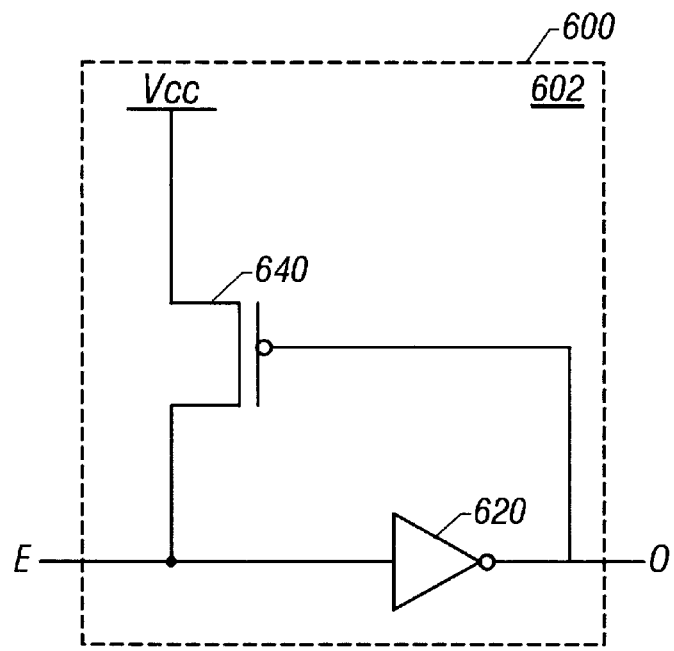
FIG. 3 is a diagram of a first embodiment of an N-NARY output driver circuit.
Figure 4:
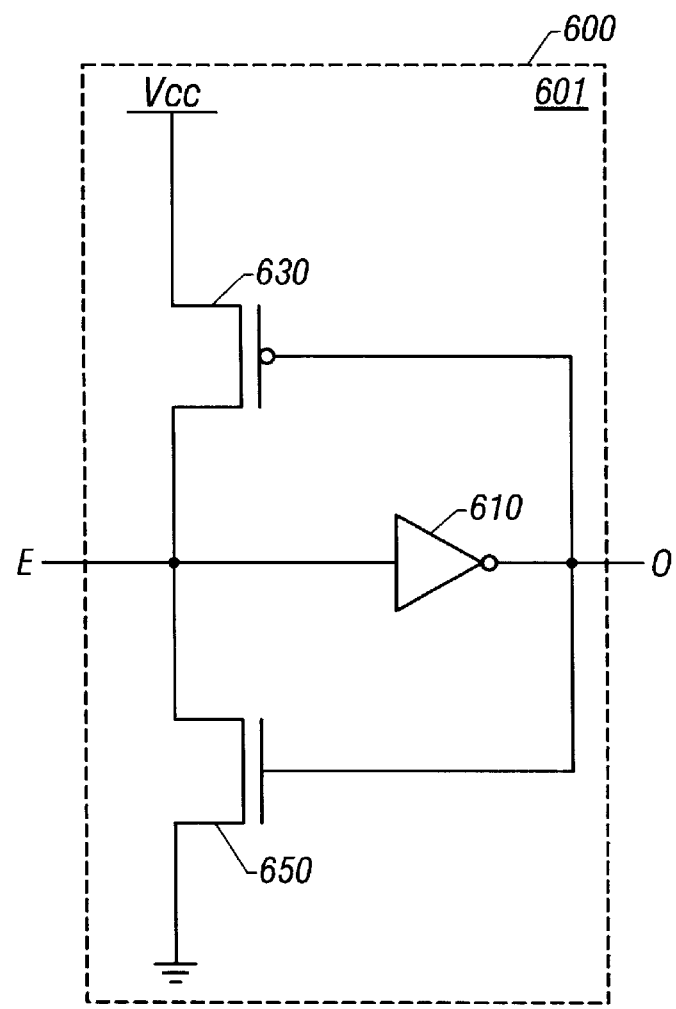
FIG. 4 is a diagram of a second embodiment of an N-NARY output driver circuit.

An evaluate node, E, which comprises the four wires $E_0$, $E_1$, $E_2$, and $E_3$, is the signal pathway between the logic tree circuit 61 and an output buffer 34, and constitutes an evaluation path of the logic tree circuit 61. As stated earlier, each evaluation node wire $E_0$, $E_1$, $E_2$, and $E_3$ has its own precharge PFET. The signal on a particular wire, $E_0$, $E_1$, $E_2$, $E_3$ of the evaluate node E is high only when there is no connection to Vss through the logic tree circuit 61 NFET(s) associated with that particular wire. If the pre-charge signal is low at time 0 and there is no path to ground through the NFET(s) associated with an evaluate node E of the logic tree circuit 61, then the evaluate node wire E gets pulled to a high voltage. This is called the precharge phase of the gate and we may also say that the gate is in precharge mode. If the precharge signal switches to a high voltage at a later time, the evaluate node E will be floating but the charge left on it will leave the voltage high. This is called the evaluate phase of the gate, and we may also say that the gate is in evaluate mode. If input signals generate a high voltage for any NFET(s) in the logic tree circuit 61 such that a path from the evaluate node E to ground (Vss) exists, then the charge on the evaluate node E will drain to ground, and the evaluate voltage will drop to Vss. If no such path exists, then the evaluate node E will remain at Vcc. When any gate, therefore, switches from precharge mode to evaluate mode, the evaluate node voltage is high, and it either stays high or goes low. Once the evaluate node voltage goes low during the evaluate phase, it cannot be driven high again until the next precharge phase. Each evaluate node wire $E_0$, $E_1$, $E_2$, and $E_3$ couples to an output buffer 34. Two embodiments of the output driver circuit 600 comprising the output buffer 34 are illustrated in FIGS. 3 and 4. FIG. 3 illustrates a half keeper output driver circuit 602 that comprises an inverter 620 and a PFET device 640. FIG. 4 illustrates a full keeper output driver circuit 601 that comprises an inverter 610 coupled to a PFET device 630 and an NFET device 650. Full keeper circuits 601 are necessary for gates that can be in neither evaluate nor precharge mode for lengthy periods. The flow through the output driver circuit 600 is from evaluate node E to the output signal path O. The inverter 610, 620 of the output driver circuit 600 is necessary because the evaluate nodes of CP gates of the N-NARY logic family precharge to a high value and evaluate to a low value. The output driver circuit 600 of the output buffer 34 holds the value of an evaluate node E during an evaluate phase if the evaluate node E has not discharged. If the evaluate node E has discharged, then there is a path to ground holding its value low. The output of each evaluate node E will switch from low to high once, at most, during an evaluate phase. The output of each evaluate node E, once coupled to an output driver circuit 600 of an output buffer 34, is therefore suitable for feeding a subsequent CP gate.

Figure 5:
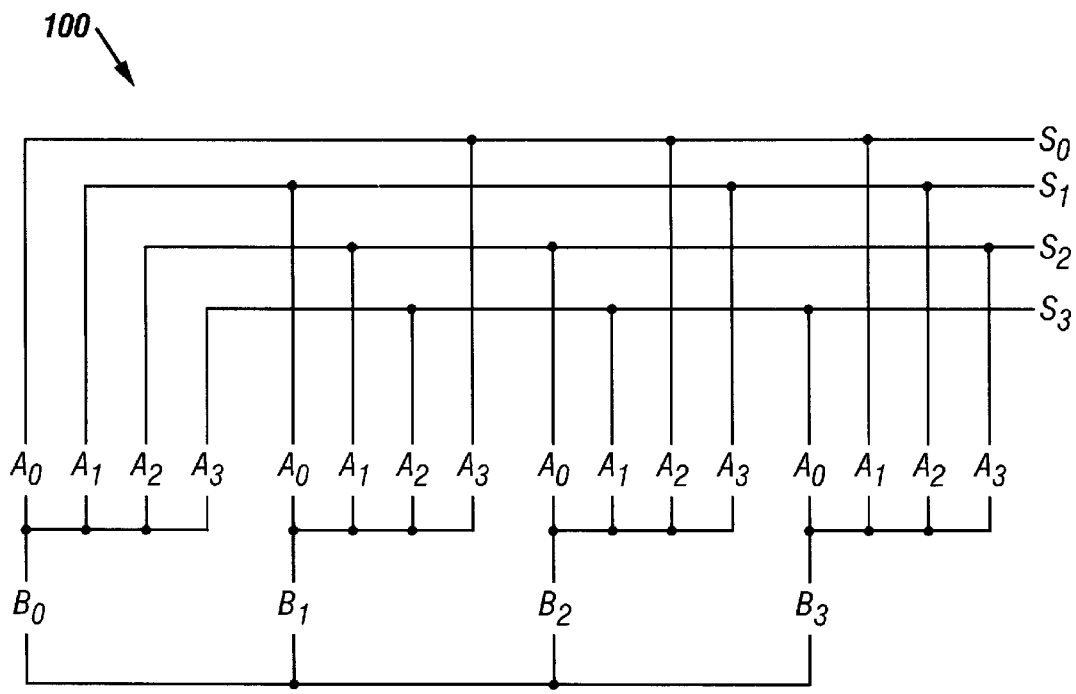
FIG. 5 is a shorthand representation of an N-NARY adder gate having two 1-of-4 inputs.

A shorthand notation for N-NARY circuit diagrams can be adopted to avoid needless repetition of elements common to all N-NARY circuits. FIG. 2 illustrates these common elements. One common element is the precharge P-FET 500. Precharge P-FETs 500 are required for each evaluate node E in every 1-of-N gate. Since all N-NARY gates require a pre-charge P-FET 500 for each evaluate node E, the precharge P-FETs 500 may be implied and need not be shown. The same is true for the N-FET associated with each input wire of the A and B inputs. Similarly, each evaluate node E must have its own output buffer 34, which may be implied. The N-FET associated with the evaluate node 36 may also be implied. Since these features are common to all N-NARY circuits, we may use the shorthand shown in FIG. 5 to represent the N-NARY circuits. Accordingly, FIG. 5 illustrates a shorthand notation of the adder gate depicted in FIG. 2. This shorthand notation is used in FIGS. 5, 5A, 7, 7A, 8A, 9–13, and 15–29, including 16A. FIG. 8 uses a modified shorthand representation in which N-FETS associated with certain inputs are expressly represented, but all other elements discussed herein are implied. In each figure, the elements discussed herein should be implied accordingly.

Figure 6:
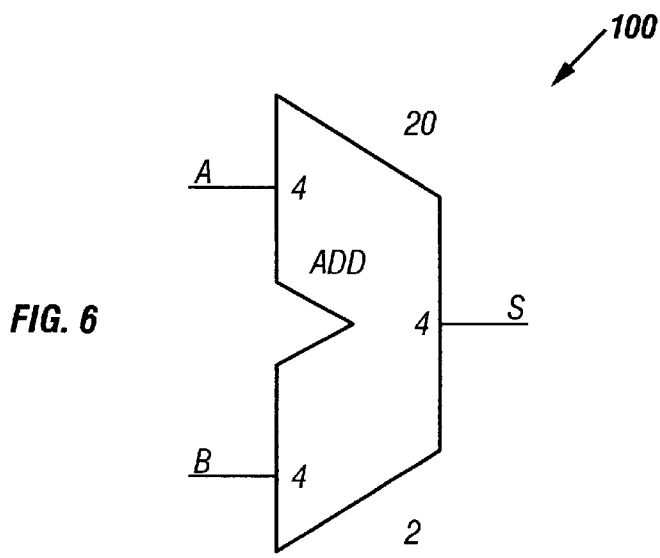
FIG. 6 is a high-level shorthand representation of an N-NARY adder gate.

A further simplification to the representation of the FIG. 2 adder is shown in FIG. 6, where the inputs and outputs are shown as single signals that each can represent one of four signals and each implicitly comprises four wires. The number "4" shown within the add gate of FIG. 6, adjacent to the connections, indicates that each signal can represent one of four values. The number above the gate indicates the number of transistors in the evaluate stack, and the number below the FIG. 6 gate represents the maximum number of transistors in series between the evaluate node and virtual ground. This high level shorthand notation is also used in FIGS. 14–17. In those figures, the elements discussed herein should be implied accordingly.

Overview of Preferred Embodiment

The partitionable saturating adder/subtractor of the present invention can perform saturating arithmetic using either signed or unsigned 2's complement operands. The operands may comprise any positive number of bits and the operand bits may be conceptually grouped into any positive number of "blocks." The preceding two sentences are qualified by the requirement that XY MOD the N-NARY base must equal zero.

The specific preferred embodiment disclosed herein is a 64-bit adder/subtractor that may be partitioned into one 64-bit operation, two 32-bit operations, four 16-bit operations, or eight 8-bit operations. Saturation is available in the present invention to 32-bit, 16-bit, and 8-bit arithmetic. Whether or not to perform saturation, along with the saturation mode (i.e., signed or unsigned) are selectable independently from the partition size.

In order to partition the adder, it is necessary to interrupt the carry chain between the dits of adjacent partitioned operands such that carries generated in one section of the adder do not affect sum generation in adjacent partition sections. Forcing the HPG signal, discussed below, for the most significant dit of each section to halt (H) prevents carry propagation from proceeding across partition boundaries. To facilitate partitioning, carry propagate block size must be chosen carefully with the partition boundaries in mind. Special considerations must also be taken into account to perform partitioned subtraction; these will be described in the detailed discussion below.

FIG. 14 illustrates the general structure of the adder/subtractor 101 of the present invention (sometimes referred to hereinafter simply as "adder"). In FIG.14, input operands and the result(s) are represented in 1-of-4 encoding such that each input and output signal represents two logical bits of information. All intermediate signals used in the adder 101 are 1-of-N encoded. The level of granularity for the input operands shown in FIG. 14 is the 1-of-4 input level or "dit" level, where one dit comprises one 1-of-4 signal, which represents two bits of information. The adder 101 was constructed in four levels of logic in the preferred embodiment, referred to in FIG. 14 as "Level One," "Level Two," "Level Three," and "Level Four," respectively.

The broad function performed by each of the four levels of logic shown in FIG. 14 is as follows. Level One performs intermediate sum formation and ditwise halt-propagate-generate (HPG) signal formation. Level Two performs block HPG signal formation, partition detection, and preliminary saturation detection. Level Three performs block HPG signal combination logic and resolves contingent underflow and overflow situations. Finally, Level Four forms the final sum from the 1-of-4 intermediate sum, the 1-of-3 HPG signal, and the 1-of-3 saturation indicator. The function of each level of logic is discussed in further detail below.

In contrast to evaluating the function of each level, one may also view the adder in terms of its overall function. Some functions may occur in more than one level. One broad function of the adder is the arithmetic function. The initial stage of such function occurs in Level One, where intermediate sums or differences, depending on the value of the operation selector, are generated. These intermediate results do not take carry propagation into account. The final stage of the arithmetic logic, herein called "sum logic," occurs in Level Four. In Level Four, a final arithmetic result is generated. If not preempted by saturation logic, discussed below, the final arithmetic result modifies the intermediate result, generated by Level One, to take into account the HPG carry-propagation signals generated by the combined operation of Levels One, Two, and Three.

As stated, carry propagate logic, called "HPG logic" herein, occurs in Levels One, Two, and Three. One-dit HPG signals are generated in Level One. These signals are combined with the other signals within a block to generate block-level HPG signals at Level Two. Level Two also generates a dit-level HPG signal representing the HPG signal for all dits within a block that are less significant than the dit of interest. Level Three uses the block-level HPG signals for all blocks less significant than the block in which a dit of interest lies, along with the dit-level HPG signal for the dit of interest, in order to generate a final HPG signal for each dit.

Saturation logic determines whether overflow or underflow will occur. If so, the saturation logic generates the value of the final arithmetic result. Saturation logic forces the value of the final arithmetic result to the pertinent constant value, regardless of the value of the intermediate sum. The saturation logic of the present invention utilizes logic gates from all four levels of logic.

Another function performed by the present invention is partition detection logic, which is closely tied to both the HPG and the saturation logic functions. If partitioning is selected, then determination of overflow and underflow by the saturation logic must only take HPG signals into account for a particular partition. To do so, the saturation logic relies on partition detection logic. Partition detection logic works in conjunction with the HPG logic to force the block-level HPG signal for the most significant dit within a partition to a value of Halt. Partition detection logic occurs in Level Two, where the block-level HPG signals are generated.

Level One Logic—Overview

Level One generates an intermediate sum (or difference, in the case of subtraction) from one dit of operand A and one dit of operand B. The gates 900, 910, 920, 930, 940 that generate this sum are discussed in greater detail below. The intermediate sum produced by Level One does not account for carry (or borrow) conditions, as this will be added in the final level of logic. Instead, a (H)alt, P(ropagate), and (G)enerate status is derived for each dit position. The meaning of this HPG status is discussed in greater detail below in the discussion of carry-propagate logic.

Level One N-NARY Addition Logic

Level One of the present invention implements both addition and subtraction using N-NARY logic. Our discussion of Level One logic will begin with the addition function. A truth table demonstrating the add operation using 1-of-4 encoding is set forth in Table 3. Each of the two-bit 1-of-4 inputs, A and B, in Table 3 can represent one of four values, 0 through 3 inclusive, depending on which of the four wires for each signal is set high. Table 3 discards any potential input value that includes more than one wire asserted for each 1-of-4 signal, such as 1111 and 0101. Such values are undefined for the evaluate stage of 1-of-4 logic gates. The four wires for the two-bit sum of the 1-of-4 addition operation in Table 3 are labeled $S_3$, $S_2$, $S_1$, and $S_0$.

TABLE 3

| $A_3$ | $A_2$ | $A_1$ | $A_0$ | A Dec. Value | $B_3$ | $B_2$ | $B_1$ | $B_0$ | B Dec. Value | $S_3$ | $S_2$ | $S_1$ | $S_0$ | Output Decimal Value |
|---|---|---|---|---|---|---|---|---|---|---|---|---|---|---|
| 0 | 0 | 0 | 1 | 0 | 0 | 0 | 0 | 1 | 0 | 0 | 0 | 0 | 1 | 0 |
| 0 | 0 | 0 | 1 | 0 | 0 | 0 | 1 | 0 | 1 | 0 | 0 | 1 | 0 | 1 |
| 0 | 0 | 0 | 1 | 0 | 0 | 1 | 0 | 0 | 2 | 0 | 1 | 0 | 0 | 2 |
| 0 | 0 | 0 | 1 | 0 | 1 | 0 | 0 | 0 | 3 | 1 | 0 | 0 | 0 | 3 |
| 0 | 0 | 1 | 0 | 1 | 0 | 0 | 0 | 1 | 0 | 0 | 0 | 1 | 0 | 1 |
| 0 | 0 | 1 | 0 | 1 | 0 | 0 | 1 | 0 | 1 | 0 | 1 | 0 | 0 | 2 |
| 0 | 0 | 1 | 0 | 1 | 0 | 1 | 0 | 0 | 2 | 1 | 0 | 0 | 0 | 3 |
| 0 | 0 | 1 | 0 | 1 | 1 | 0 | 0 | 0 | 3 | 0 | 0 | 0 | 1 | 0* |
| 0 | 1 | 0 | 0 | 2 | 0 | 0 | 0 | 1 | 0 | 0 | 1 | 0 | 0 | 2 |
| 0 | 1 | 0 | 0 | 2 | 0 | 0 | 1 | 0 | 1 | 1 | 0 | 0 | 0 | 3 |
| 0 | 1 | 0 | 0 | 2 | 0 | 1 | 0 | 0 | 2 | 0 | 0 | 0 | 1 | 0* |
| 0 | 1 | 0 | 0 | 2 | 1 | 0 | 0 | 0 | 3 | 0 | 0 | 1 | 0 | 1* |
| 1 | 0 | 0 | 0 | 3 | 0 | 0 | 0 | 1 | 0 | 1 | 0 | 0 | 0 | 3 |
| 1 | 0 | 0 | 0 | 3 | 0 | 0 | 1 | 0 | 1 | 0 | 0 | 0 | 1 | 0* |
| 1 | 0 | 0 | 0 | 3 | 0 | 1 | 0 | 0 | 2 | 0 | 0 | 1 | 0 | 1* |
| 1 | 0 | 0 | 0 | 3 | 1 | 0 | 0 | 0 | 3 | 0 | 1 | 0 | 0 | 2* |

In Table 3, output values with asterisks indicate that a carry is conceptually generated into a higher-order bit representing a decimal value of 4.

Illustration: Basic N-NARY Adder Gate

Figure 5A:
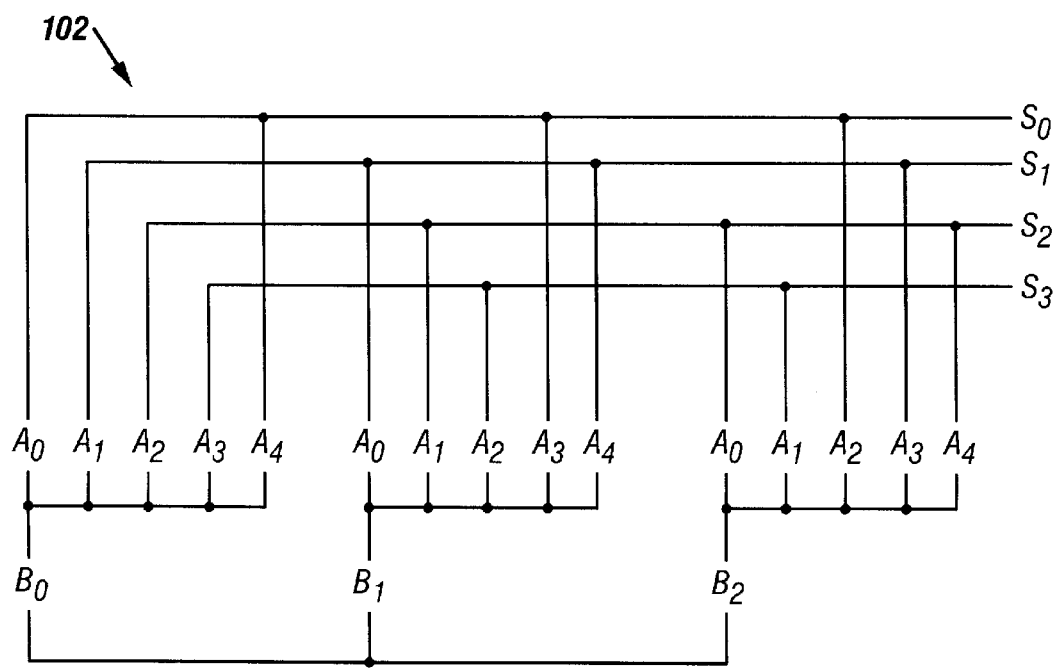
FIG. 5A is a shorthand representation of an N-NARY adder gate having one 1-of-3 input and one 1-of-5 input.

FIG. 5 illustrates an N-NARY adder circuit 100 that uses 1-of-4 logic to perform the addition function on two two-bit 1-of-4 inputs to generate a two-bit 1-of-4 output signal conforming to Table 3. A similar function may be performed with a gate 102 that takes one 1-of-3 input and one 1-of-5 input. Such a gate 102 is illustrated in FIG. 5A. The function of the adder circuit 100 illustrated in FIG. 5 is to add two 1-of-4 inputs and produce the least significant two bits of the sum, which is also implemented as a 1-of-4 signal. Since the adder circuit 100 operates on two four-value signals it is not appropriate to refer to it as binary. The function of the adder gate 100 is quaternary, rather than binary.

The adder circuit 100 illustrated in FIG. 5 has an A input signal comprising four wires, $A_0$, $A_1$, $A_2$, and $A_3$, and a B input signal comprising four wires, $B_0$, $B_1$, $B_2$, and $B_3$. The A input signal and the B input signal can each represent any integer having a decimal value between zero and three, inclusive. Since N-NARY logic requires that only one of the four wires representing the A input be asserted at any one time, and only one of the B input wires be asserted at one time, it is convenient to treat the A and B signals as individual inputs that each can represent one of four values. The adder circuit 100 therefore has eight inputs: $A_0$, $A_1$, $A_2$, $A_3$, $B_0$, $B_1$, $B_2$, and $B_3$. If the value of A is zero, then the $A_0$ wire is set high and all other A wires, $A_1$, $A_2$, $A_3$, are set low. By the same token, the $B_0$ wire corresponds to zero. Similarly, the $A_1$ wire and $B_1$ wire correspond to the decimal value of one. The $A_2$ wire and $B_2$ wire correspond to the decimal value of two. Finally, the $A_3$ wire and $B_3$ wire correspond to the decimal value of three. The adder circuit 100 illustrated in FIG. 5 performs the following logic functions:

$S_0 = B_0 A_0 | B_1 A_3 | B_2 A_2 | B_3 A_1$ (all cases that equal 0 or 4),
$S_1 = B_0 A_1 | B_1 A_0 | B_2 A_3 | B_3 A_2$ (all cases that equal 1 or 5),
$S_2 = B_0 A_2 | B_1 A_1 | B_2 A_0 | B_3 A_3$ (all cases that equal 2 or 6), and
$S_3 = B_0 A_3 | B_1 A_2 | B_2 A_1 | B_3 A_0$ (all cases that equal 3).

Level One Carry Propagate Logic

The adder gate in FIG. 5 is not complete for the purposes of the present invention because it does not provide any information as to whether the sum is too large to represent in two bits of information. In other words, the FIG. 5 adder does not support the carry conditions denoted by asterisks in Table 3. For the addition function of the present invention, what is required is an adder gate that can not only sum two one-dit numbers, but can utilize carry-propagate techniques to account for carry conditions. This is accomplished through the use of carry propagate logic, as described below.

Carry propagate logic takes carry conditions into account. For any two binary numbers A and B, the sum, $S_n$, and the carry, $C_n$, for a given bit position, n, are:

$$S_n = A_n \oplus B_n \oplus C_{n-1}, \quad (1)$$

where $C_{n-1}$ is the carry in from the previous bit, n−1.

$$C_n = A_n B_n | A_n C_{n-1} | B_n C_{n-1}, \quad (2)$$

where $C_n$ is the carry out from bit n

The binary truth tables for Equation 1 and Equation 2 are set forth in Table 4.

TABLE 4

| $A_n$ | $B_n$ | $C_{n-1}$ | $A_n B_n$ (1) | $A_n C_{n-1}$ (2) | $B_n C_{n-1}$ (3) | $A_n \oplus B_n$ (4) | $S_n = (4) \oplus C_{n-1}$ | $C_n = (1)|(2)|(3)$ |
|---|---|---|---|---|---|---|---|---|
| 0 | 0 | 0 | 0 | 0 | 0 | 0 | 0 | 0 |
| 0 | 0 | 1 | 0 | 0 | 0 | 0 | 1 | 0 |
| 0 | 1 | 0 | 0 | 0 | 0 | 1 | 1 | 0 |
| 0 | 1 | 1 | 0 | 0 | 1 | 1 | 0 | 1 |
| 1 | 0 | 0 | 0 | 0 | 0 | 1 | 1 | 0 |
| 1 | 0 | 1 | 0 | 1 | 0 | 1 | 0 | 1 |
| 1 | 1 | 0 | 1 | 0 | 0 | 0 | 0 | 1 |
| 1 | 1 | 1 | 1 | 1 | 1 | 0 | 1 | 1 |

In formulating carry propagate logic, one must recognize that the critical path in any adder is along the carry chain. The most significant bit of the sum depends not only on the two most significant addend bits, but also the addend bits of every other bit position via the carry chain. Simply allowing carries to ripple from the least significant end would result in a compact but very slow adder, since the worst-case carry propagation delay would be approximately as many gate delays as the bit width of the adder.

Fast carry-propagate techniques can dramatically decrease the carry propagation delay, and therefore decrease the overall delay of the adder. Adders employing such techniques are sometimes referred to as carry-propagate adders or carry-lookahead adders. Conventional carry propagate adder structures speed up the carry chain by computing the individual carry propagate (P) and carry generate (G) signals for each bit position.

For any two binary numbers A and B, the P and G signals for a given bit position, n, are:

$$P_n = A_n \oplus B_n \quad (3)$$

$$G_n = A_n B_n. \quad (4)$$

P and G may also be generated for 1-of-4 numbers. G indicates that the given dit position, n, generates a carry that will have to be accounted for in the higher dits of the sum. G will be set when the sum of two 1-of-4 numbers is greater than 3. P indicates that any carry generated in lower dits will propagate across the given dit position, n, to affect the higher dits of the sum. P will be set when the sum of two 1-of-4 numbers is exactly three. If neither G nor P is true for a given dit position, then a carry halt signal (H) is implied An H signal indicates that any carry generated in lower dits will not propagate across the given dit position, n. H will be set if the sum of two 1-of-4 numbers is less than three. Restated, if the sum of two operand dits in a given dit position is greater than 3, G is true. If the sum is exactly 3, P is true. Otherwise, H is true. Final carry and sum computations proceed following exactly the same logic as is followed for the bitwise case.

Figure 7:
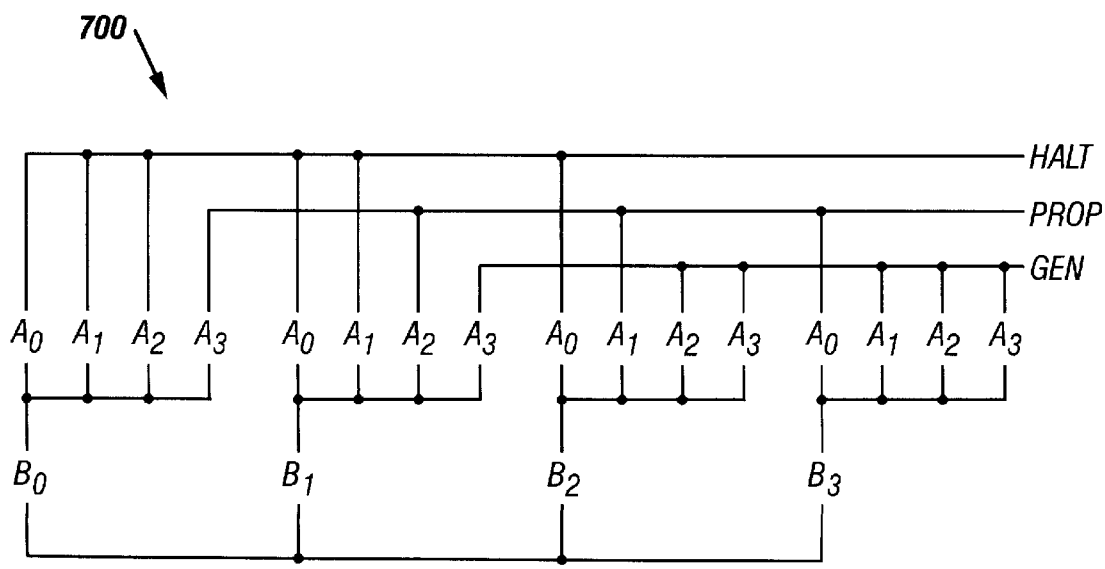
FIG. 7 is a shorthand representation of an N-NARY HPG gate having two 1-of-4 inputs.
Figure 7A:
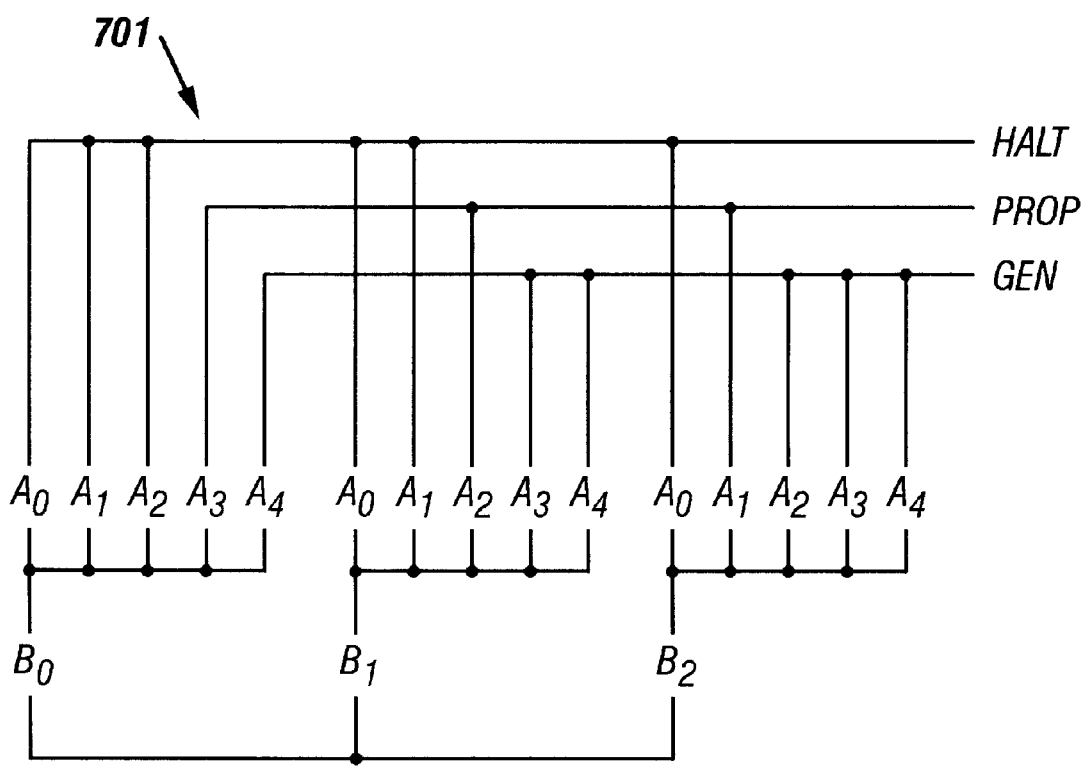
FIG. 7A is a shorthand representation of an N-NARY HPG gate having one 1-of-3 input and one 1-of-5 input.
Figure 8:
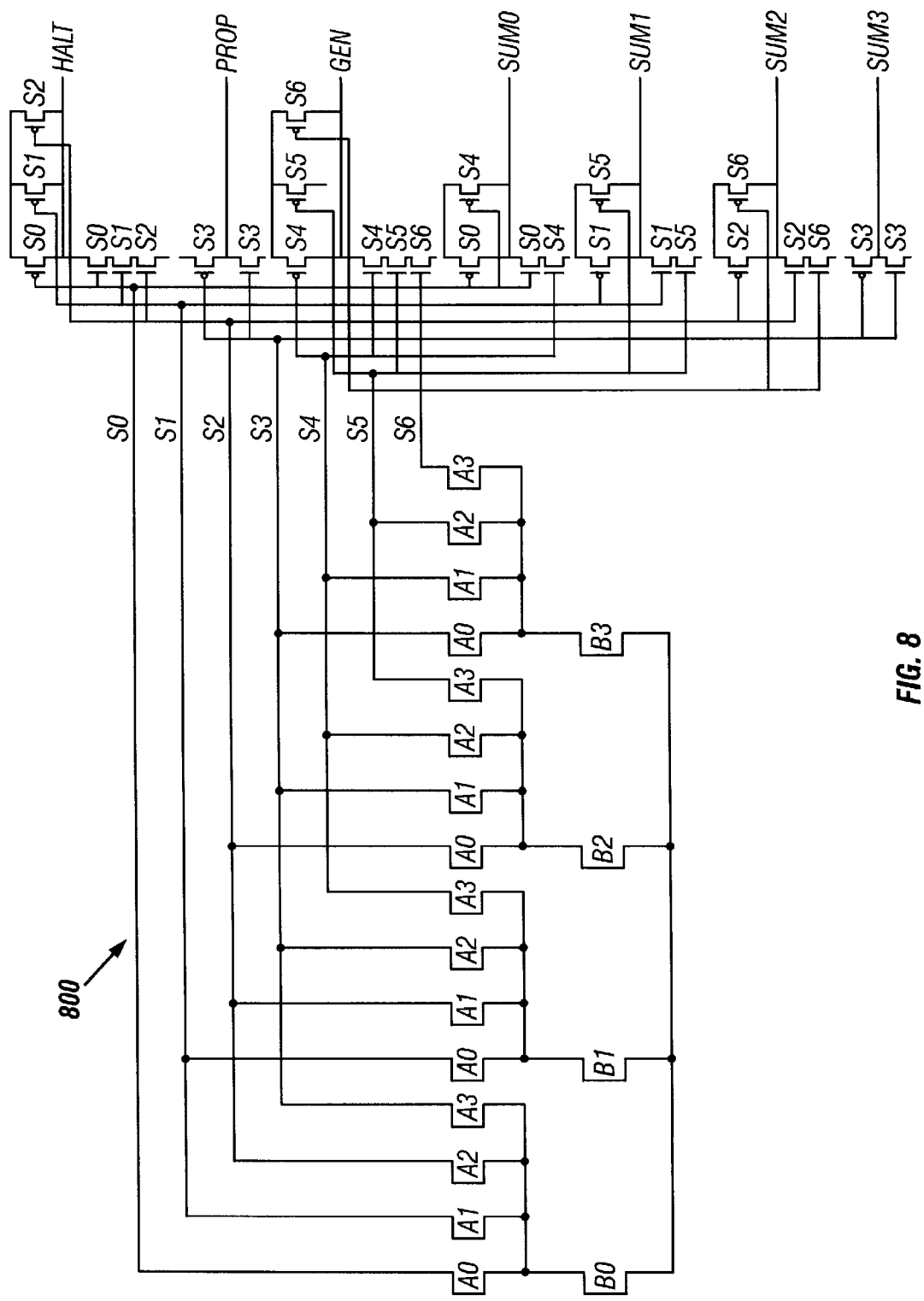
FIG. 8 is a modified shorthand representation of an N-NARY sum/HPG gate having two 1-of-4 inputs.

FIG. 7 illustrates an N-NARY HPG gate 700 that utilizes carry propagate logic to generate an H, P, or G indication for two two-bit 1-of-4 addends. A similar function may be performed using one 1-of-3 addend and one 1-of-5 addend. Such a gate 701 is illustrated in FIG. 7A. The output of the HPG gate 700 conforms to Table 5. The output of the FIG. 7 gate is a 1-of-3 N-NARY signal, such that one, and only one, of the H, P, or G wires is set high during a given evaluate cycle.

TABLE 5

| $A_3$ | $A_2$ | $A_1$ | $A_0$ | A Dec. Value | $B_3$ | $B_2$ | $B_1$ | $B_0$ | B Dec. Value | $H_n$ | $P_n$ | $G_n$ |
|---|---|---|---|---|---|---|---|---|---|---|---|---|
| 0 | 0 | 0 | 1 | 0 | 0 | 0 | 0 | 1 | 0 | 1 | 0 | 0 |
| 0 | 0 | 0 | 1 | 0 | 0 | 0 | 1 | 0 | 1 | 1 | 0 | 0 |
| 0 | 0 | 0 | 1 | 0 | 0 | 1 | 0 | 0 | 2 | 1 | 0 | 0 |
| 0 | 0 | 0 | 1 | 0 | 1 | 0 | 0 | 0 | 3 | 0 | 1 | 0 |
| 0 | 0 | 1 | 0 | 1 | 0 | 0 | 0 | 1 | 0 | 1 | 0 | 0 |
| 0 | 0 | 1 | 0 | 1 | 0 | 0 | 1 | 0 | 1 | 1 | 0 | 0 |
| 0 | 0 | 1 | 0 | 1 | 0 | 1 | 0 | 0 | 2 | 0 | 1 | 0 |
| 0 | 0 | 1 | 0 | 1 | 1 | 0 | 0 | 0 | 3 | 0 | 0 | 1 |
| 0 | 1 | 0 | 0 | 2 | 0 | 0 | 0 | 1 | 0 | 1 | 0 | 0 |
| 0 | 1 | 0 | 0 | 2 | 0 | 0 | 1 | 0 | 1 | 0 | 1 | 0 |
| 0 | 1 | 0 | 0 | 2 | 0 | 1 | 0 | 0 | 2 | 0 | 0 | 1 |
| 0 | 1 | 0 | 0 | 2 | 1 | 0 | 0 | 0 | 3 | 0 | 0 | 1 |
| 1 | 0 | 0 | 0 | 3 | 0 | 0 | 0 | 1 | 0 | 0 | 1 | 0 |
| 1 | 0 | 0 | 0 | 3 | 0 | 0 | 1 | 0 | 1 | 0 | 0 | 1 |
| 1 | 0 | 0 | 0 | 3 | 0 | 1 | 0 | 0 | 2 | 0 | 0 | 1 |
| 1 | 0 | 0 | 0 | 3 | 1 | 0 | 0 | 0 | 3 | 0 | 0 | 1 |

Referring back to Equ. 1, above, the Carry into a bit, $C_{n-1}$, is calculated as: $C_{n-1} = G_{n-1} + P_{n-1}G_{n-2} + P_{n-1}P_{-2}G_{n-3} + \ldots + P_{n-1}P_{n-2} \ldots P_1G_1$. To reduce the complexity if the carry computation, the scope of the computation is often constrained to a block of a fixed number of bits. In such a case, block-level propagates and generates are computed recursively.

Level One Combined Sum/HPG Function

The function of the HPG gate illustrated in FIG. 7 differs from that of the adder gate illustrated in FIG. 5, but the two gates share the same input terms. The sum/HPG adder gate shown for illustrative purposes in FIG. 8 combines the two functions to generate outputs conforming with Table 6.

TABLE 6

| $A_3$ | $A_2$ | $A_1$ | $A_0$ | A Dec. Value | $B_3$ | $B_2$ | $B_1$ | $B_0$ | B Dec. Value | Sum | H | P | G |
|---|---|---|---|---|---|---|---|---|---|---|---|---|---|
| 0 | 0 | 0 | 1 | 0 | 0 | 0 | 0 | 1 | 0 | 0 | 1 | 0 | 0 |
| 0 | 0 | 0 | 1 | 0 | 0 | 0 | 1 | 0 | 1 | 1 | 1 | 0 | 0 |
| 0 | 0 | 0 | 1 | 0 | 0 | 1 | 0 | 0 | 2 | 2 | 1 | 0 | 0 |
| 0 | 0 | 0 | 1 | 0 | 1 | 0 | 0 | 0 | 3 | 3 | 0 | 1 | 0 |
| 0 | 0 | 1 | 0 | 1 | 0 | 0 | 0 | 1 | 0 | 1 | 1 | 0 | 0 |
| 0 | 0 | 1 | 0 | 1 | 0 | 0 | 1 | 0 | 1 | 2 | 1 | 0 | 0 |
| 0 | 0 | 1 | 0 | 1 | 0 | 1 | 0 | 0 | 2 | 3 | 0 | 1 | 0 |
| 0 | 0 | 1 | 0 | 1 | 1 | 0 | 0 | 0 | 3 | 0 | 0 | 0 | 1 |
| 0 | 1 | 0 | 0 | 2 | 0 | 0 | 0 | 1 | 0 | 2 | 1 | 0 | 0 |
| 0 | 1 | 0 | 0 | 2 | 0 | 0 | 1 | 0 | 1 | 3 | 0 | 1 | 0 |
| 0 | 1 | 0 | 0 | 2 | 0 | 1 | 0 | 0 | 2 | 0 | 0 | 0 | 1 |
| 0 | 1 | 0 | 0 | 2 | 1 | 0 | 0 | 0 | 3 | 1 | 0 | 0 | 1 |
| 1 | 0 | 0 | 0 | 3 | 0 | 0 | 0 | 1 | 0 | 3 | 0 | 1 | 0 |
| 1 | 0 | 0 | 0 | 3 | 0 | 0 | 1 | 0 | 1 | 0 | 0 | 0 | 1 |
| 1 | 0 | 0 | 0 | 3 | 0 | 1 | 0 | 0 | 2 | 1 | 0 | 0 | 1 |
| 1 | 0 | 0 | 0 | 3 | 1 | 0 | 0 | 0 | 3 | 2 | 0 | 0 | 1 |

Figure 8A:
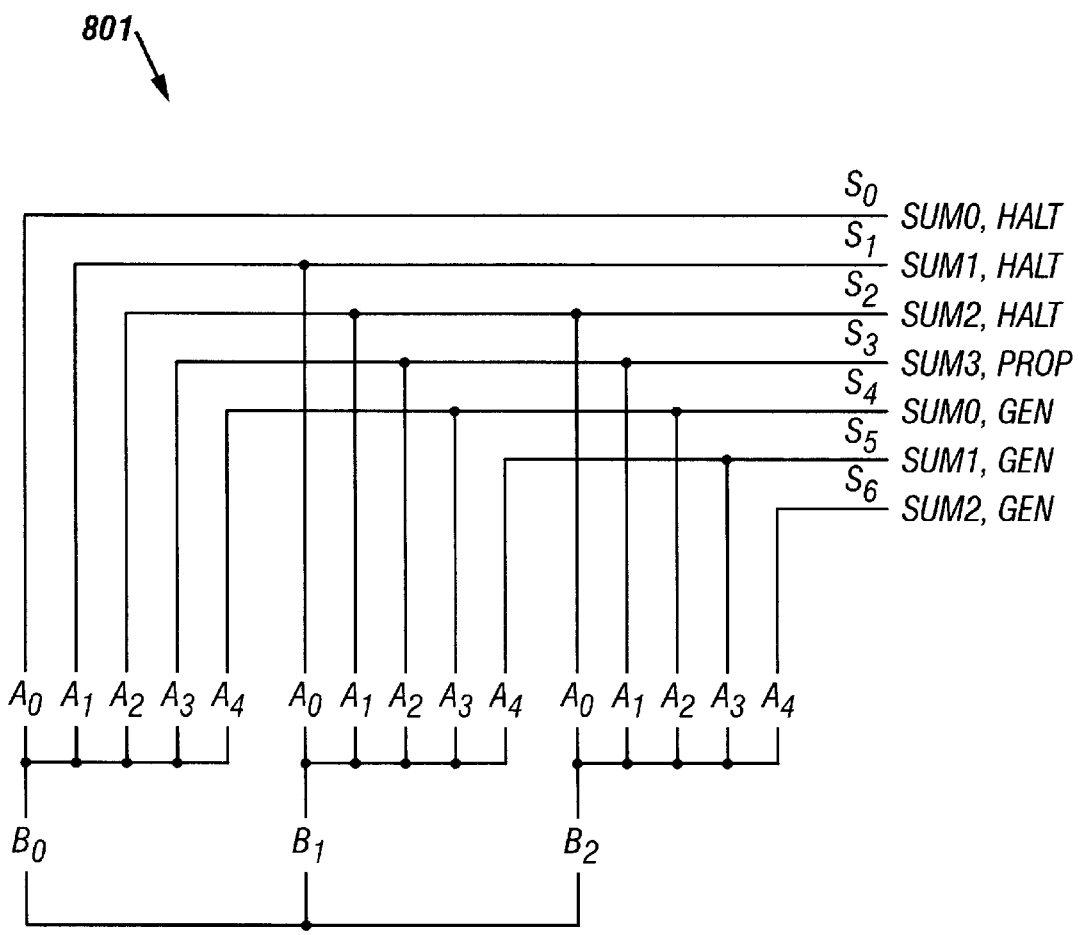
FIG. 8A is a shorthand representation of an N-NARY sum/HPG gate having one 1-of-3 addend input and one 1-of-5 addend input.

The function of the sum/HPG adder gate illustrated in FIG. 8 is to add two two-bit 1-of-4 inputs and generate the sum and the H, P, and G values set forth in Table 6. The two operands A and B are two-bit 1-of-4 values, as is the sum S. The H, P, and G outputs represent the three wires for a 1-of-3 output. A similar function may be performed using one 1-of-3 input and one 1-of-5 input, as illustrated in FIG. 8A.

FIG. 8 illustrates that it is not necessary to construct multiple identical output signals from an evaluate node, even when a gate comprises two output signals. FIG. 8 illustrates that it is instead possible to construct multiple output signals from a single set of evaluate nodes. In FIG. 8, the evaluate nodes are identified as S0, S1, S2, S3, S4, S5, and S6. In order for the two different output signals to conform to the 1-of-N signal definition, additional processing is performed on the evaluate nodes. In this processing, each evaluate node S0–S6 drives more than one output, and the outputs are different. FIG. 8 illustrates that for the HALT output, the S0, S1, and S2 evaluate nodes are NAND'ed together. (Because the evaluate nodes are asserted low and the outputs are high, the effect of NAND'ing is to OR the evaluate terms.) The PROP output is pulled high if the S3 evaluate node is asserted. For the GEN output, the S4, S5, and S6 evaluate nodes are NAND'ed together. The Sum 0 output is pulled high if the NAND'ed S0 or S4 evaluate nodes are asserted. For Sum 1, the S1 and S5 evaluate nodes are NAND'ed together. For Sum 2, the S2 and S6 evaluate nodes are NAND'ed together. Finally, the Sum 3 output is pulled high if the S3 evaluate node is asserted.

Level One Logic Gates

The primary logic gates of Level One combine the sum and HPG functions described above with subtraction logic, which is discussed below. FIG. 14 illustrates that Level One comprises five different variants of combined adder/subtractor/HPG logic gates 900, 910, 920, 930, 940. The Level One combined adder/subtractor/HPG logic gates 900, 910, 920, 930, 940 are depicted in FIGS. 9, 10, 11, 12, and 13.

Figure 9:
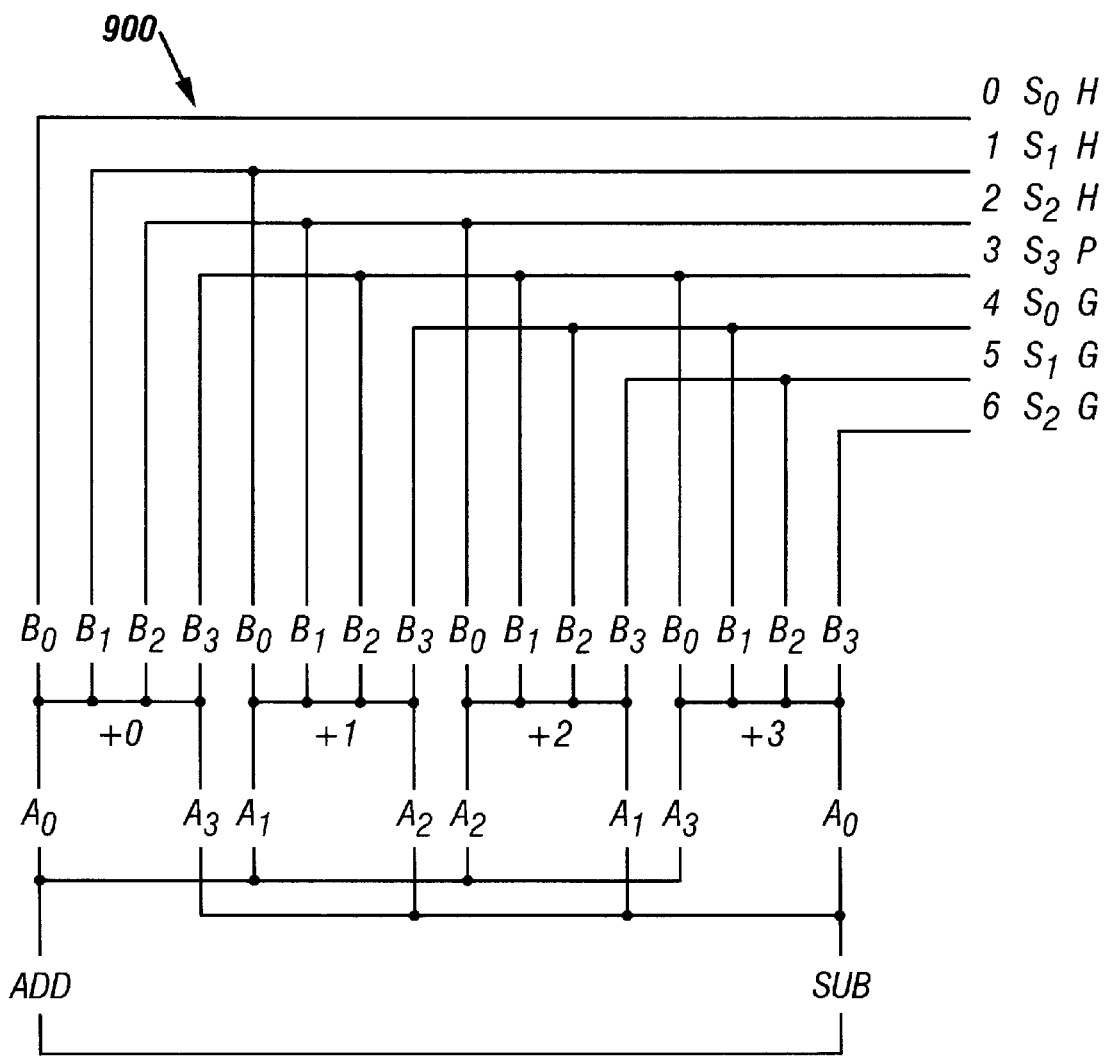
FIG. 9 is a shorthand representation of an N-NARY sum/HPG adder/subtractor gate that performs three's complement subtraction.

Although it is not expressly represented in FIGS. 9 through 13, these gates perform logic that drives two output signals from the same evaluate nodes, much like the gate 800 shown in FIG. 8. FIG. 9 shows the outputs of the basic Level One gate 900 S, H, P, and G in an expanded form for clarity; these signals are NAND'ed together as described above to form the two discrete sum, SUM, and HPG output signals. The same type of processing NAND processing is also performed by the other Level One LSD gates 910, 920,

930, 940 depicted in FIGS. 10 through 13. These other gates 910, 920, 930, 940 are referred to herein as "specialized Level One gates." The specialized Level One gates 910, 920, 930, 940 have dual subtraction capability. They may perform three's complement addition, as does gate 900. Or, the specialized Level One gates 910, 920, 930, 940 may increment the three's complement of operand A in the LSD to create the four's complement for a subtraction operation. Accordingly, the specialized gates 910, 920, 930, 940 have an additional evaluate node, S7, which pulls the GEN output and the SUM3 output high. Also, one should note that the HALT and PROP signals could be combined in gate 910, since there will never be a borrow propagated into the LSD. Accordingly, a HALT/PROP signal could be produced as an output of gate 910 that comprises a NAND of the S0, S1, S2, and S3 evaluate nodes. See co-pending patent application, U.S. patent Ser. No. 09/150,717, filed Sep. 10, 1998, titled "Method and Apparatus for an N-NARY Sum/HPG Adder/Subtractor Gate," hereinafter referred to as the "Adder/Subtractor Patent."

FIGS. 9 through 13 illustrate that all Level One gates 900, 910, 920, 930, 940 take at least the following as inputs: two 1-of-4 input operands, A and B, and a 1-of-2 ADD/SUB signal that controls whether addition or subtraction is performed. These gates 900, 910, 920, 930, 940 all combine at least the following functions: addition, carry propagate logic, subtraction, and borrow propagate logic. FIGS. 9 through 13 also demonstrate that the intermediate outputs of the Level One logic gates 900, 910, 920, 930, 940 comprise seven (gate 900) or eight evaluate nodes, S0 through S7. These nodes are NAND'ed as described above to create a 1-of-4 SUM signal and a 1-of-3 HPG signal.

FIGS. 9, 10, 11, 12, and 13 illustrate that, for addition, the Level One gates 900, 910, 920, 930, 940 all operate to compute the intermediate sum in the same manner, deriving it as the simple sum of the two addend dits. The logic path for the ADD wire for each Level One gate 900, 910, 920, 930, 940 connects to four sets, referred to as "blocks", of the four wires comprising the B input, $B_3$, $B_2$, $B_1$, $B_0$. In FIGS. 9 through 13, each block of B input wires has been labeled with the conceptual value of the A input associated with that block for the addition function. For instance, the leftmost block of B input wires in FIGS. 9 through 13, corresponding to an addition value of "0" for A, is labeled as the "+0" block. From left to right in FIGS. 9 through 13, the remaining blocks of B input wires have been labeled as the "+1", "+2", "+3" blocks, respectively. If the ADD value is asserted for the ADD/SUB selector, the $A_0$ input value will lead to the "+0" block and the value of B will therefore will be NAND'ed with zero to produce the Block "+0" output. Thus, the value of B will be added to zero. Similarly, the $A_1$ input value will lead, for addition, to the "+1" block and will therefore cause the value of one to be NAND'ed with the B input value for that dit. The $A_2$ input value will lead, for addition, to the "+2" block and will therefore cause the value of two to be NAND'ed with the B input value for that dit. Finally, the $A_3$ input value will lead, for addition, to the "+3" block and will therefore cause the value of three to be NAND'ed with the B input value for that dit. The additional operation of each Level One gate 900, 910, 920, 930, including subtraction, is discussed separately below.

The basic Level One combined adder/subtractor/HPG gate 900 is illustrated in FIG. 9. The FIG. 9 gate 900 is used for each dit of the input operands A and B that will never fall as the least significant dit on any partition boundary. FIG. 14 illustrates that gate 900 is therefore used for the following dits, where each 64-bit operand comprises dits 0 through 31:

1–3, 5–7, 9–11, 13–15, 17–19, 21–23, 25–27, and 29–31. FIG. 14 illustrates that basic Level One gate 900 for each such dit is labeled, respectively, as 900a–900c, 900d–900f, 900g–900i, 900j–900l, 900m–900o, 900p–900r, 900s–900u and 900v–900x.

FIG. 9 illustrates that the basic adder/subtractor/HPG gate 900 takes as inputs two 1-of-4 addends, A and B, and the 1-of-2 ADD/SUB selector. The basic Level One gate 900 produces as outputs a 1-of-4 intermediate sum, SUM, and a 1-of-3 HPG signal that reflects the carry/borrow status of the particular dit. The basic Level One gate 900 possesses selectable subtract capability. For addition, the gate 900 computes, as discussed above, the intermediate sum of one dit of the A and B operands and also computes the HPG status for this dit of the intermediate sum. FIG. 9 illustrates that, for subtraction, the basic Level One gate 900 complements the minuend. That is, the basic Level One gate 900, for subtraction, adds the 3's complement of the A operand to the B operand. This subtraction logic is discussed below in further detail.

FIGS. 10 through 13 illustrate the specialized gates 910, 920, 930, 940 used by Level One for the addend dits that do or may act as the least significant dit ("LSD") of a partition. These specialized gates combine two capabilities, in addition to those of the basic Level One gate 900, that are needed for LSD subtraction processing. First, the specialized Level One gates 910, 920, 930, 940 address the need, for a subtraction operation, to increment the three's complement of the minuend in order to form the four's complement. That is, the A operand is not only complemented, but, if the gate is used in the LSD position, the A operand is then incremented by one to form the four's complement. This subtraction logic is discussed below in further detail.

Second, except for the Level One gate 910 that is used for Dit 0, the specialized Level One gates 920, 930, 940 address the special subtraction logic necessary for partitioning. In a partitioned subtraction, certain dits are in the least significant position for certain partitionings, but not for others. For any dit acting as the LSD for a partition, four's complement addition must be performed. In general, subtraction of a base four number is obtained by adding the three's complement of the subtrahend plus one. The least significant dit position absorbs the added one, and all other dit positions reflect only the three's complement. The specialized higher-dit Level One gates 920, 930, 940 for dits other than Dit 0 therefore need to distinguish between adding only the three's complement of the A operand and adding the three's complement plus one (i.e., four's complement).

Dit 0 will always act as the LSD, regardless of partition size, and will therefore always require four's complement addition. Dits 4, 12, 20, and 28 will act as the LSD, and thus require four's complement addition, for an 8-bit partition. For all other partition sizes, Dits 4, 12, 20, and 28 will act as non-boundary dits, and will therefore require three's complement addition. Dit 8 and Dit 24 will act as the LSD requiring four's complement addition of both an 8-bit partition and a 16-bit partition. Otherwise, dits 8 and 24 will act as non-boundary dits and will require three's complement addition. Dit 16 will act as the LSD for partitions of eight, sixteen, or thirty-two dits. Dit 16 will act as a non-boundary dit for a 64-bit partition. In order to determine the partition size, the specialized higher-dit Level One gates 920, 930, 940 that process dits 4, 8, 12, 16, 20, 24, and 28 must receive an additional input. The specialized higher-dit Level One gates 920, 930, 940 therefore receive as an input a 1-of-4 S8/S16/S32/S64 partition control signal that indicates the size of the partition. These gates 920, 930, 940 have selectable subtract behavior (three's complement vs. four's complement) based on the value of the partition size control signal.

Figure 10:
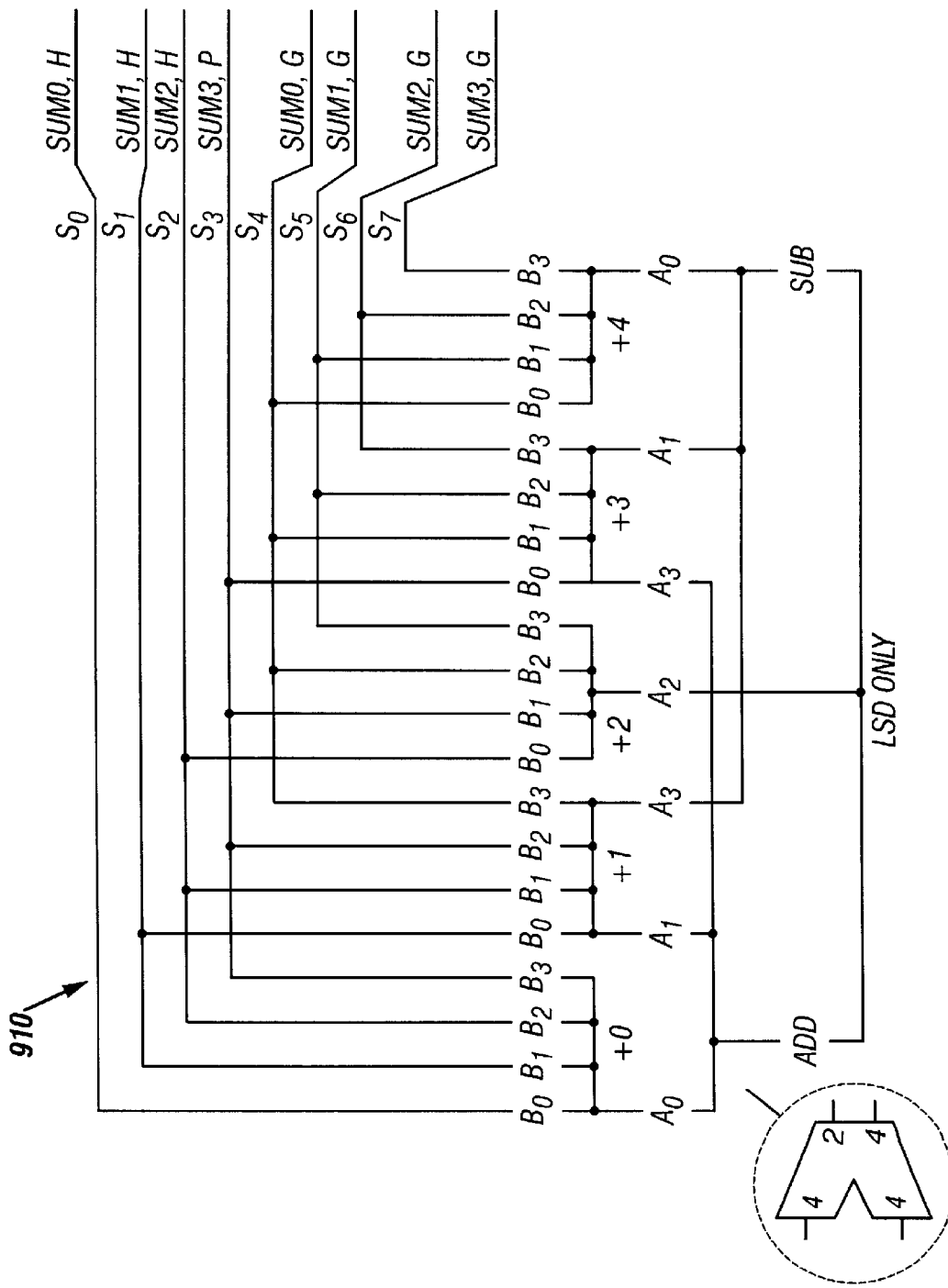
FIG. 10 is a shorthand representation of an LSD N-NARY sum/HPG adder/subtractor gate that performs four's complement subtraction.

FIG. 10 illustrates the specialized Level One LSD gate 910. FIG. 14 illustrates that this gate 910 is used for Dit 0. FIG. 10 illustrates that the specialized LSD gate 910 takes as inputs the 1-of-4 LSD's of the A and B operands and the 1-of-2 ADD/SUB indicator. The LSD Level One gate 910 produces as outputs a 1-of-4 intermediate sum, SUM, and a 1-of-3 HPG indicator. FIG. 10 illustrates that the LSD Level One gate 910 performs only four's complement subtraction and not three's complement subtraction. For this reason, FIG. 10 illustrates that the LSD Level One gate 910 does not receive the S8/S16/S32/S64 partition control indicator as an input.

Figure 11:
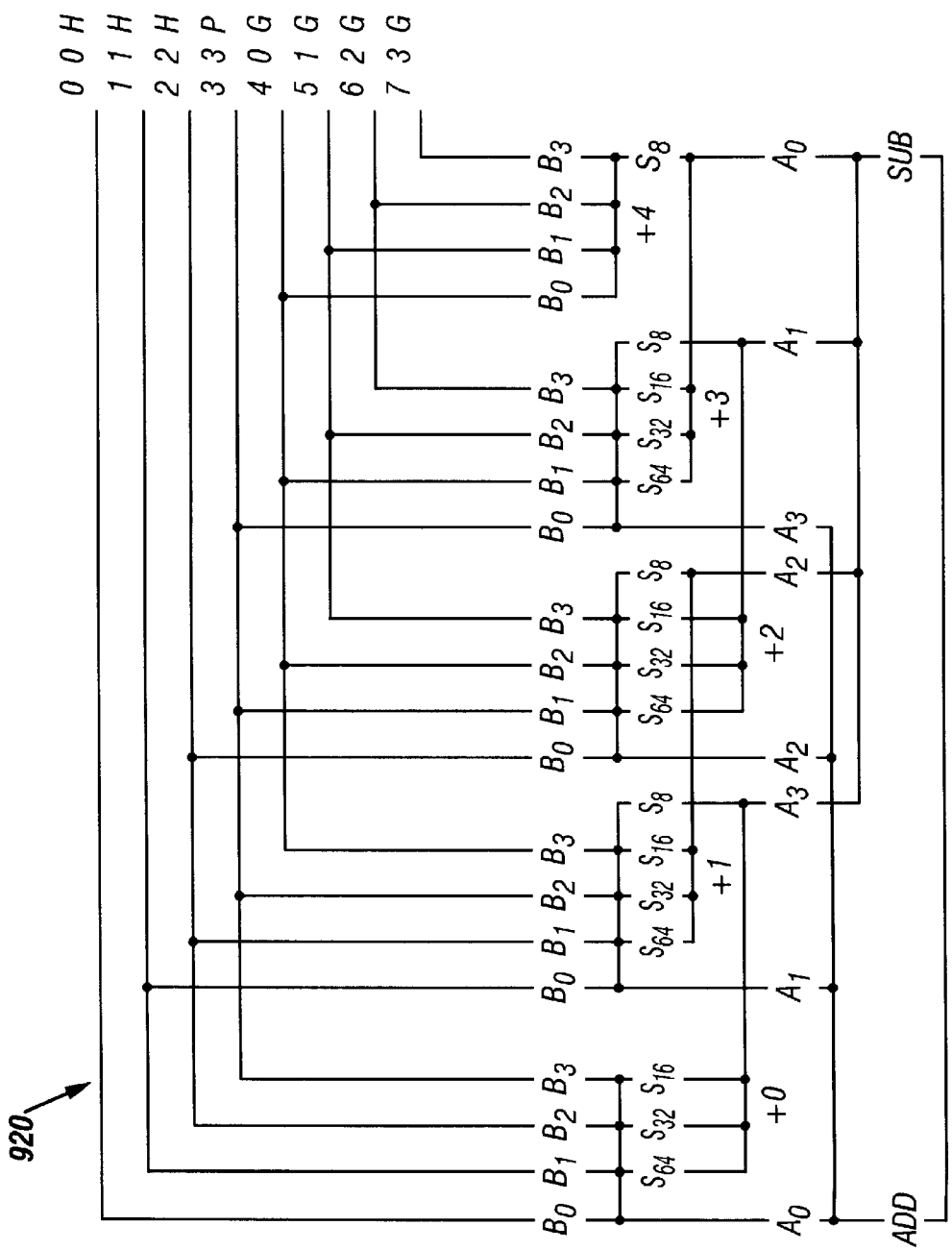
FIG. 11 is a shorthand representation of an N-NARY sum/HPG adder/subtractor gate that performs three's complement subtraction except that it performs four's complement subtraction for 8-bit partitioning.

FIG. 11 illustrates the specialized Level One selectable 8-bit LSD gate 920. FIG. 14 illustrates that this gate 920 is used for each operand dit that may act as the LSD on an 8-bit, and only an 8-bit, partition boundary. FIG. 14 illustrates that gate 920a processes dit 4 of the operand dits, gate 920b processes dit 12, gate 920c processes dit 20, and gate 920d processes dit 28. FIG. 11 illustrates that, depending on the value of the partition size control signal, gate 920 acts either as a non-boundary gate or acts as an LSD gate for 8-bit partitioning. If the S8 wire of the partition control signal is asserted, then gate 920 performs four's complement addition when the SUB wire of the ADD/SUB indicator is asserted. If SUB is asserted but S8 is not, then gate 920 performs three's complement addition.

Figure 12:
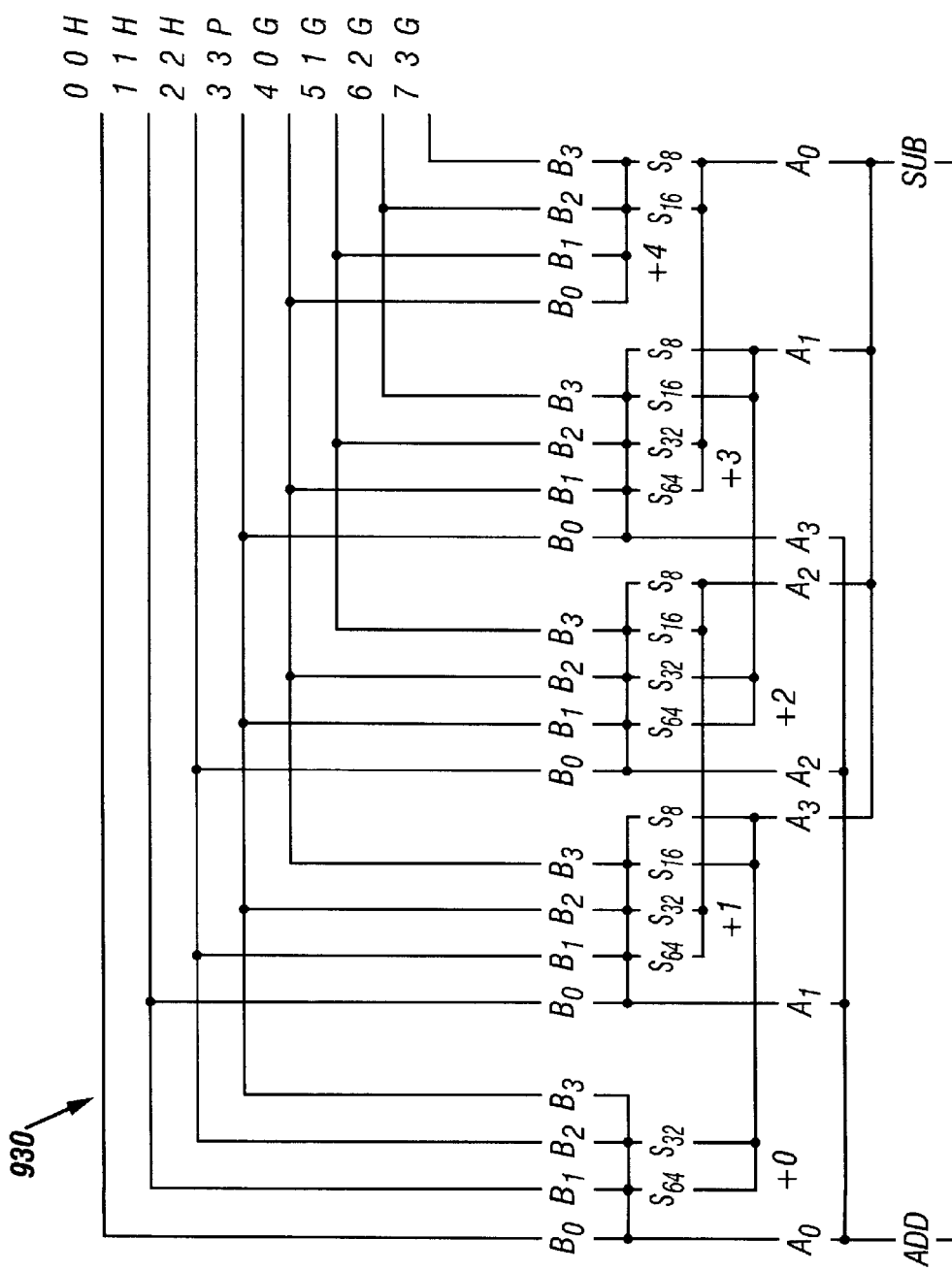
FIG. 12 is a shorthand representation of an N-NARY sum/HPG adder/subtractor gate that performs three's complement subtraction except that it performs four's complement subtraction for 8-bit and 16-bit partitioning.

FIG. 12 illustrates the specialized Level One selectable 8-bit/16-bit LSD gate 930. FIG. 14 illustrates that this gate 930 is used in the adder 101 for each bit that can act as the LSD for either an 8-bit or 16-bit partition. That is, gate 930a is used to process dit 8 and gate 930b is used to process dit 24. FIG. 12 illustrates that, if neither 8-bit nor 16-bit partition size is selected, then gate 930 acts as a non-boundary gate and performs three's complement addition. If the S8 or S16 wire of the partition control signal is asserted, then gate 930 performs four's complement addition when the SUB wire of the ADD/SUB indicator is asserted. If SUB is asserted but neither S8 nor S16 is asserted, then gate 930 performs normal three's complement addition.

Figure 13:
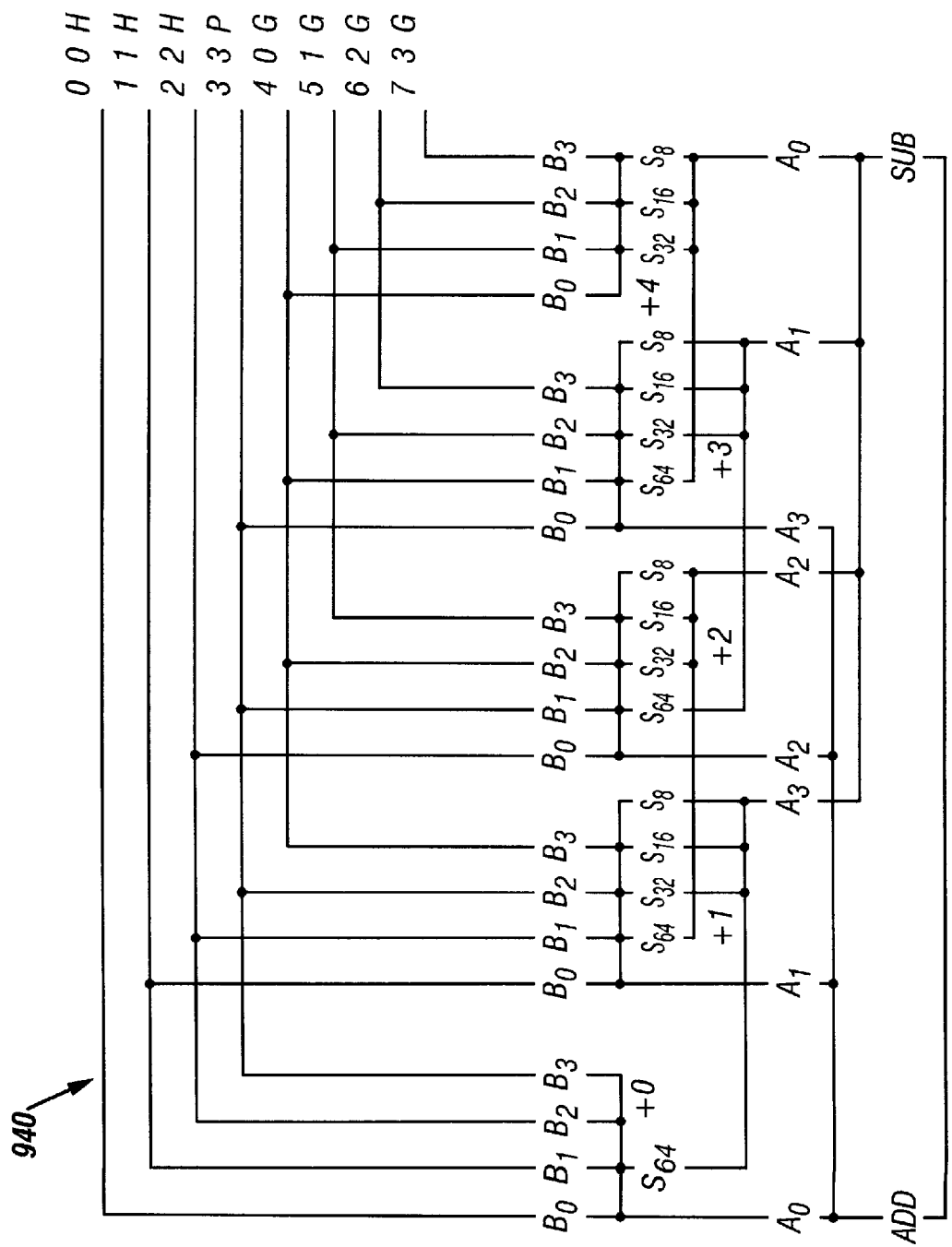
FIG. 13 is a shorthand representation of an N-NARY sum/HPG adder/subtractor gate that performs three's complement subtraction except that it performs four's complement subtraction for 8-bit, 16-bit, and 32-bit partitioning.
Figure 14A:
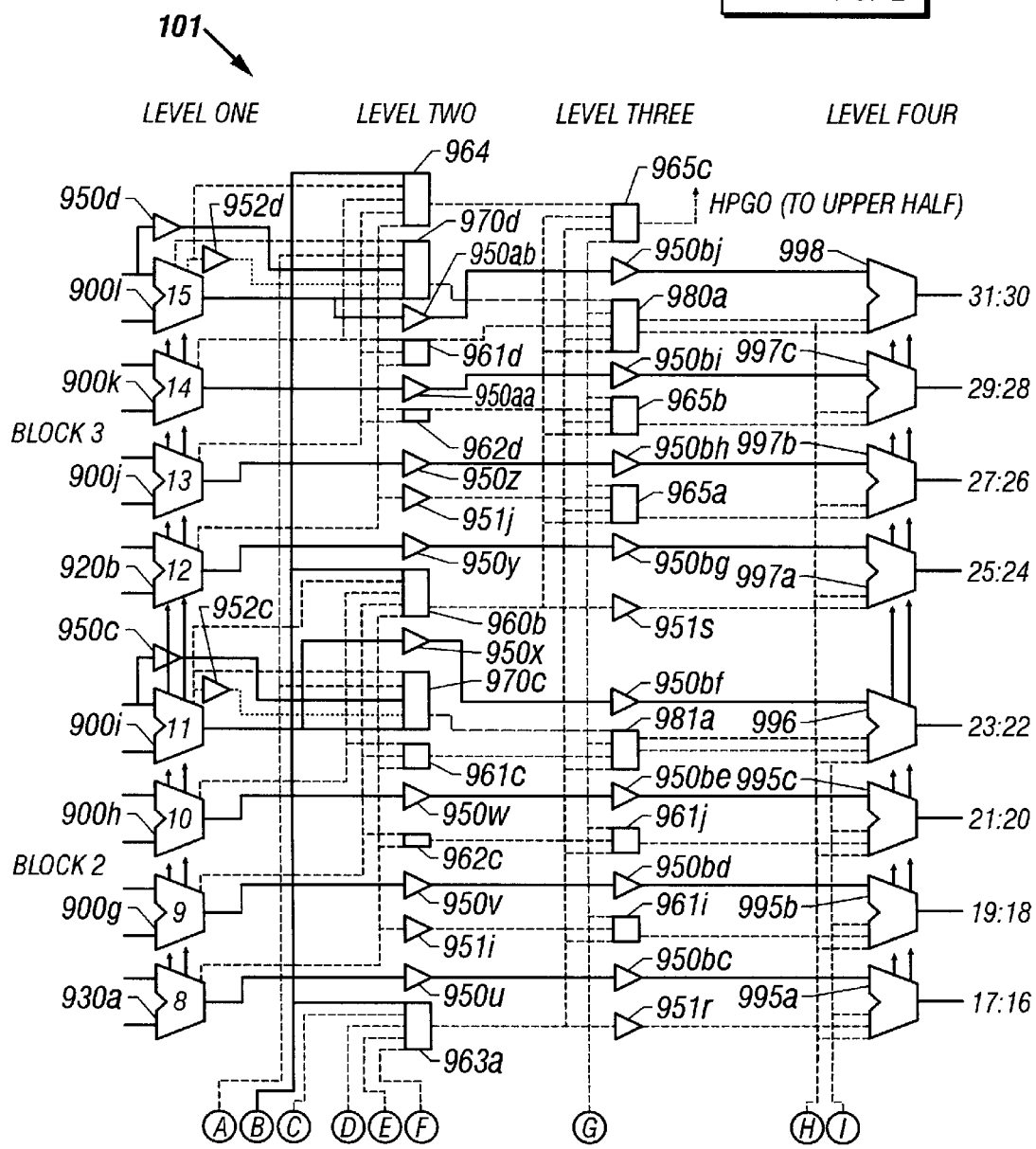
FIG. 14 is a block diagram of the present invention.
Figure 14B:
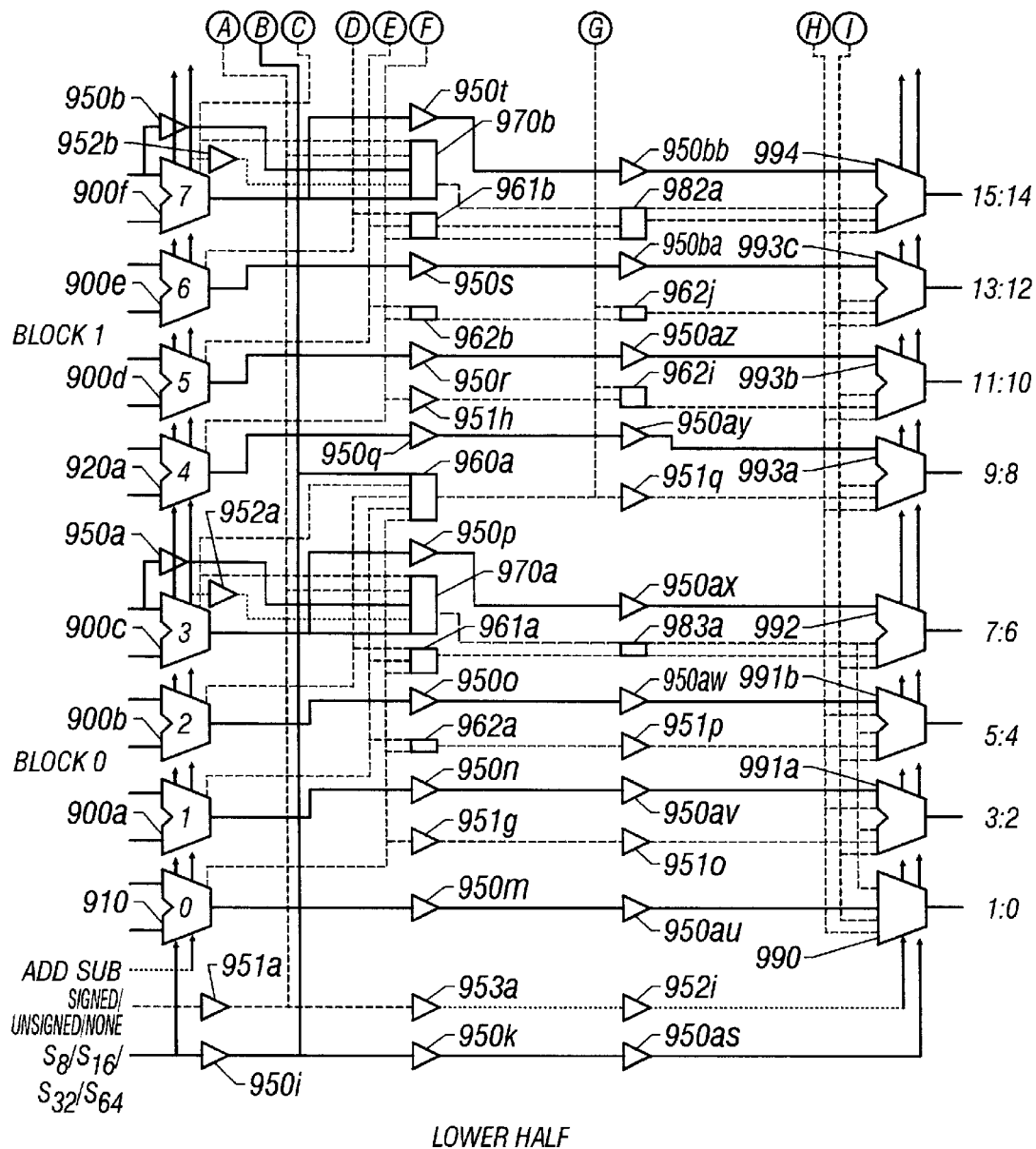
Figure 14C:
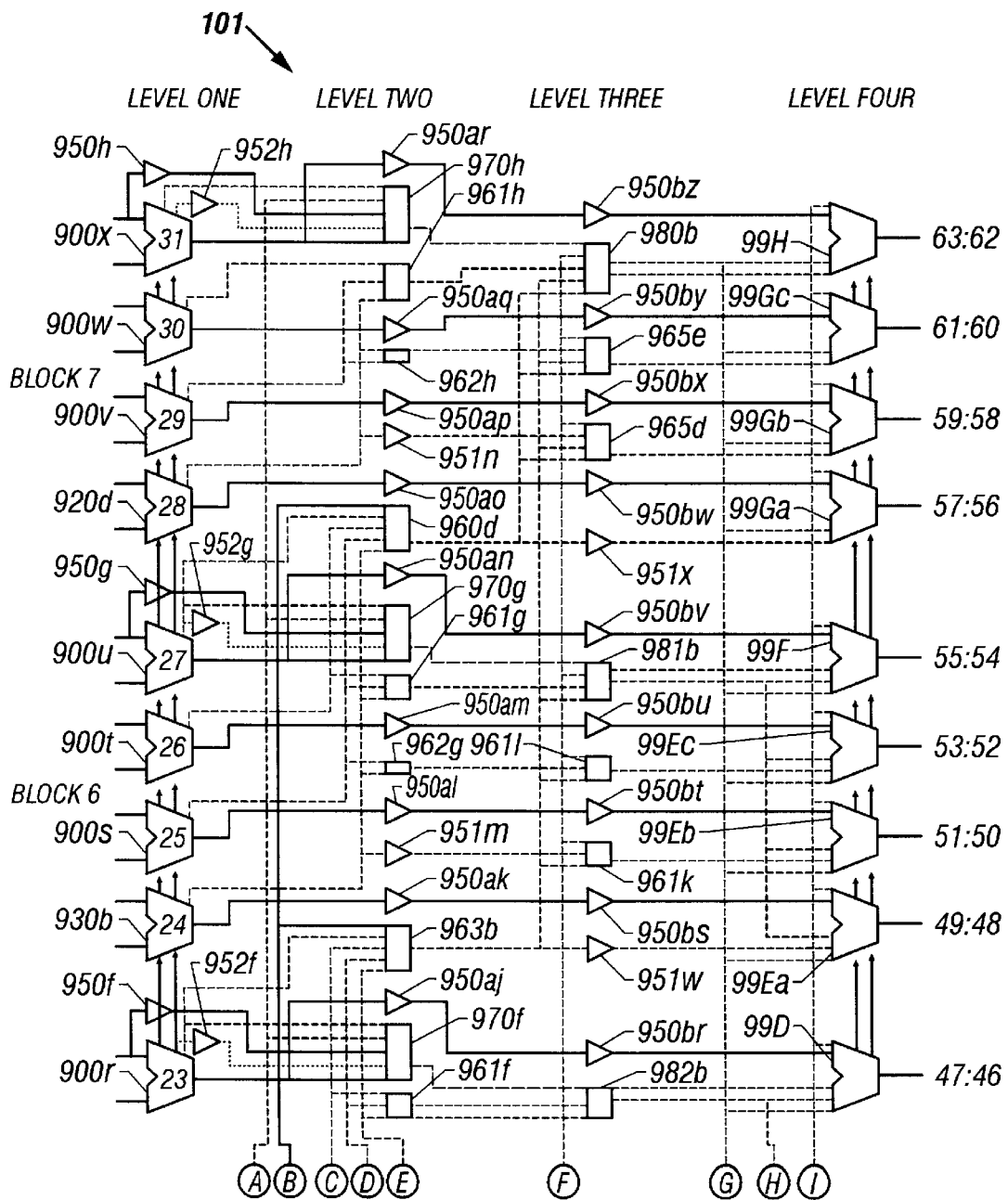
Figure 14D:
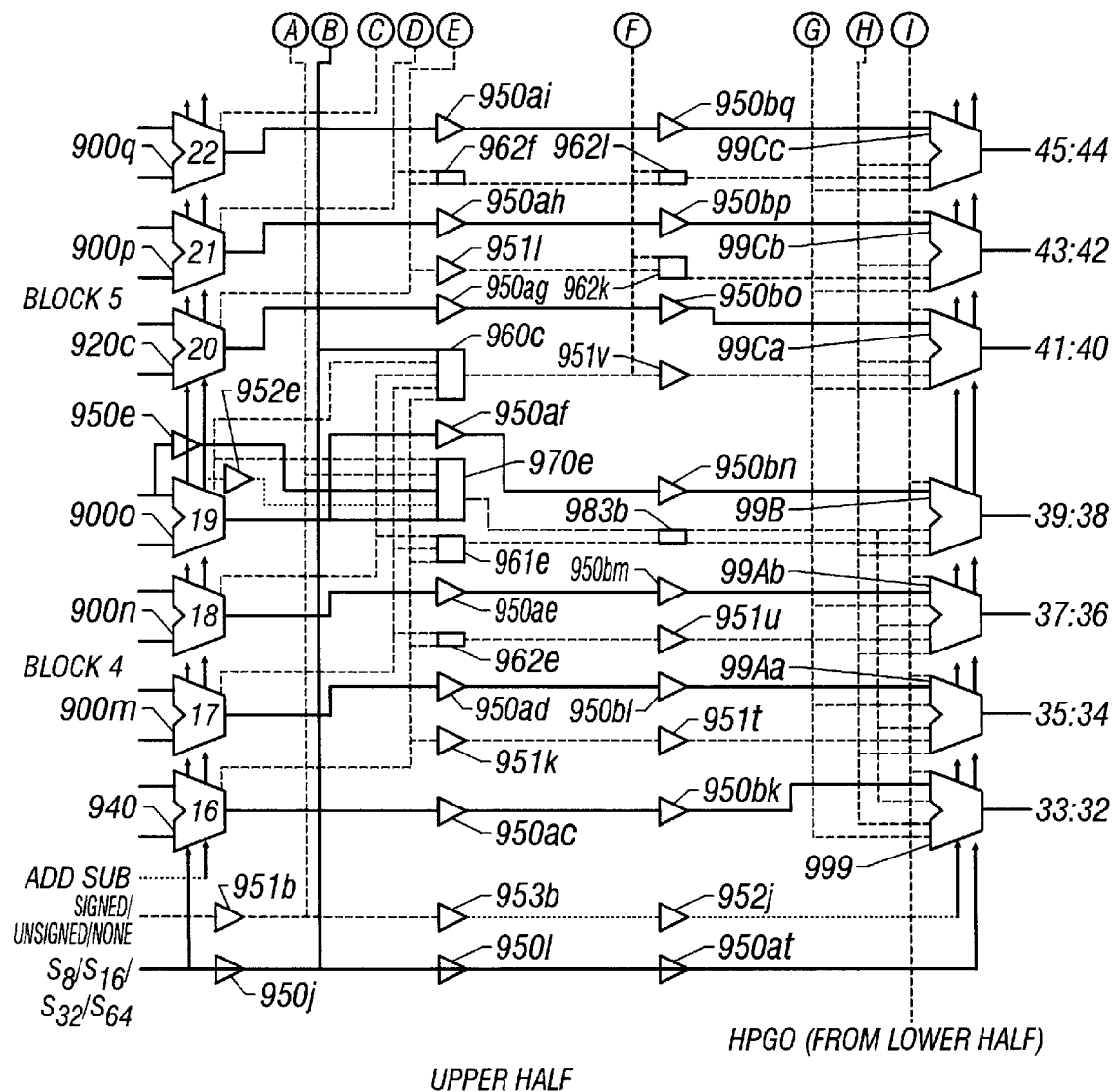

FIG. 13 illustrates the specialized Level One selectable 8-bit/16-bit/32-bit LSD gate 940. FIG. 14 illustrates that this gate 940 is used to process dit 16 of the operands. Dit 16 may act as the LSD for an 8-bit, 16-bit, or 32-bit partition.

For any of these cases, FIG. 13 illustrates that gate 940 performs four's complement addition when the SUB wire of the ADD/SUB indicator is asserted. For a 64-bit partition, gate 940 simply performs three's complement addition if the SUB wire is asserted.

Level One N-NARY Subtraction Logic

As stated above, the Level One gates 900, 910, 920, 930, 940 possess selectable subtract capability, and may be used for either addition or subtraction, based on the value of the ADD/SUB selector. FIGS. 9 through 13 illustrate the Level One logic gates 900, 910, 920, 930, 940. Each gate 900, 910, 920, 930, 940 not only implements the combined Sum/HPG functions discussed above, but also implements the subtraction and borrow propagate logic discussed herein.

For subtraction, the Level One logic gates 900, 910, 920, 930, 940 subtract the value of the A operand from the B operand to produce a result in a specialized format discussed below. For illustrative purposes, a truth table generally demonstrating the subtraction operation, B−A, using 1-of-4 encoding is set forth in Table 7. Each of the two-bit 1-of-4 inputs, A and B, in Table 7 can represent one of four values, 0 through 3 inclusive, depending on which of the four wires for each signal is set high. The four wires for the two-bit 1-of-4 representation of the decimal difference of the subtraction operation in Table 7 are labeled $D_3$, $D_2$, $D_1$, and $D_0$.

TABLE 7

| 0 | $B_2$ | $B_1$ | $B_0$ | B Dec. Value | $A_3$ | $A_2$ | $A_1$ | $A_0$ | A Dec. Value | $D_3$ | $D_2$ | $D_1$ | $D_0$ | B − A Decimal Value |
|---|---|---|---|---|---|---|---|---|---|---|---|---|---|---|
| 0 | 0 | 0 | 1 | 0 | 0 | 0 | 0 | 1 | 0 | 0 | 0 | 0 | 1 | 0 |
| 0 | 0 | 0 | 1 | 0 | 0 | 0 | 1 | 0 | 1 | 0 | 0 | 1 | 0 | −1 |
| 0 | 0 | 0 | 1 | 0 | 0 | 1 | 0 | 0 | 2 | 0 | 1 | 0 | 0 | −2 |
| 0 | 0 | 0 | 1 | 0 | 1 | 0 | 0 | 0 | 3 | 1 | 0 | 0 | 0 | −3 |
| 0 | 0 | 1 | 0 | 1 | 0 | 0 | 0 | 1 | 0 | 0 | 0 | 1 | 0 | 1 |
| 0 | 0 | 1 | 0 | 1 | 0 | 0 | 1 | 0 | 1 | 0 | 0 | 0 | 1 | 0 |
| 0 | 0 | 1 | 0 | 1 | 0 | 1 | 0 | 0 | 2 | 1 | 0 | 0 | 0 | −1 |
| 0 | 0 | 1 | 0 | 1 | 1 | 0 | 0 | 0 | 3 | 0 | 1 | 0 | 0 | −2 |
| 0 | 1 | 0 | 0 | 2 | 0 | 0 | 0 | 1 | 0 | 0 | 1 | 0 | 0 | 2 |
| 0 | 1 | 0 | 0 | 2 | 0 | 0 | 1 | 0 | 1 | 1 | 0 | 0 | 0 | 1 |
| 0 | 1 | 0 | 0 | 2 | 0 | 1 | 0 | 0 | 2 | 0 | 0 | 0 | 1 | 0 |
| 0 | 1 | 0 | 0 | 2 | 1 | 0 | 0 | 0 | 3 | 0 | 0 | 1 | 0 | −1 |
| 1 | 0 | 0 | 0 | 3 | 0 | 0 | 0 | 1 | 0 | 1 | 0 | 0 | 0 | 3 |
| 1 | 0 | 0 | 0 | 3 | 0 | 0 | 1 | 0 | 1 | 0 | 1 | 0 | 0 | 2 |
| 1 | 0 | 0 | 0 | 3 | 0 | 1 | 0 | 0 | 2 | 0 | 0 | 1 | 0 | 1 |
| 1 | 0 | 0 | 0 | 3 | 1 | 0 | 0 | 0 | 3 | 0 | 0 | 0 | 1 | 0 |

In Table 7, negative output values in the "B−A" column indicate that a borrow from the next higher-order dit must occur. As is discussed below, the present invention produces output values that are based on the assumption that such a borrow will occur in every case. In cases where such a borrow is not necessary, the present invention compensates accordingly.

In performing subtract logic within a processor, it is useful to implement subtraction as a form of complement addition. An adder may be made to subtract by forming the radix complement of the subtrahend and adding it to the minuend, where "radix" refers to the base of the number system being used. The radix complement of a number is formed by adding one to the least significant bit of the diminished radix complement of the number. The diminished radix complement is formed by subtracting every digit of the subtrahend from a number y, where y=base−1. In binary systems, subtraction is often implemented using the radix complement, or two's complement. Two's complement is formed by incrementing a one's complement number (the diminished radix complement). One's complement is formed by subtracting each bit of the subtrahend from 1, which is one less than the base (2). Formation of the 1's complement effects an inversion of each digit of the subtrahend.

The preferred embodiment of the Level One gates, because they operate on 1-of-4 inputs, are not binary. Instead, the addition system of the present invention is quaternary, with a base of four. Accordingly, the subtraction of the present invention is implemented as a form of four's complement addition. In the present invention, therefore, the subtrahend is converted to three's complement, the diminished radix complement, by novel circuitry that emulates the effect of subtracting each dit of the subtrahend from three. In the specialized Level One gates 920, 930, 940, when processing dits that fall as the LSD for a partition boundary, the subtrahend is converted from three's complement to four's complement, the radix complement, by novel circuitry that emulates the effect of incrementing the least significant dit of the three's complement number. Table 8 illustrates the three's complement for each of the four possible values of a 1-of-4 dit.

TABLE 8

| x (decimal) | x (1-of-4) | 3's Comp. (3-x) | 3-x (1-of-4) |
|---|---|---|---|
| 0 | 0001 | 3 | 1000 |
| 1 | 0010 | 2 | 0100 |
| 2 | 0100 | 1 | 0010 |
| 3 | 1000 | 0 | 0001 |

Since four's complement is generated by adding one to the least significant dit of a three's complement number, the present invention provides subtraction capability with minimal additional cost by providing a path that converts each dit of the subtrahend to the three's complement. In the least significant dit for each partition of a subtraction operation, the present invention converts the subtrahend to a four's complement representation.

All Dits Except LSD—Subtraction using Three's Complement

Table 9 sets forth the subtraction truth table for the N-NARY circuit illustrated in FIG. 9, which performs subtraction on two 1-of-4 numbers, A and B, by adding the three's complement of A to B in order derive the two-bit difference of B–A. This processing is performed on all dits, except the LSD for each partition grouping, during a subtract operation. In Table 9, A and B are represented in both decimal and 1-of-4 representations. The "~A" column of Table 9 represents the three's complement value of the subtrahend, A. The "~A (1-of-4)" column represents the three's complement of A in 1-of-4 representation. The "Pre-corr. Diff." column represents the difference of B–A, represented in a pre-correction format discussed in detail below. The "Diff." column represents the difference in post-correction decimal format.

TABLE 9

| B | B (1-of-4) | A | A (1-of-4) | ~A | ~A (1-of-4) | Pre-Corr. Diff (B − A) | Diff |
|---|---|---|---|---|---|---|---|
| 0 | 0001 | 0 | 0001 | 3 | 1000 | 3 | 0 |
| 1 | 0010 | 0 | 0001 | 3 | 1000 | 0* | 1 |
| 2 | 0100 | 0 | 0001 | 3 | 1000 | 1* | 2 |
| 3 | 1000 | 0 | 0001 | 3 | 1000 | 2* | 3 |
| 0 | 0001 | 1 | 0010 | 2 | 0100 | 2 | −1 |
| 1 | 0010 | 1 | 0010 | 2 | 0100 | 3 | 0 |

TABLE 9-continued

| B | B (1-of-4) | A | A (1-of-4) | ~A | ~A (1-of-4) | Pre-Corr. Diff (B − A) | Diff |
|---|---|---|---|---|---|---|---|
| 2 | 0100 | 1 | 0010 | 2 | 0100 | 0* | 1 |
| 3 | 1000 | 1 | 0010 | 2 | 0100 | 1* | 2 |
| 0 | 0001 | 2 | 0100 | 1 | 0010 | 1 | −2 |
| 1 | 0010 | 2 | 0100 | 1 | 0010 | 2 | −1 |
| 2 | 0100 | 2 | 0100 | 1 | 0010 | 3 | 0 |
| 3 | 1000 | 2 | 0100 | 1 | 0010 | 0* | 1 |
| 0 | 0001 | 3 | 1000 | 0 | 0001 | 0 | −3 |
| 1 | 0010 | 3 | 1000 | 0 | 0001 | 1 | −2 |
| 2 | 0100 | 3 | 1000 | 0 | 0001 | 2 | −1 |
| 3 | 1000 | 3 | 1000 | 0 | 0001 | 3 | 0 |

The values in the "Pre-Corr. Diff" column of Table 9 denoted by asterisks are mod 4 values of a difference that is too large to be represented in two bits. Conceptually, these cases generate a carry into the next higher-order dit, where such carry represents a value of four.

FIG. 9 illustrates a gate 900 that performs three's complement subtraction in the following manner. FIG. 9 illustrates that each block of B inputs in gate 900 has been labeled with the conceptual value of the A input. The left most block of B inputs in FIG. 9, corresponding to an addition value of "0" for A and a subtraction value of "3" for A has been labeled "+0." From left to right, the remaining blocks have been labeled as the "+1", "+2", and "+3" blocks, respectively. For subtraction, the $A_0$ input is coupled to the "+3" block. Because the three's complement of zero is three, the addition of three to the B input when the value of $A_n$ is zero effectuates the conversion of A to a three's complement value before it is added to B. Similarly, the $A_1$ input for subtraction is coupled to the "+2" block because the three's complement of one is two. Likewise, the $A_2$ input is coupled to the "+1" block and the $A_3$ input is coupled to the "+0" block. Through this novel circuitry approach, A is simply and elegantly converted to its three's complement representation.

Pre-correction Format for Three's Complement Subtraction

The values set forth in the "Pre-Corr. Diff" column of Table 9 represent the present invention's pre-correction format for three's complement subtraction. Rather than producing an intermediate difference (hereinafter referred to as "Diff") value that represents B–A for a given bit n, the format of the pre-corrected Diff in Table 9 is : $(b-1)+B_n-A_n$, where b is the base. In the preferred embodiment of the present invention, the base is four. Such format is based on the following two assumptions.

Assumptions

I) a borrow from x by the dit of next-lowest significance is implide for each dit except the least significant dit of the intermediate difference; and II) every dit x will require a borrow from the dit of the next-higher significance.

Considering the first assumption in isolation, the borrow results in 1 being subtracted ("borrowed") from dit n. This first borrow conceptually adds the base to dit n−1. The first assumption therefore results in subtraction of 1 from the intermediate difference for dit n, providing a pre-correction format of $(-1)+(B_n-A_n)$. The latter assumption results in the base, b, being subtracted ("borrowed") from dit n+1 and added to dit n. Combining the second assumption with the first, the pre-correction format of the present invention therefore becomes $(b-1)+(B_n-A_n)$. The "Pre-Corr. Diff" column of Table 9 illustrates that the output of gate 900 conforms to this pre-correction format.

Least Significant Dit—Subtraction using Four's Complement.

Table 9(b) sets forth the subtraction truth table for the four's complement subtraction circuit of gates 910, 920, 930, and 940, which perform subtraction of two 1-of-4 numbers, A and B, by adding the four's complement of A to B in order derive the two-bit difference of B−A. This processing is always performed by gate 910 on Dit 0 during a subtract operation and may also be performed for other dits acting as the LSD for a partition grouping by gates 920, 930, and 940. In Table 9(b), A and B are represented in both decimal and 1-of-4 representations. The "‾A" column of Table 9(b) represents the three's complement value of the subtrahend, A, and the "‾A+1" column represents the four's complement value of A. The "‾A+1 (1-of-4)" column represents the four's complement of A in 1-of-4 representation. The "Pre-corr. Diff." column represents the difference of B−A, represented in a pre-correction format discussed in detail below. The "Diff." column represents the difference in post-correction decimal format.

TABLE 9(b)

| B | B (1-of-4) | A | A (1-of-4) | ‾A | ‾A + 1 | ‾A + 1 (1-of-4) | Pre-Corr. Diff (B − A) | Diff (B − A) |
|---|---|---|---|---|---|---|---|---|
| 0 | 0001 | 0 | 0001 | 3 | 4 | 0001* | 0* | 0 |
| 1 | 0010 | 0 | 0001 | 3 | 4 | 0001* | 1* | 1 |
| 2 | 0100 | 0 | 0001 | 3 | 4 | 0001* | 2* | 2 |
| 3 | 1000 | 0 | 0001 | 3 | 4 | 0001* | 3* | 3 |
| 0 | 0001 | 1 | 0010 | 2 | 3 | 1000 | 3 | −1 |
| 1 | 0010 | 1 | 0010 | 2 | 3 | 1000 | 0* | 0 |
| 2 | 0100 | 1 | 0010 | 2 | 3 | 1000 | 1* | 1 |
| 3 | 1000 | 1 | 0010 | 2 | 3 | 1000 | 2* | 2 |
| 0 | 0001 | 2 | 0100 | 1 | 2 | 0100 | 2 | −2 |
| 1 | 0010 | 2 | 0100 | 1 | 2 | 0100 | 3 | −1 |
| 2 | 0100 | 2 | 0100 | 1 | 2 | 0100 | 0* | 0 |
| 3 | 1000 | 2 | 0100 | 1 | 2 | 0100 | 1* | 1 |
| 0 | 0001 | 3 | 1000 | 0 | 1 | 0010 | 1 | −3 |
| 1 | 0010 | 3 | 1000 | 0 | 1 | 0010 | 2 | −2 |
| 2 | 0100 | 3 | 1000 | 0 | 1 | 0010 | 3 | −1 |
| 3 | 1000 | 3 | 1000 | 0 | 1 | 0010 | 0* | 0 |

The values in the "Pre-Corr. Diff" and "~A+1 (1-of-4)" columns denoted by asterisks are mod 4 values of a difference that is too large to be represented in two bits. Conceptually, these cases generate a carry into the next higher-order dit, where such carry represents a value of four. Gates 910, 920, 930, and 940 perform four's complement subtraction in the following manner. Each block of B inputs in FIGS. 10 through 13 have been labeled with the conceptual value of the A input. The leftmost block of B inputs in FIGS. 10 through 13, corresponding to a normal addition value of "0" for A and a three's complement addition value of "3" for A and unused for four's complement addition, has been labeled as the "+0" block. From left to right, the remaining blocks have been labeled as the "+1", "+2", "+3", and "+4" blocks, respectively. For subtraction, the $A_0$ input is coupled to the "+4" block. Because the four's complement of zero is four (i.e., 3−0=3;3+1=4), the addition of four to the B input when the value of $A_n$ is zero effectuates the conversion of A to a four's complement value before it is added to B. Table 11(b) illustrates that the output of gates 910, 920, 930 and 940 in such a case will be the value of B, with a carry generated. Therefore, it is apparent that the novel four's complement subtraction circuits depicted in FIGS. 10 through 13 properly perform four's complement subtraction in gates 910, 920, 930, and 940, when a dit is acting as the LSD on a partition boundary.

Pre-correction Format for Four's Complement Subtraction

The values set forth in the "Pre. Corr. Diff" column of Table 9 (b) represent the present invention's pre-correction format for four's complement subtraction. Rather than three's complement subtraction, gate 910 performs four's complement subtraction to implement the least significant dit (LSD) of the subtraction operation. Gates 920, 930, and 940 will also perform four's complement subtraction when acting as an LSD gate. Since there will never be a borrow out of the LSD by a less significant dit, gate 910 only implements Assumption II listed above, and not Assumption I. Similarly, when gates 920, 930, and 940 are acting as LSD gates, they also implement only Assumption II for subtraction, and not Assumption I. Assumption II results in the base, b, being subtracted ("borrowed") from dit n+1 and added to dit n. The pre-correction format for the intermediate difference for gate 910, represented in the "Pre-Corr. Diff" column of Table 9(b), is therefore $b+B_n-A_n$, where b is the base, which is 4. Table 9(b) illustrates that the output of gate 910 conforms to this pre-correction format, as do the four's complement subtraction logic paths for gates 920, 930, and 940.

Level One Borrow Propagate Logic

During subtraction, the Level One gates 900, 910, 920, 930, 940 generate a (H)alt-(P)ropagate-G(enerate) signal for each dit in addition to the intermediate difference in the pre-correction formats discussed above. In order to understand the present invention's operation regarding the setting of the H, P, and G signals for subtraction, it is useful to keep in mind the various conceptual transfers of data that may occur during a subtract operation. Example 1 sets forth these conceptual transfers among three dits in a subtract operation, the LSD, dit n, and dit n+1.

EXAMPLE 1

In Example 1, W represents a borrow from Dit n+1 into Dit n. Such borrow will conceptually subtract one from the value of Dit n+1 and will conceptually add a value equal to the base (in this case, four) to the value of Dit n. The borrow depicted by W in Example 1 illustrates the application of Assumption I discussed above to Dit n+1. Likewise, data transfer W also illustrates the application of Assumption II to Dit n. Similarly, X represents a borrow from Dit n into the LSD. Data transfer X therefore represents the application of Assumption I to Dit n and the application of Assumption II to the LSD.

Still referring to Example 1, data transfer Y represents a carry from Dit n into Dit n+1. Such carry will decrement the base (four) from the value of Dit n and will add one to Dit n+1. The carry represented in Y will occur whenever the intermediate difference for Dit n is too large to be represented with two bits. Similarly, Z represents a carry from the LSD into Dit n.

Example 1 also illustrates that there will never be a borrow out of the LSD because there is no dit to the right of the LSD. This is the reason that the four's-complement Level One gate 910 illustrated in FIG. 10 and the four's complement subtraction circuits of gates 920, 930, and 940 apply only Assumption II, and not Assumption I, to generate the four's complement pre-correction format.

Keeping the foregoing assumptions and data transfers in mind, we now turn to the present invention's setting of the H, P, and G indicators for subtract operations. In the subtraction operation of the present invention, an H signal relates to the concept of "borrowing." A borrow is the complement of a generate associated with addition. Conceptually, the action of a borrow from dit n is to decrement the value of the difference for dit n in the final level of logic in a subtractor, after all borrows have been propagated—just as a G signal that propagates to a given dit position in addition will increment the value of the sum for dit n.

Regarding the H signal, it is important to note that, as stated in Assumption II above, the present invention assumes that the intermediate difference generated for any dit n will be incremented via a borrow. In other words, there is an implied assumption that there will be a borrow by dit n from the dit of next-higher significance (n+1). Assumption II therefore assumes that the data transfer denoted by W in Example 1 will always occur. Accordingly, the intermediate difference for dit n created by the present invention contains an "implied borrow." The H(alt) signal associated with the subtraction operation on dit n simply means that, for a dit n, the implied borrow out of the dit of next-higher significance (n+1) will indeed take place as assumed. The H signal will be set when the intermediate sum of dit n is a negative number, indicating that a borrow must occur. H will be set when $B_n < A_n$.

A G signal in subtraction corrects the implied borrow described above, if the borrow was unnecessary, by indicating that the intermediate difference for dit n should be incremented by one. In other words, a G signal indicates that the carry denoted by Y in Example 1 should occur to offset the unnecessary borrow denoted by data transfer W in Example 1. For elaboration, consider the example set forth in Table 10 below. Table 10 shows two consecutive dits in a subtract operation, the LSD and the dit of next-higher significance, dit n. The value of $B_{LSD}$ is 3, the value of $B_n$ is 1, the value of $A_{LSD}$ is 1, and the value of $A_n$ is 2.

TABLE 10

|   | Step 1 |   | Step 2 |   | Step 3 |   | Step 4 |   | Step 5 |   |
|---|---|---|---|---|---|---|---|---|---|---|
|   | n | LSD | n | LSD | n | LSD | n | LSD | n | LSD |
| B | 1 |   | 11 |   | 10 | 13 | 10 |   | 12 |   |
| −A | 3 |   | 3 |   | 2 | 1 | 13 |   | 13 |   |
|   | 2 | 1 | 2 |   |   |   | 2 |   | 1 |   |
|   |   |   | 1 |   |   |   | 1 |   | 1 |   |
| Int. Diff. | — | — | — |   | — |   | 2 |   | 3 |   |
|   |   |   |   |   |   |   | 12 |   | 2 |   |

The first step of Table 10 shows the two dits to be subtracted. Step 2 illustrates the borrow into dit n from the next-higher dit, dit n+1 (not shown), which results in a value of 11 for $B_n$. The value of 11 is the base four representation of 5 (i.e., 5 MOD 4), and 5 is the result of adding the borrowed four to the original value (1) of $B_n$. Step 2 therefore corresponds to the application of Assumption II to dit n, which is depicted as data transfer W in Example 1. Step 2 also corresponds to the application of Assumption I to dit n+1 (not shown).

The third step of Table 10 illustrates the borrow into LSD from dit n and shows that such borrow has two effects. First, the borrow decrements one from $B_n$, resulting in a value of 10 for $B_n$. This first effect corresponds to the application of Assumption I to dit n. Second, the borrow illustrated in Step 3 also results in the addition of four to the original value of $B_{LSD}$, with a resultant value of 7, which has a base four representation of 13. This second effect corresponds to the application of Assumption II to the LSD. Both effects are illustrated by data transfer X in Example 1.

The fourth step of Table 10 illustrates the result of ditwise subtraction on dit n and the LSD after the borrow assumptions have been applied. The intermediate difference for the LSD generates a carry because the result of the subtraction results in a value for the LSD that is greater than the base. The intermediate difference for the LSD is 12, which is the base four representation of 6.

Step 5 illustrates the carry from the LSD back into dit n. This carry corresponds to data transfer Z shown in Example 1. This carry will correct the initial borrow out of dit n that was illustrated in Step 1, and depicted as data transfer X in Example 1. In Step 5, the carry results in 1) the intermediate difference for dit n being incremented by one; and 2) the intermediate difference for the LSD being decremented by four, which is the base. The borrow from dit n into the LSD is unnecessary any time that $B_n > A_n$ ($B_n \geq A_n$ in the case of the LSD). Accordingly, the present invention sets the G bit to generate a carry any time $B_n > A_n$ ($B_n \geq A_n$ in the case of the LSD), thereby correcting unnecessary Assumption I borrows.

The P signal, for subtraction, means the same thing as it does for addition. That is, whether or not a carry will be generated out of dit n depends on whether there is a carry into dit n. P will be set when $B_n = A_n$.

The state of the H, P, and G bits for each combination of inputs into any dit of the present invention not acting as an LSD is set forth in Table 11. FIG. 9 illustrates a gate 900 that does not ever act as an LSD and whose outputs always conform to Table 11. FIGS. 11, 12, and 13 illustrate that the outputs of the circuits of the present invention that implement subtraction and borrow propagate logic for dits not acting as the least significant dit conform to Table 11.

TABLE 11

| B | B (1-of-4) | A | A (1-of-4) | ¯A | ¯A (1-of-4) | Pre-Corr. Diff (B − A) | Diff | H $B_n < A_n$ | P $B_n = A_n$ | G $B_n > A_n$ |
|---|---|---|---|---|---|---|---|---|---|---|
| 0 | 1000 | 0 | 1000 | 3 | 0001 | 3 | 0 | 0 | 1 | 0 |
| 1 | 0100 | 0 | 1000 | 3 | 0001 | 0* | 1 | 0 | 0 | 1 |
| 2 | 0010 | 0 | 1000 | 3 | 0001 | 1* | 2 | 0 | 0 | 1 |
| 3 | 0001 | 0 | 1000 | 3 | 0001 | 2* | 3 | 0 | 0 | 1 |
| 0 | 1000 | 1 | 0100 | 2 | 0010 | 2 | −1 | 1 | 0 | 0 |
| 1 | 0100 | 1 | 0100 | 2 | 0010 | 3 | 0 | 0 | 1 | 0 |
| 2 | 0010 | 1 | 0100 | 2 | 0010 | 0* | 1 | 0 | 0 | 1 |
| 3 | 0001 | 1 | 0100 | 2 | 0010 | 1* | 2 | 0 | 0 | 1 |
| 0 | 1000 | 2 | 0010 | 1 | 0100 | 1 | −2 | 1 | 0 | 0 |
| 1 | 0100 | 2 | 0010 | 1 | 0100 | 2 | −1 | 1 | 0 | 0 |

TABLE 11-continued

| B | B (1-of-4) | A | A (1-of-4) | ⁻A | ⁻A (1-of-4) | Pre-Corr. Diff (B − A) | Diff | H $B_n < A_n$ | P $B_n = A_n$ | G $B_n > A_n$ |
|---|---|---|---|---|---|---|---|---|---|---|
| 2 | 0010 | 2 | 0010 | 1 | 0100 | 3 | 0 | 0 | 1 | 0 |
| 3 | 0001 | 2 | 0010 | 1 | 0100 | 0* | 1 | 0 | 0 | 1 |
| 0 | 1000 | 3 | 0001 | 0 | 1000 | 0 | −3 | 1 | 0 | 0 |
| 1 | 0100 | 3 | 0001 | 0 | 1000 | 1 | −2 | 1 | 0 | 0 |
| 2 | 0010 | 3 | 0001 | 0 | 1000 | 2 | −1 | 1 | 0 | 0 |
| 3 | 0001 | 3 | 0001 | 0 | 1000 | 3 | 0 | 0 | 1 | 0 |

It is apparent from Table 11 that the H signal is set for each situation where $B_n < A_n$ so that every instance where the "Diff" column of Table 11 shows a negative number, a borrow is indicated because the H bit is set for that row. Table 11 also shows that any time the "Pre-corr. Diff" column of Table 8 indicates a carry, the G bit is set in Table 11 for that row. That is, G is set every time $B_n > A_n$.

It should be noted that, for the LSD, P and H are equivalent because no generates or borrows will ever propagate into the LSD. An alternative embodiment of the LSD Level One gate illustrated in FIG. 10 could therefore collapse the H and P output signals into a single HALT/PROP output since they conceptually serve the same function in the LSD. An example of such an LSD subtractor gate is set forth in the copending Adder/Subtractor Patent.

Table 11(b) illustrates the outputs of the four's complement gate 910 illustrated in FIG. 10 and the four's complement subtraction logic paths for gates 920, 930, and 940, which are illustrated in FIGS. 11, 12, and 13, respectively. Gate 910 of the present invention implements subtraction and borrow propagate logic for the LSD of the A and B operands and gates 920, 930, and 940 implement four's complement subtraction when they are processing dits that are acting as the LSD on a partition boundary. The outputs of gate 910, as well as the outputs of the four's complement logic paths of gates 920, 930, and 940, comprising the pre-corrected intermediate difference, H, P, and G, conform to Table 11(b).

complement before adding the minuend to the subtrahend. Table 11(b) shows that, in all cases where a carry is generated, the G signal is set for four's complement addition.

In sum, the Level One gates, 900, 910, 920, 930, 940 utilize N-NARY logic to perform both addition and subtraction within one gate. FIG. 9 illustrates an embodiment of a Level One combined sum/HPG gate 900 that implements the add, carry propagate, subtract (three's complement), and borrow propagate functions, discussed above, into one gate. This gate 900 may be used for any dit that will never act as the LSD for a partition grouping. FIG. 10 illustrates an embodiment of a Level One LSD combined sum/HPG gate 910 that implements the add, carry propagate, subtract (four's complement), and borrow propagate functions, discussed above, into one gate. FIG. 14 illustrates that this gate 910 is used to process the LSD, which always requires four's complement arithmetic for subtraction. FIGS. 11, 12, and 13 illustrate embodiments of specialized Level One combined sum/HPG gates 920, 930, 940 that implement the add, carry propagate, subtract (three's complement and four's complement), and borrow propagate functions. It will be noted from FIGS. 9 through 13 that the inputs into the Level One gates 900, 910, 920, 930, 940 comprise a 1-of-2 ADD/SUB selector and two two-bit (one-dit) operands, A and B. The value of the 1-of-2 ADD/SUB selector determines whether the gate 900, 910, 920, 930, 940 will perform subtraction or addition. FIGS. 11 through 13 illustrate that TABLE 11(b)

| B | B (1-of-4) | A | A (1-of-4) | ⁻A | ⁻A + 1 | ⁻A + 1 (1-of-4) | Pre-Corr. Diff (B − A) | Diff (B − A) | H | P | G |
|---|---|---|---|---|---|---|---|---|---|---|---|
| 0 | 0001 | 0 | 0001 | 3 | 4 | 0001* | 0* | 0 | 0 | 0 | 1 |
| 1 | 0010 | 0 | 0001 | 3 | 4 | 0001* | 1* | 1 | 0 | 0 | 1 |
| 2 | 0100 | 0 | 0001 | 3 | 4 | 0001* | 2* | 2 | 0 | 0 | 1 |
| 3 | 1000 | 0 | 0001 | 3 | 4 | 0001* | 3* | 3 | 0 | 0 | 1 |
| 0 | 0001 | 1 | 0010 | 2 | 3 | 1000 | 3 | −1 | 0 | 1 | 0 |
| 1 | 0010 | 1 | 0010 | 2 | 3 | 1000 | 0* | 0 | 0 | 0 | 1 |
| 2 | 0100 | 1 | 0010 | 2 | 3 | 1000 | 1* | 1 | 0 | 0 | 1 |
| 3 | 1000 | 1 | 0010 | 2 | 3 | 1000 | 2* | 2 | 0 | 0 | 1 |
| 0 | 0001 | 2 | 0100 | 1 | 2 | 0100 | 2 | −2 | 1 | 0 | 0 |
| 1 | 0010 | 2 | 0100 | 1 | 2 | 0100 | 3 | −1 | 0 | 1 | 0 |
| 2 | 0100 | 2 | 0100 | 1 | 2 | 0100 | 0* | 0 | 0 | 0 | 1 |
| 3 | 1000 | 2 | 0100 | 1 | 2 | 0100 | 1* | 1 | 0 | 0 | 1 |
| 0 | 0001 | 3 | 1000 | 0 | 1 | 0010 | 1 | −3 | 1 | 0 | 0 |
| 1 | 0010 | 3 | 1000 | 0 | 1 | 0010 | 2 | −2 | 1 | 0 | 0 |
| 2 | 0100 | 3 | 1000 | 0 | 1 | 0010 | 3 | −1 | 0 | 1 | 0 |
| 3 | 1000 | 3 | 1000 | 0 | 1 | 0010 | 0* | 0 | 0 | 0 | 1 |

Table 11(b) shows that the H signal is set for four's complement addition any time that (B +1)<A. If B=A−1, then the P signal is set. Table 11 also shows that the G signal is set when A=B. These three conditions for setting H, P, and G are true, and differ from the conditions shown in Table 11, because four's complement addition increments the three's gates 920, 930, and 940 also receive as inputs the 1-of-4 S8/S16/S32/S64 partition size control signal. This signal is used to determine whether, when SUB is asserted, three's complement or four's complement subtraction is required.

The combined add/subtract function of the Level One gates 900, 910, 920, 930, 940 is performed as follows. The basic Level One gate 900 comprises four sets, referred to as "nodes", of the four wires comprising the B input, $B_3$, $B_2$, $B_1$, $B_0$. Each of the remaining Level One gates 910, 920, 930, 940 comprise five sets of the four-wire nodes comprising the B input, since they must have the capability to perform four's complement subtraction. In gate 900, each of the wires $A_3$, $A_2$, $A_1$, $A_0$, for input A are connected to two separate nodes of the B input wires. In FIGS. 9 through 13, each node of B input wires has been labeled with the conceptual value of the A input associated with that node for the addition function. For instance, the leftmost node of B input wires in FIGS. 9 through 13, corresponding to an addition value of "0" for A, is labeled as the "+0" node. From left to right in FIGS. 9 and 10, the succeeding nodes of B input wires have been labeled as the "+1", "+2", "+3" blocks, respectively. Finally, the remaining node of B inputs for gates 910, 920, 930, 940 have been labeled as Block "+4."

In all Level One gates 900, 910, 920, 930, 940, the value of the ADD/SUB selector will determine which A input line corresponds to each node of B input wires. For instance, in gate 900, although the $A_0$ wire is coupled to the "+0" node for addition, the three's complement of zero, $A_3$, is coupled to the "+0" node for subtraction. FIG. 9 and Tables 6 and 11 illustrate that this novel scheme produces the desired results for both addition and subtraction. For instance, consider the add and subtract functions for $A_0$, which corresponds to an A input value of zero. If the ADD value is enabled for the ADD/SUB selector, the $A_0$ input value will be NAND'ed with the "+0" node B inputs. Thus, the value of B will be added to zero. In contrast, for subtraction the $A_0$ input is NAND'ed with the "+3" node of B inputs, representing the three's complement of A. If SUB value is enabled for the ADD/SUB selector, the three's complement of zero will therefore be added to the B input.

For gates 920, 930, and 940, the $A_0$ input is NAND'ed with the "+4" node of B inputs, representing the four's complement of $A_0$, when SUB is asserted and the partition size control indicator indicates that the dit being processed is acting as the LSD for a partition grouping.

Level One Configuration

FIG. 14 illustrates the configuration of logic gates for Level One. Each of the thirty-two dits of operands A and B are conceptually grouped into eight blocks containing four dits each. These blocks are labeled in FIG. 14 as "Block 0," "Block 1," "Block 2," "Block 3," "Block 4," "Block 5," "Block 6," and "Block 7." Block 0, as used herein, refers to dits 0 through 3 of the A and B operands, as well as all Level One, Level Two, Level Three, and Level Four logic gates associated with said dits. Block 1, as used herein, refers to dits 4 through 7 of the A and B operands, as well as all Level One, Level Two, Level Three, and Level Four logic gates associated with said dits. Block 2, as used herein, refers to dits 8 through 11 of the A and B operands, as well as all Level One, Level Two, Level Three, and Level Four logic gates associated with said dits. Block 3, as used herein, refers to dits 12 through 15 of the A and B operands, as well as all Level One, Level Two, Level Three, and Level Four logic gates associated with said dits. Block 4, as used herein, refers to dits 14 through 19 of the A and B operands, as well as all Level One, Level Two, Level Three, and Level Four logic gates associated with said dits. Block 5, as used herein, refers to dits 20 through 23 of the A and B operands, as well as all Level One, Level Two, Level Three, and Level Four logic gates associated with said dits. Block 6, as used herein, refers to dits 24 through 27 of the A and B operands, as well as all Level One, Level Two, Level Three, and Level Four logic gates associated with said dits. Finally, Block 7, as used herein, refers to dits 28 through 31 of the A and B operands, as well as all Level One, Level Two, Level Three, and Level Four logic gates associated with said dits.

In addition to the conceptual grouping into blocks, FIG. 14 illustrates that the adder 101 of the present invention also may be conceptually be separated into halves. The lower half of the adder 101 comprises Block 0 through Block 3. The upper half of the adder 101 comprises Block 4 through Block 7.

Each of the eight Level One blocks contains three basic Level One gates 900 to process the three most significant dits within each block. Within each block, a specialized Level One gate, 910, 920, 930, or 940, is placed to process the least significant dit within each block. The LSD of Level One, Block 0 is processed by gate 910. The LSD of Level One, Block 1 is processed by gate 920*a*. The LSD of Level One, Block 2 is processed by gate 930*a*. The LSD of Level One, Block 3 is processed by gate 920*b*. The LSD of Level One, Block 4 is processed by gate 940. The LSD of Level One, Block 5 is processed by gate 920*c*. The LSD of Level One, Block 6 is processed by gate 930*b*. The LSD of Level One, Block 7 is processed by gate 920*d*. All dits that are processed by gate 920, that is, Dits 4,12, 20, and 28, may act as the LSD for an 8-bit partition. All dits that are processed by gate 930, that is, Dits 8 and 24, may act as the LSD for either an 8-bit or 16-bit partition. Gate 940 processes Dit 16, which may act as the LSD for an 8-bit, 16-bit, 32-bit partition.

In addition to the three standard Level One gates and the one specialized Level One gate for each block, Level One contains additional logic gates. The 1-of-4 B operand input into the MSD for each block is stored by Level One in a buffer 950. The B input into the MSD for Block 0 is stored in buffer 950*a*. The B input into the MSD for Blocks 1 through 7 are stored in buffers 950*b* through 950*h*, respectively. The B value stored in buffers 950*a* through 950*h* are used as inputs into the Level Two preliminary saturation detection gates, 970*a* through 970*h*, respectively, that are discussed below. In addition, the S8/S16/S32/S64 partition control signal is stored by Level One in buffer 950*i* for use by Blocks 0 through 3 and in buffer 950*j* for use by Blocks 4 through 7. Level One also comprises buffers 952*a* through 952*f* that store the value of the 1-of-2 ADD/SUB input into Block 0 through Block 7, respectively. Finally, Level One stores the value of the signed/unsigned/none saturation input in buffer 951*a* for later use by Blocks 0 through 3 and also stores the value in buffer 951*b* for later use by Blocks 4 through 7.

Level Two—Overview

The present invention's second level comprises logic that computes block-level HPG signals to reduce the complexity of carry computations. Generally, block HPG signal generation is executed to reduce the complexity of the "carry in" computation for each block of dits that occurs in Level Three logic. To do this, Level Two comprises gates 960, 961, 962, 963, 964 that perform block HPG processing. The basic function of the Level Two block HPG gates 960, 961, 962, 963, 964 is to perform "block HPG" logic to determine whether a carry will be propagated across dits of lesser significance into a particular dit of the intermediate sum. This block HPG logic takes into account any carry into the dit of interest that is generated by dits of lesser significance within the same partition grouping. These block HPG signals generated by Level Two are used by Level Four to determine if the intermediate difference for each dit should be incremented before final output.

In order to correctly perform block HPG processing in the present invention, it is necessary to prevent carries from propagating across partition boundaries. For instance, if the S8 wire of the partition size control signal is asserted, then the most significant dit for each 8-bit partition grouping will generate a (H)alt signal to prevent any carry out of the 8-bit partition grouping. Level Two therefore must perform both block HPG processing and partition detection logic for blocks that may lie on partition boundaries. To do this, three of the Level Two block HPG gates 960, 963, 964 combine block HPG signal generation logic with partition detection logic. The remaining Level Two block HPG gates 961, 962 do not perform partition detection logic because they will never lie on partition boundaries.

In addition to block HPG signal generation and partition detection, Level Two also performs preliminary saturation detection logic to determine whether a contingent or definite overflow or underflow will occur. Level Two utilizes preliminary saturation detection gates 970a through 970h to do this. Level Two therefore comprises three different types of gates: block HPG gates 961, 962, combined block HPG/partition detection gates 960, 963, 964 and saturation detection gates 970a through 970h.

Block HPG Signal Generation/Partition Detection

The efficiency of block-level HPG logic in the Second Level is revealed when the carry-in calculation for each dit is examined. Referring back to Equ. 1, above, the Carry into a bit, $C_{n-1}$, is calculated as:

$$C_{n-1} = G_{n-1} | P_{n-1} G_{n-2} | P_{n-1} P_{n-2} G_{n-3} | \ldots | P_{n-1} P_{n-2} \ldots P_1 G_0. \quad (5)$$

Equation 5 illustrates that any carry can theoretically be determined from propagate and generate signals using a single level of logic. To do so, however, becomes impractical for any substantial adder because the size of the carry gate becomes impractical for one level of logic. For instance, in a 64-bit adder, Equation 5 mindicates that 63 AND terms would be required with the largest term containing 63 literals. To reduce the complexity of the carry computation, the Second Level of the present invention constrains the scope of the computation to blocks of 4 dits each. This simplifies the gates required in return for the cost of adding more levels of logic to the critical path.

FIG. 14 illustrates that each block except the most significant block, Block 7, must generate an indicator for higher-order blocks to indicate whether a carry has propagated out of the block of interest. Depending on partition size, a carry may not propagate out of the block. For instance, FIG. 14 illustrates that a carry may propagate out of Dit 7 if 16-bit partitioning is selected, but not if 8-bit partitioning is selected. By the same token, FIG. 14 also illustrates that a carry may propagate out of Dit 15 only if 64-bit partitioning is selected, but not for any other partition selection (i.e., 8-bit, 16-bit, or 32-bit). And, of course, a carry will never propagate out of any block if 8-bit partitioning is selected. FIG. 14 shows that, on each 8-bit boundary of the intermediate sum, Level Two uses a four-dit combined block HPG/partition detection gate 960, 963, or 964 to combine the HPG signals from all 4 dits within the block to determine whether a carry would ordinarily be generated out of the four-dit block. These Level Two combined block HPG/partition detection gates 960, 963, 964 utilize the partition size control signal to determine whether such carry should propagate out of the four-dit block, given the selected partitioning.

FIG. 14 further illustrates that Level Two comprises 3-block HPG gates 961 and 2-block HPG gates 962 that determine whether a carry should propagate into a dit from other dits within the same block. These gates 961, 962 are used in Level Two for dits that never lie on partition boundaries. For this reason, these gates 961, 962 do not perform partition detection logic.

Figure 15:
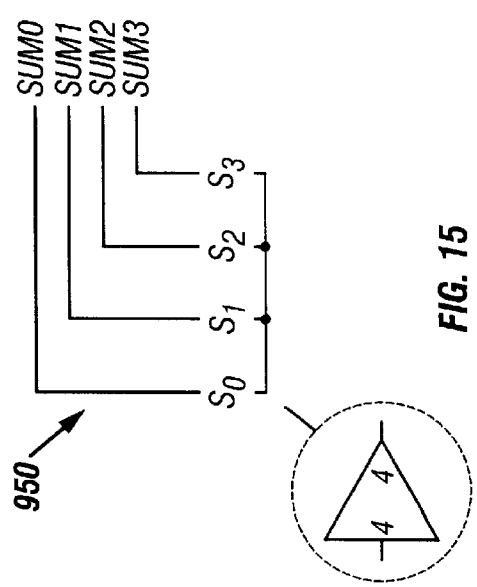
FIG. 15 is a shorthand representation of a sum buffer that buffers a 1-of-4 value.

FIG. 14 further illustrates that, because block HPG signal generation and saturation detection are the main focuses of Level Two, most of the intermediate sums calculated for each dit in Level One are stored in sum buffers 950 by Level Two. These sums will also be stored in sum buffers 950 in Level Three, and will be used in Level Four. FIG. 15 illustrates a sum buffer 950 of the present invention.

Saturation Detection

FIG. 14 illustrates that, in addition to the gates 960a through 960g that generate block HPG signals, Level Two also comprises gates 970a through 970h that perform preliminary saturation detection. These gates first determine whether saturation, signed or unsigned, has been selected. If so, then the gates determine whether the two operand dits will produce a contingent or definite underflow or overflow. These Level Two preliminary saturation detection gates 970a through 970h produce a 1-of-5 signal that comprises wires for contingent overflow (OF?), definite overflow (OF!), contingent underflow (UF?), definite underflow (UF!), or no overflow nor underflow (N). This 1-of-5 signal is sometimes referred to herein as the "preliminary saturation indicator."

Level Two Logic Gates

Figure 18:
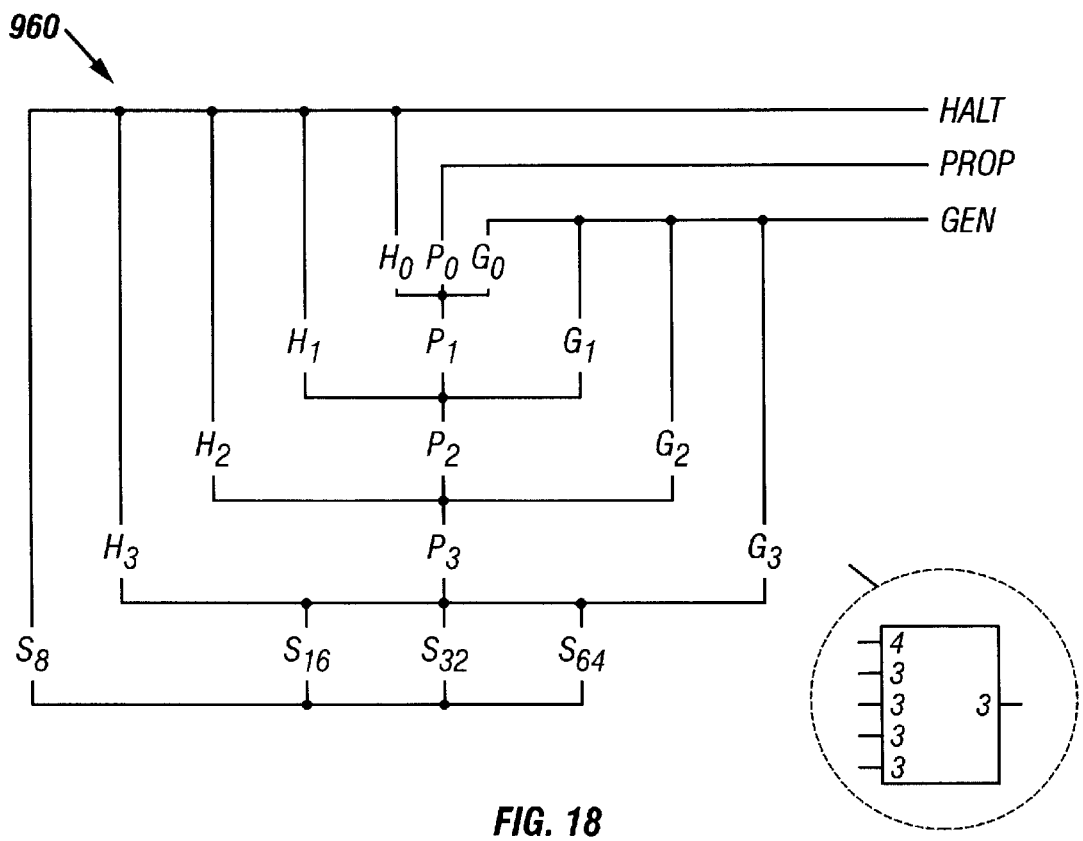
FIG. 18 is a shorthand representation of a four-input Level Two combined block HPG/partition detection gate for 8-bit partitioning.
Figure 19:
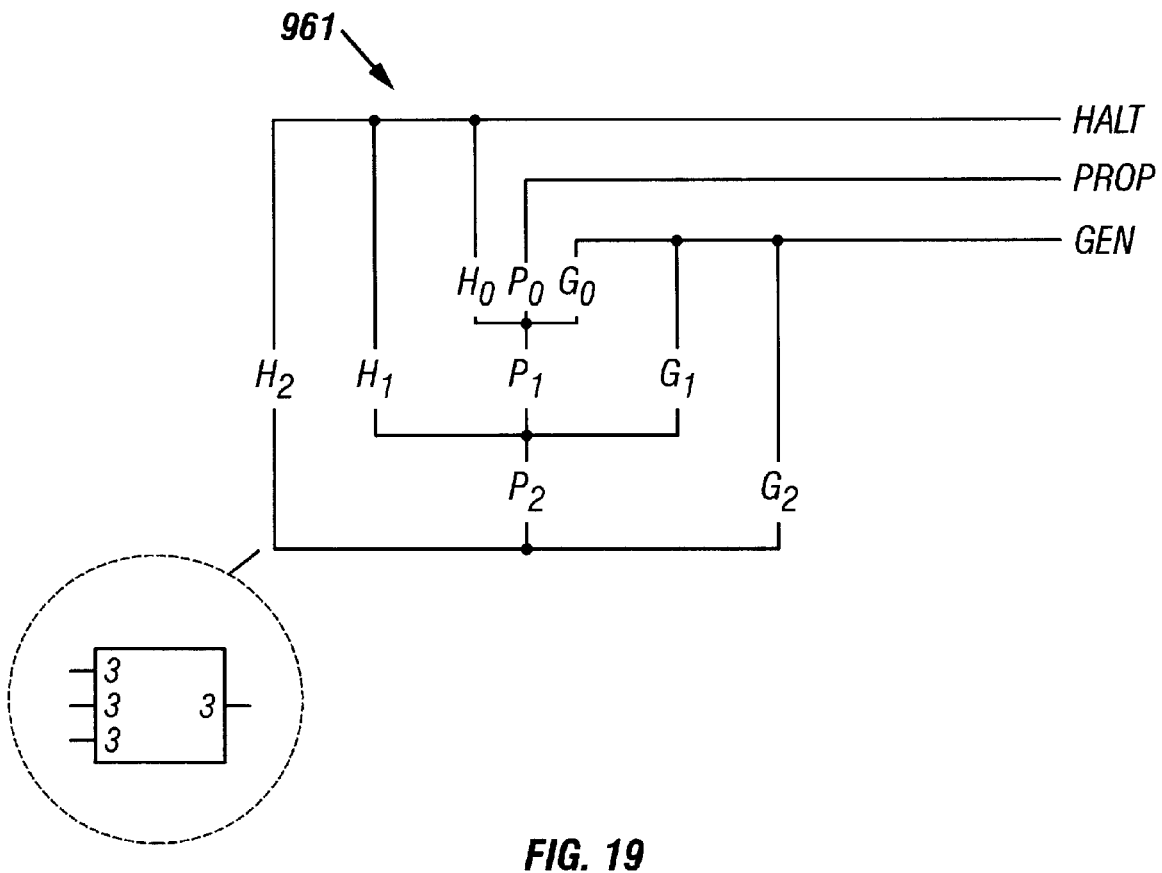
FIG. 19 is a shorthand representation of a three-input Level Two combined block HPG/partition detection gate.
Figure 20:
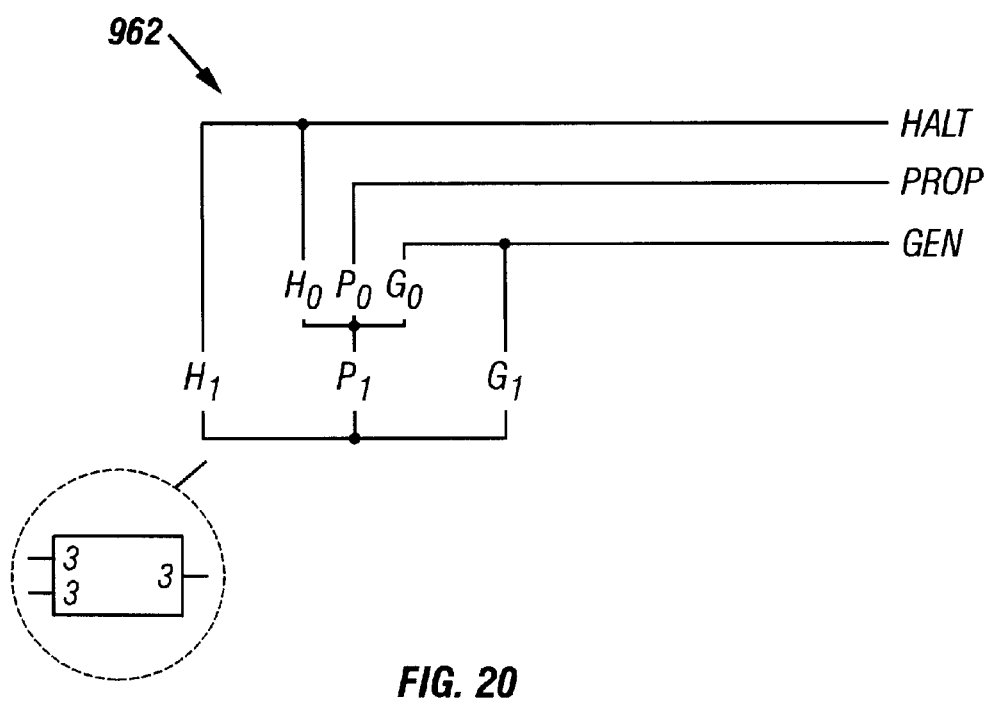
FIG. 20 is a shorthand representation of a two-input Level Two combined block HPG/partition detection gate.
Figure 21:
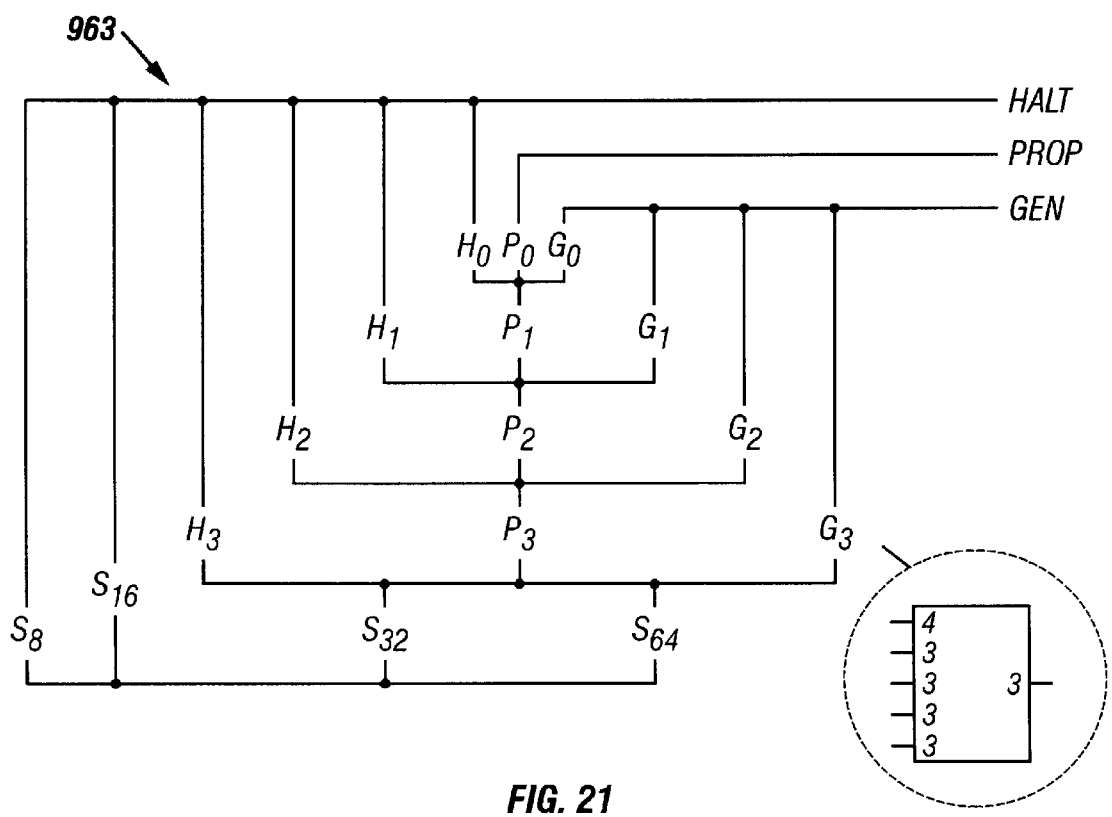
FIG. 21 is a shorthand representation of a four-input Level Two combined block HPG/partition detection gate for 8-bit or 16-bit partitioning.
Figure 22:
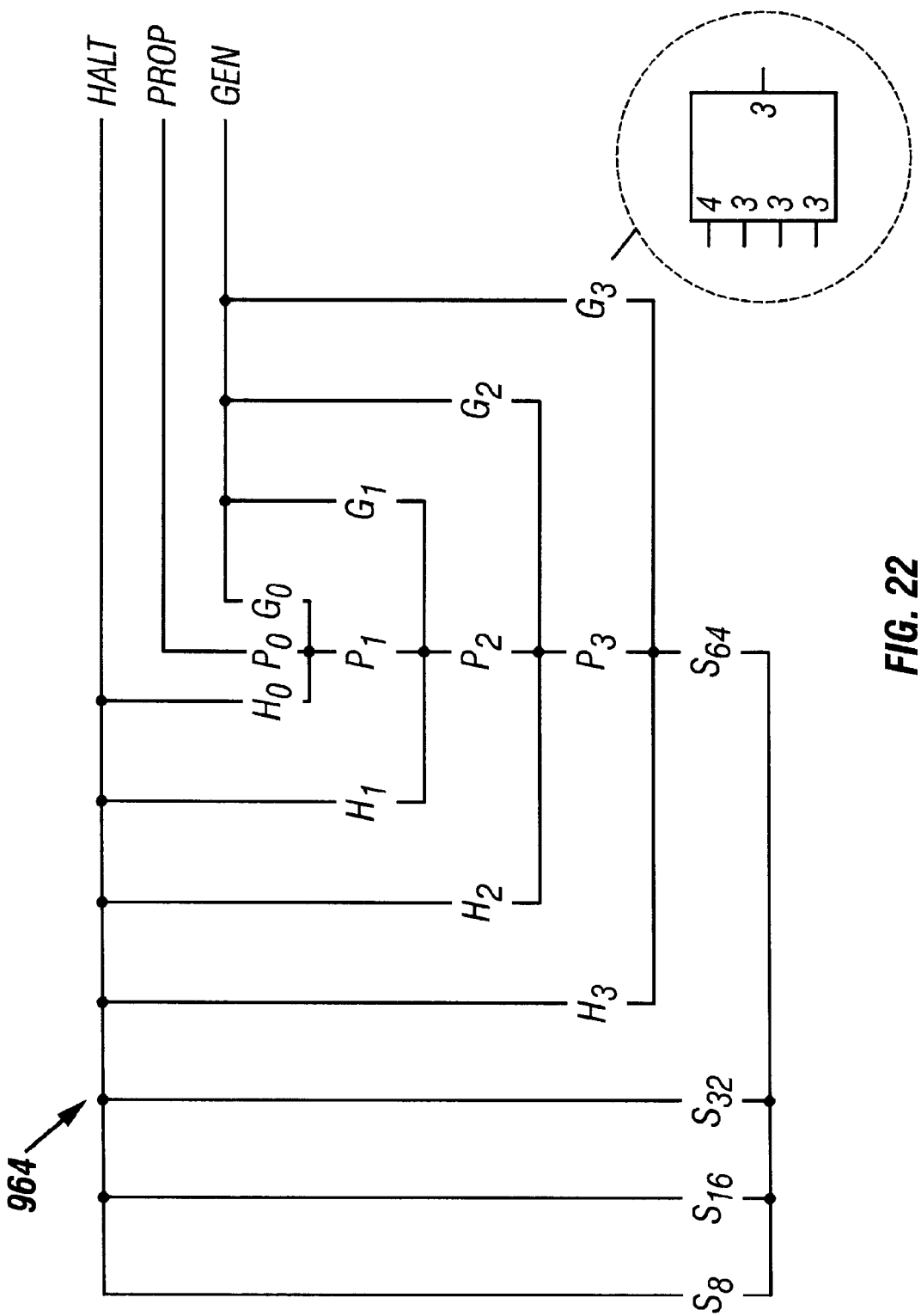
FIG. 22 is a shorthand representation of a Level Two combined block HPG/partition detection gate for 8-bit, 16-bit, or 32-bit partitioning.

The Level Two block HPG gates 961, 962 of the present invention's second logic level are shown in FIGS. 19 and 20. The Level Two combined block HPG/partition detection gates 960, 963, 964 are shown in FIGS. 18, 21, and 22, respectively. Both the former and the latter gates compute block-level HPG signals based on the individual HPG signals generated for each dit by the first level of logic. The Level Two HPG gates 960, 961, 962, 963, 964 are of varying sizes. FIG. 14 illustrates that the largest Level Two gates 960, 963, 964 are used to calculate the block HPG signal for an entire four-dit block. Each of these larger gates 960, 963, 964 also prevents propagation of HPG signals across partition boundaries, with each performing a slightly different version of partition detection logic. The Level Two combined block HPG/partition detection gates 960, 963, 964 therefore receive as an input the 1-of-4 S8/S16/S32/S64 partition size control signal. FIG. 14 illustrates that one of these combined block HPG/saturation detection gates 960, 963, or 964 is used as the most significant gate within each of the Level Two blocks, except the most significant block, Block 7. (There is no need for a block HPG signal out of the most significant block). Each of the Level Two combined block HPG/partition detection gates 960, 963, 964 will be discussed in further detail below.

The smaller block HPG gates 961, 962 illustrated in FIGS. 19 and 20 are used within a Level Two block to compute HPG indicators for dit positions not on block boundaries. Because they do not fall on block boundaries, the smaller Level Two block HPG gates 961, 962 do not possess partition detection capabilities.

The smallest Level Two HPG gate 962 illustrated in FIG. 20 calculates the carry into a particular dit based on the HPG signals for the two adjacent dits of lesser significance within the block in which the dit of interest lies. FIG. 20 illustrates that this two-input Level Two HPG gate 962 receives as inputs two 1-of-3 HPG signals. The first signal, noted as HPG1 in FIG. 20, comprises three wires labeled as H1, P1, and G1. FIG. 14 illustrates that the HPG1 signal delivers to gate 962 the HPG signal for the dit immediately adjacent (less significant) than the dit of interest. The second HPG input into the two-input Level Two HPG gate 962, noted as HPG0 in FIG. 20, comprises three wires labeled as H0, P0, and G0. FIG. 14 illustrates that the HPG0 signal delivers to gate 962 the HPG signal from the second dit less significant than the dit of interest. FIG. 20 illustrates that if the H1 signal is asserted, signifying a halt signal from the adjacent dit, then the HALT output signal is asserted. If the G1 signal is asserted, signifying a generate signal from the adjacent dit, then a GEN signal output signal is asserted. If the P1 input signal is asserted, then the HPG0 signal must be evaluated. FIG. 14 illustrates that if P1 and H0 are asserted, a halt signal has propagated, from the dit of second lesser significance, across the immediately adjacent dit. In such a case, the two-input Level Two HPG gate 962 asserts the HALT output signal. If P1 and G0 are asserted, then a generate signal has propagated, from the dit of second lesser significance, across the immediately adjacent dit. In such a case, the two-input Level Two HPG gate 962 asserts the GEN signal output. If P1 and P0 are both asserted, then a PROP output is asserted by gate 962.

FIG. 19 illustrates that the operation of the three-input Level Two HPG gate 961 is essentially the same as that of the two-input Level Two HPG gate 962 discussed above, except that the three-input Level Two HPG gate 961 receives as inputs three 1-of-3 HPG signals instead of two. As with the two-input gate 962, FIG. 19 illustrates that the three-input Level Two HPG gate 961 generates a HALT output if it encounters an H input from the immediately adjacent dit, generates a GEN output if it encounters a G input from the immediately adjacent dit, and goes on to evaluate the HPG signal for a dit of lesser significance if it encounters a P input from the immediately adjacent dit.

FIGS. 18, 21, and 22 illustrate four-input Level Two combined block HPG/partition detection gates 960, 963, 964 that not only generate a block HPG signal but also perform partition detection logic. FIGS. 18, 21 and 22 illustrate that, in order to perform partition detection logic, the four-input Level Two combined block HPG/partition detection gates 960, 963, 964 not only receive four 1-of-3 HPG signals as inputs, but also receive the 1-of-4 S8/S16/S32/S64 partition size control signal. FIG. 18 illustrates that gate 960, if the S8 wire of the partition size control indicator is asserted, generates a HALT output in order to prevent any carry from propagating across a partition boundary. FIG. 21 illustrates that gate 963 likewise generates a HALT output if the S8 or S16 wire of the partition size control signal is asserted. Similarly, FIG. 22 illustrates that gate 964 generates a HALT output if the S8, S16, or S32 wires are asserted. FIGS. 18, 21, and 22 illustrate that, in each of the combined HPG/partition detection gates 960, 963, 964, if the partition detection logic does not force a HALT output, then the same block HPG signal generation logic is performed by all three gates 960, 963, 964. That is, the gates 960, 963, 964 generate a HALT output if they encounter an H input, generate a GEN output if they encounter a G input, and go on to evaluate the HPG signal for a dit of lesser significance if they encounter a P input.

Figure 23:
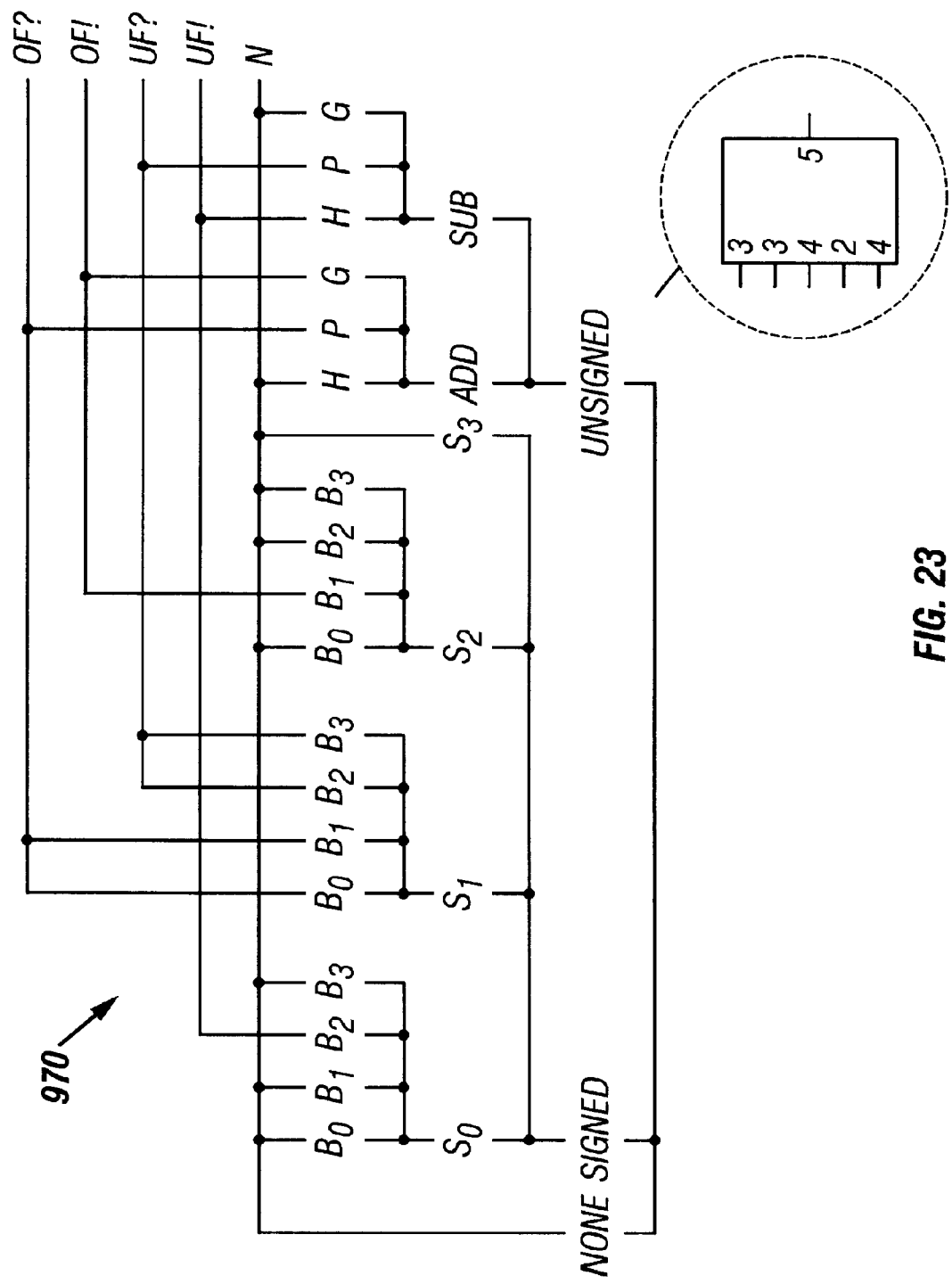
FIG. 23 is a shorthand representation of a preliminary saturation detection gate.

The saturation detection gate 970 of Level Two is illustrated in FIG. 23. This gate 970 performs logic to determine whether there will be an underflow or overflow from the 4-dit operation performed by each block of the present invention. The 1-of-5 saturation indicator produced by gate 970 is used in Level Three.

When performing saturating arithmetic, a key capability is the ability to detect whether saturation of the result is required. In other words, it is important to detect when an overflow or underflow will occur. Because the present invention performs both signed and unsigned arithmetic, it must detect saturation for both types of arithmetic. Gate 970 provides this capability. Gate 970 performs saturation detection on the dit level. For clarity, a preliminary discussion of bit level saturation detection logic is set forth herein before discussion the dit-wise logic of gate 970.

On a bit level, saturation detection techniques are less complex for unsigned arithmetic than those for signed arithmetic. For unsigned arithmetic, only the carry propagate signal for the most significant bit (MSB) of the intermediate sum need be examined. An overflow for unsigned addition occurs when the MSB of the intermediate sum generates a carry. That is, overflow will occur for unsigned addition when the sum of the two operand MSB's is too large to represent in one bit. An underflow for unsigned subtraction occurs any time that the preliminary difference is a negative number, since the minimum unsigned value is zero. An underflow for unsigned subtraction exists any time that A is greater than B and will therefore occur any time the MSB of the intermediate difference does not generate a carry. There will never be an overflow for unsigned subtraction nor an underflow for unsigned addition.

For signed arithmetic, saturation detection at the bit level requires examination of the carry into and carry out of the MSB (i.e., bit N) of the intermediate sum. The status of the carry into the MSB is determined by examining the HPG signal for bit N−1. The status of the carry out of the MSB is determined, of course, by examining the HPG signal for bit N, the MSB. If the two HPG values are the same, no saturation is required. If, however, there is carry indicated by one of the HPG signals, but not the other, then either an underflow (if $C_{N-1}=0$) or overflow (if $C_{N-1}=1$) will occur and the appropriate saturated result must be selected.

For a 1-of-4 approach, since two binary digits are represented in the most significant dit, certain information about overflow/underflow may be computed directly from the MSD's of the input operands. FIG. 14 shows that Level Two comprises a preliminary saturation detection gate 970 that processes the MSD of each block. For certain combinations of values of the most significant dits of the input operands, gate 970 can directly determine overflow or underflow, irrespective of the carry into the most significant dit. For other combinations, gate 970 must consider the HPG signal into the most significant dit. The former class is referred to as "definite", and the latter as "contingent". A contingent overflow becomes a definite overflow if the carry into the most significant dit equals 1; a contingent underflow becomes a definite underflow if the carry into the most significant dit equals 0.

Dit-Level Unsigned Saturation Detection

FIG. 23 illustrates that gate 970 possesses the capability to determine dit-level overflow and underflow for unsigned arithmetic. As with bit-level saturation detection, saturation detection for dit-level unsigned arithmetic is less complex than for signed arithmetic. For unsigned arithmetic, one need only ascertain whether the sum of the two MSD's of the operands will generate a number greater than can be represented in one dit (two bits). In other words, any time the sum of the two operand MSB's is greater than three, a definite overflow occurs. This overflow condition exists any time there is a carry out of the MSD of the intermediate sum. FIG. 23 illustrates that gate 970 asserts the definite overflow output wire, OF!, any time the HPG signal for the MSD of the intermediate sum of an unsigned addition operation has the (G)enerate wire asserted. In contrast, if the sum of the two operand MSD's is equal to three, then a contingent overflow is generated. That is, an overflow will only occur if there is a carry into the MSD of the preliminary sum. FIG. 23 illustrates that gate 970 asserts the contingent overflow output wire, OF?, when the P input wire is asserted for the MSD of the intermediate sum of an unsigned addition operation.

For unsigned dit-level subtraction, any time the difference of the two MSB's is less than zero, a definite underflow occurs. This definite underflow condition is indicated any time that the HPG signal for the MSD of the intermediate difference has the (H)alt wire asserted. FIG. 23 illustrates that, for such cases, gate 970 asserts the UF! output wire when the H and SUB input wires are asserted. If the difference of the MSD's of the two operands is equal to zero, then a contingent underflow condition exists. That is, an underflow condition will occur unless there is a carry into the MSD from dit N−1. FIG. 23 illustrates that, for such cases, gate 970 asserts the UF? output wire when the P and SUB input wires are asserted.

These underflow and overflow conditions for unsigned arithmetic illustrate the general rule (discussed above in connection with bit level saturation detection logic) that, any time there is a carry out of the MSD of the sum of two unsigned operands, then an overflow has occurred and that an underflow occurs any time there is not a carry out of the MSD for the difference of two unsigned operands. The various combinations of most-significant-dit values and saturation status for unsigned saturation are given in Table 12. In Table 12, the A and B operands are given in both decimal and 1-of-4 representations. Table 12 also sets forth the decimal representation of the unsigned sum and difference (B−A) of the operands and also sets forth the pre-correction difference and HPG signal for the difference. In Table 12, OF? and UF? signify contingent overflow and contingent underflow, respectively, "none" signifies that neither underflow nor overflow is generated, and OF! and UF! signify definite overflow and definite underflow, respectively.

definite overflow condition occurs every time the intermediate sum of the two unsigned operand MSD's generate a carry condition. Carry conditions are denoted in Table 12 with an asterisk in the "Sum" column. Table 12 and FIG. 23 further illustrate that a contingent overflow condition exists for unsigned addition every time the sum of MSD's of the operands equals three; that is, when the P input wire is asserted. Table 12 and FIG. 23 further illustrate that a definite underflow condition exists for unsigned subtraction every time the (H)alt input wire is asserted for the intermediate difference of the two MSD's. Also, Table 12 and FIG. 23 illustrate that the saturation detection gate 970 will indicate a contingent underflow for unsigned subtraction anytime the (P)ropagate signal is set for the intermediate difference, which occurs whenever A=B.

Dit-Level Signed Saturation Detection

In addition to the unsigned saturation detection logic described above, the Level Two preliminary saturation detection gate 970 also performs saturation detection logic for signed arithmetic. In contrast to unsigned arithmetic, either an underflow and overflow may occur for both addition and subtraction in signed arithmetic operations. The Level Two preliminary saturation detection gate 970 is therefore designed to capture all four signed saturation conditions: signed addition overflow, signed addition underflow, signed subtraction overflow, and signed subtraction underflow.

Regarding overflow detection for signed addition, FIG. 23 illustrates that the Level Two preliminary saturation detection gate 970, as a practical efficiency, examines as inputs the value of the B operand and the preliminary sum, S, of the operand dits. Conceptually, however, the values of the MSD of the two operands allow one to determine whether an overflow will occur as a result of signed addition. In signed arithmetic, the most significant bit of the MSD is reserved to represent the sign. As discussed above, an overflow will occur for signed addition any time the result of adding two

TABLE 12

Unsigned Saturation

| B (1-of-4) | B (Dec.) | A (1-of-4) | A (Dec.) | Sum (Dec.) B + A | Status (for add operations) | Pre-Corr Diff/HPG | Diff (Dec.) B − A | Status (for B − A subtract operations) |
|---|---|---|---|---|---|---|---|---|
| 0001 | 0 | 0001 | 0 | 0 | none | 3P | 0 | UF? |
| 0001 | 0 | 0010 | 1 | 1 | none | 2H | −1 | UF! |
| 0001 | 0 | 0100 | 2 | 2 | none | 1H | −2 | UF! |
| 0001 | 0 | 1000 | 3 | 3 | OF? | 0H | −3 | UF! |
| 0010 | 1 | 0001 | 0 | 1 | none | 0G | 1 | none |
| 0010 | 1 | 0010 | 1 | 2 | none | 3P | 0 | UF? |
| 0010 | 1 | 0100 | 2 | 3 | OF? | 2H | −1 | UF! |
| 0010 | 1 | 1000 | 3 | 0* | OF! | 1H | −2 | UF! |
| 0100 | 2 | 0001 | 0 | 2 | none | 1G | 2 | none |
| 0100 | 2 | 0010 | 1 | 3 | OF? | 0G | 1 | none |
| 0100 | 2 | 0100 | 2 | 0* | OF! | 3P | 0 | UF? |
| 0100 | 2 | 1000 | 3 | 1* | OF! | 2H | −1 | UF! |
| 1000 | 3 | 0001 | 0 | 3 | OF? | 2G | 3 | none |
| 1000 | 3 | 0010 | 1 | 0* | OF! | 1G | 2 | none |
| 1000 | 3 | 0100 | 2 | 1* | OF! | 0G | 1 | none |
| 1000 | 3 | 1000 | 3 | 2* | OF! | 3P | 0 | UF? |

FIG. 23 illustrates that the output of the Level Two preliminary saturation detection gate 970 conforms to Table 12. If the "unsigned" wire of the 1-of-3 "signed/unsigned/none" indicator input is asserted, then the gate 970 looks to the HPG signal to determine saturation status. For unsigned addition operations, Table 12 and FIG. 23 illustrate that a positive numbers yields a negative number. In other words, for any combination of MSD values that both have a value of zero in the MSB, a result that yields a value of one in the MSB indicates that an overflow has occurred. This will happen any time that the value of the MSD of both operands is 01 (i.e., decimal one). In such a case, the result of the addition places a value of one in the sign bit (indicating a negative number), whereas both operand values were positive. An illustration is set forth in Example 2 below.

EXAMPLE 2

| | Most Significant Dit | | |
|---|---|---|---|
| | Sign Bit | Second Bit of MSD | Decimal Value |
| MSD A | 0 | 1 | 1 |
| MSD B | 0 | 1 | 1 |
| Prelim. Sum | 1 | 0 | 2 |

Example 2 illustrates that, when the value of the MSD of both operands for a signed addition is a decimal value of one, an overflow condition occurs because the result of the addition operation places the value of "1" in the sign bit, whereas the value of the sign bit for both operands is 0. FIG. 23 illustrates that the Level Two preliminary saturation detection gate 970 accurately captures and reports such an overflow condition. FIG. 23 illustrates that, if the "signed" input wire is asserted and the "S2" wire is asserted and the "B1" wire is asserted, then a definite overflow is indicated by assertion of the "OF!" Wire. Restated as a logic equation for signed addition, OF!=S2 AND B1. FIG. 23 illustrates that the Level Two preliminary saturation detection gate 970 also accurately captures and reports contingent overflow conditions for signed addition. Keeping Example 2 in mind, one can easily see that a contingent overflow for signed addition will occur any time one of the operand MSD's equals a value of zero, and the other equals a value of one. In these cases, the overflow condition illustrated in Example 2 will occur any time there is a carry into the MSD. In contrast, there will never be an overflow for signed addition if there cannot be a conceptual carry into the sign bit from the lower bit of the MSD. FIG. 23 illustrates that, if the "signed" input wire is asserted and the "S1" wire is asserted and either the "B0" or "B1" wire is asserted, then a contingent overflow is indicated by assertion of the "OF?" wire. Restated as a logic equation for signed addition, OF?=S1 AND (B0 or B1).

FIG. 23 also illustrates that the Level Two preliminary saturation detection gate 970 also accurately captures and reports the definite underflow condition for signed addition. Underflow for signed addition will occur whenever the addition of two negative numbers generates a positive intermediate sum. In other words, if the MSD of both operands contain a value of "01" in the MSB, but the MSB of the intermediate sum instead contains a value of "00," then a definite underflow condition exists. This condition will occur any time the value of each MSD of the operands equals a decimal value of two. This situation is illustrated in Example 3 below.

EXAMPLE 3

| | Most Significant Dit | | |
|---|---|---|---|
| | Sign Bit | Second Bit of MSD | Decimal Value |
| MSD A | 1 | 0 | 2 |
| MSD B | 1 | 0 | 2 |
| Prelim. Sum | 0 | 0 | 4 (i.e., 0 with carry) |

Example 3 illustrates that, when the value of the MSD of both operands is a decimal value of two, an underflow condition occurs because the result of the addition operation places the value of "0" in the sign bit of the preliminary sum whereas the value of the sign bit for both operands is "1" . FIG. 23 illustrates that the Level Two preliminary saturation detection gate 970 reports a definite underflow under such conditions. If the "signed" wire is asserted and the "S0" wire is asserted and the "B2 " wire is asserted, then gate 970 asserts the "UF!" output wire. Restated as a logic equation for signed addition, UF! =S0 AND B2.

FIG. 23 illustrates that the Level Two preliminary saturation detection gate 970 also accurately captures and reports contingent underflow conditions for signed addition. Keeping Example 3 in mind, one can easily see that a contingent underflow for signed addition will occur any time one of the operand MSD's equals a decimal value of three, and the other equals a decimal value of two. The sum of these values will arrive as an input into gate 970 as a decimal value of 1, with "S1" being asserted (3+2=5; 5 MOD 4=1), because the Level One gates do not account for carry conditions. In such a case, the underflow condition illustrated in Example 3 will occur if there is a borrow out of the MSD. Because the subtraction operation of the present invention assumes that every dit will be borrowed from, an underflow will occur in these cases unless there is a carry into the MSD. FIG. 23 illustrates that, any time the "signed" input wire is asserted and the "S1 " input wire is asserted and either the "B2" or "B3" input wires are asserted, then gate 970 indicates a contingent underflow condition by asserting the "UF?" wire. Restated as a logic equation for signed addition, UF? =S1 AND (B2 or B3).

FIG. 23 illustrates that the Level Two preliminary saturation detection gate 970 also captures and correctly reports contingent and definite over- and underflow conditions for signed subtraction. Regarding signed subtraction, it has been stated above that an under-or overflow condition will exist for signed arithmetic whenever positive operands yield a negative intermediate difference or negative operands yield a positive intermediate difference. Accordingly, one would expect saturation to be a possibility when subtracting a negative number from a positive number or a positive number from a negative one. In the former case, the net arithmetic effect is to add two positive numbers together. If this operation yields a negative intermediate difference, then an overflow has occurred. In the case of subtracting a positive number from a negative number, the net arithmetic effect is to add two negative numbers together. If such an operation yields a positive intermediate difference, then an underflow has occurred.

As with saturation detection for signed addition, saturation detection for signed subtraction may be accomplished by considering only the MSD of each operand. One way to understand saturation detection for signed subtraction is to view subtraction in the MSD as the addition to the B operand of the three's complement A operand. The various combinations of most-significant-dit values and saturation status for signed saturation are given in Table 13. In Table 13, the A and B operands are given in both decimal and 1-of-4 representations. The 3's complement of A, ~A, is also given in both decimal and 1-of-4 representations. (Because the MSD will never act as the LSD for any partition grouping, Table 13 need not address four's complement arithmetic.) The sum of A+B is given in decimal format. The difference (B-A) is set forth in Table 13 in the three's complement pre-correction format discussed above. In the saturation status column for addition, "Status (Add)," and in the saturation status column for subtraction, "Status (Sub)," OF? and UF? signify contingent overflow and contingent underflow, respectively, "none" signifies that neither underflow nor overflow is generated, and OF! and UF! signify definite overflow and definite underflow, respectively.

TABLE 13

Signed Saturation

| B (1-of-4) | B (Dec.) | A (1-of-4) | A (Dec.) | ¯A (1-of-4) | ¯A (Dec.) | Status (Add) | Status (Sub) | Sum | Diff |
|---|---|---|---|---|---|---|---|---|---|
| 0001 | 0 | 0001 | 0 | 1000 | 3 | none | none | 0 | 3 |
| 0001 | 0 | 0010 | 1 | 0100 | 2 | OF? | none | 1 | 2 |
| 0001 | 0 | 0100 | 2 | 0010 | 1 | none | OF? | 2 | 1 |
| 0001 | 0 | 1000 | 3 | 0001 | 0 | none | none | 3 | 0 |
| 0010 | 1 | 0001 | 0 | 1000 | 3 | OF? | none | 1 | 0 |
| 0010 | 1 | 0010 | 1 | 0100 | 2 | OF! | none | 2 | 3 |
| 0010 | 1 | 0100 | 2 | 0010 | 1 | none | OF! | 3 | 2 |
| 0010 | 1 | 1000 | 3 | 0001 | 0 | none | OF? | 0 | 1 |
| 0100 | 2 | 0001 | 0 | 1000 | 3 | none | UF? | 2 | 1 |
| 0100 | 2 | 0010 | 1 | 0100 | 2 | none | UF! | 3 | 0 |
| 0100 | 2 | 0100 | 2 | 0010 | 1 | UF! | none | 0 | 3 |
| 0100 | 2 | 1000 | 3 | 0001 | 0 | UF? | none | 1 | 2 |
| 1000 | 3 | 0001 | 0 | 1000 | 3 | none | none | 3 | 2 |
| 1000 | 3 | 0010 | 1 | 0100 | 2 | none | UF? | 0 | 1 |
| 1000 | 3 | 0100 | 2 | 0010 | 1 | UF? | none | 1 | 0 |
| 1000 | 3 | 1000 | 3 | 0001 | 0 | none | none | 2 | 3 |

FIG. 23 illustrates that the output of the Level Two preliminary saturation detection gate 970 conforms to Table 13 in the reporting of saturation status for signed addition operations. Table 13 illustrates that a definite overflow condition for signed addition is indicated by gate 970 through the assertion of the "OF!" wire when, conceptually, the value of both of the signed operand MSD's equals a decimal value of one. FIG. 23 reveals that, in practice, this condition is viewed in the circuitry of gate 970 as the situation where the intermediate sum equals two and the value of the B operand equals a decimal value of one. Table 13 further illustrates that gate 970 indicates a contingent overflow condition for signed addition, through assertion of the "OF?" wire, when, conceptually, one of the operands equals a decimal value of zero and the other operand equals a decimal value of one. FIG. 23 reveals that, in practice, this condition is viewed in the circuitry of gate 970 as the situation where the intermediate sum equals a decimal value of one, and the B operand equals a decimal value of either zero or one. Regarding underflow for signed addition, Table 13 illustrates that gate 970 indicates a definite underflow condition for signed addition, through assertion of the "UF!" output wire, when the decimal value of both operands conceptually equals two. FIG. 23 reveals that, in practice, this condition is viewed in the circuitry of gate 970 as the situation where the intermediate sum equals a decimal value of zero, and the B operand equals a decimal value of two. Table 13 illustrates that gate 970 indicates a contingent underflow condition for signed addition, through asserting of the "UF?" output wire, when, conceptually, the decimal value of one of the operands equals two and the decimal value of the other operand equals three. FIG. 23 illustrates that, in practice, this condition is viewed in the circuitry of gate 970 as the situation where the intermediate sum equals a decimal value of one and the decimal value of the B operand equals either two or three.

FIG. 23 also illustrates that the output of the Level Two preliminary saturation detection gate 970 conforms to Table 13 in the reporting of saturation status for signed subtraction operations. Table 13 illustrates that a definite overflow for signed subtraction will occur when the value of the MSD for the B operand equals a decimal value of one and the value of the MSD for the A operand equals the decimal value of two. As shown in Table 8, the three's complement of two is one, so that the three's complement subtraction of 1−2 will be the same operation as adding 1+1. Accordingly, the Level One gate will perform three's complement subtraction and will generate an intermediate difference, in pre-corrected format, of two. As discussed above in connection with Example 2, the signed addition of 1+1 generates a definite overflow. FIG. 23 illustrates that the Level Two preliminary saturation detection gate 970 reports a definite overflow when, conceptually, the B operand input equals a decimal value of one and the A operand input equals a decimal value of two. FIG. 23 reveals that, in practice, this condition is viewed in the circuitry of gate 970 as the situation where the intermediate sum equals a decimal value of two, and the B operand equals a decimal value of one. If the "signed" wire is asserted and the "S2" wire is asserted and the "B1" wire is asserted, then gate 970 asserts the "UF!" output wire.

Keeping Example 2 in mind, and also viewing subtraction as three's complement addition, one can easily see that the overflow condition illustrated in Example 2 will also occur, contingently, for the following cases: 0−2 and 1−3. When converted to three's complement addition, 0−2 becomes 0+1 and 1−3 becomes 1+0. As discussed above in connection with Example 2, either of these operations will create an overflow if there is a carry into the MSB. FIG. 23 illustrates that the Level Two preliminary saturation detection gate 970 will accurately capture and report a contingent overflow for signed subtraction when, conceptually, the B operand MSD equals a decimal value of zero and the A operand MSD equals a decimal value of two or the B operand MSD equals a decimal value of one and the A operand MSD equals a decimal value of three. FIG. 23 reveals that, in practice, this condition is viewed in the circuitry of gate 970 as the situation where the intermediate sum equals a decimal value of one and the B operand equals a decimal value of either zero or one. If the "signed" input wire is asserted and the "S1" input wire is asserted and either the "B0" or "B1" input wire is asserted, then FIG. 23 illustrates that gate 970 will indicate a contingent overflow condition through assertion of the "OF?" output wire.

Regarding underflow for signed subtraction, Table 13 illustrates that a definite underflow for signed subtraction will occur when the value of the MSD for the B operand equals a decimal value of two and the A operand equals a decimal value of one. Converting 2−1 to three's complement addition, the operation of 2−1 becomes 2+2. For such operands, the Level One gate will generate an intermediate difference, in the three's complement pre-correction format discussed above, having a value of zero. As discussed above in connection with Example 3, such operation generates a definite underflow. FIG. 23 illustrates that gate 970 reports a definite underflow when, conceptually, the B operand equals a decimal value of two and the A operand equals a decimal value of one. The sum from such an operation will be input into gate 970 from Level One as a decimal value of zero. FIG. 23 reveals that, in practice, this operation is viewed in the circuitry of gate 970 as the situation where the intermediate sum equals a decimal value of zero and the B operand input equals a decimal value of two. FIG. 23 illustrates that gate 970 will assert the "UF!" output wire when the "signed" input wire is asserted and the "SO" input wire is asserted and the "B2" input wire is asserted.

Given the foregoing, one can easily see that signed subtraction on the following MSD operand dits will generate a contingent underflow: 3−1 and 2−0. Converted to three's complement addition, such operations become 3+2 and 2+3, respectively. Such operations will generate an underflow unless there is a carry into the MSD. FIG. 23 illustrates that gate 970 reports a contingent underflow when, conceptually, the B operand MSD equals a decimal value of three and the A operand MSD equals a decimal value of one or the B operand MSD equals a decimal value of two and the A operand MSD equals a decimal value zero. The sum from such operation will be input into gate 970 from Level One as a decimal value of one. FIG. 23 reveals that, in practice, this operation is viewed in the circuitry of gate 970 as the situation where the intermediate sum equals a decimal value of one and the B operand input equals a decimal value of either two or three. The Level Two preliminary saturation detection gate 970 will assert the "UF?" output wire when the "signed" input wire is asserted and the "S1" input wire is asserted and either the "B2" or "B3" input wires are asserted.

FIG. 23 illustrates that gate 970 asserts the "N" wire, indicating that no overflow or underflow condition exists, for all cases other than those discussed herein as causing a contingent or definite under- or overflow for signed addition or subtraction.

Level Two Configuration

FIG. 14 illustrates the configuration of the logic gates for Level Two. As with Level One, Level Two is conceptually grouped into eight blocks, Block 0 through Block 7, each of which comprises the logic gates associated with processing four dits of the intermediate sum. Block 0 processes the least four significant dits of the intermediate sum, Dit 0 through Dit 3. Block 1 through Block 7 processes successively more significant four-dit blocks of the intermediate sum.

FIG. 14 illustrates that the intermediate sum generated for each dit of the A and B operands in Level One is stored in buffers 950m–950z, 950aa–950ar, which receive their 1-of-4 sum inputs from the following Level One gates, respectively: 910, 900a–900c, 920a, 900d–900f, 930a, 900g–900i, 920b, 900j–900l, 940, 900m–1900o, 920c, 900p–900r, 930b, 900s–900u, 920d, 900v–900x. Each of said Level Two buffers 950m–950z, 950aa–950ar pass their 1-of-4 sum values to Level Three buffers 950au–950az, 950ba–950bz, respectively.

FIG. 14 illustrates that the value of the 1-of-3 signed/unsigned/none signal is received from Level One buffer 951a as an input into the lower-half Level Two preliminary saturation detection gates 970a–970d. This signed/unsigned/none input signal is also received from the upper-half Level One buffer 951b into the upper-half Level Two preliminary saturation detection gates 970e–970h. Referring now to FIG. 23, one can see that the N wire of the 1-of-5 output produced by Gate 970 is always asserted if the "none" wire of the 1-of-3 signed/unsigned/none signal is asserted. In other words, Gate 970 acts as a sort of buffer for the "none" value. With this concept, one can see that the N wire of the 1-of-5 preliminary saturation indicator will always be set if the "none" wire was asserted. For subsequent logic levels, it is therefore unnecessary to retain the original value of the "none" wire, since it will be captured by the output of the Level Two preliminary saturation detection gate 970. For this reason, Level Two compresses the value of the "none" wire into a combined none/unsigned value.

Figure 16:
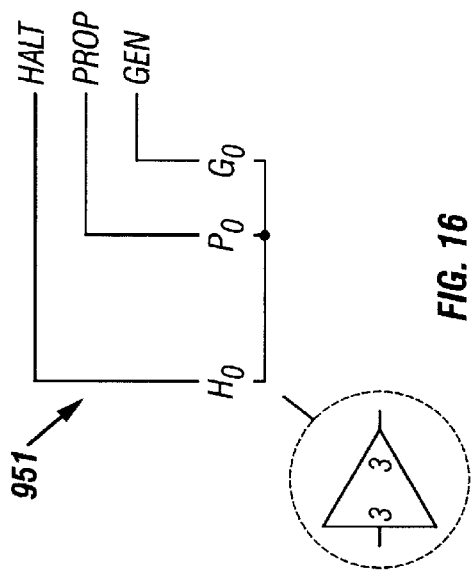
FIG. 16 is a shorthand representation of an HPG buffer that buffers a 1-of-3 value.
Figure 17:
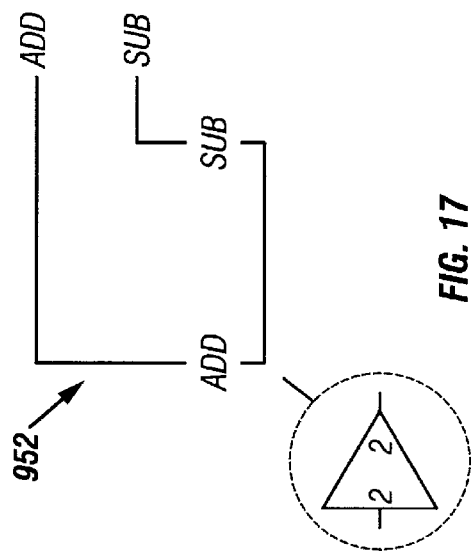
FIG. 17 is a shorthand representation of a 1-of-2 buffer.
Figure 16A:
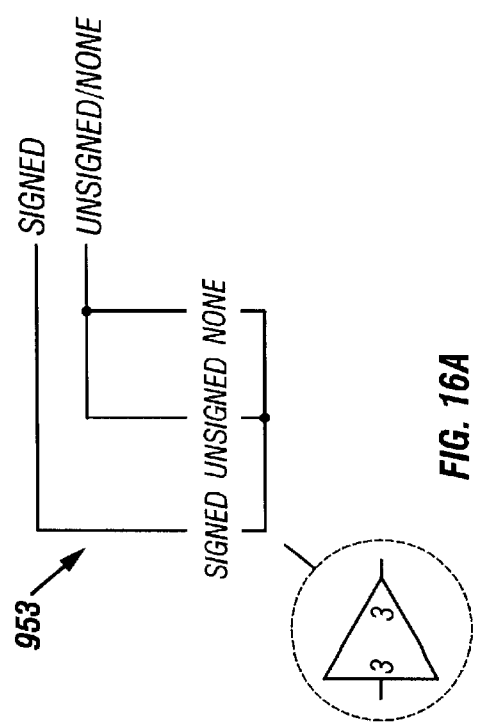
FIG. 16A is a shorthand representation of a compression buffer that compresses a 1-of-3 value into a 1-of-2 value.

FIG. 16A illustrates the consolidation buffer 953 that compresses the signed/unsigned/none signal. FIG. 14 illustrates that the value of the signed/unsigned/none signal is received from lower-half Level One buffer 951a into the lower-half Level Two consolidation buffer 953a. Similarly, FIG. 14 illustrates that the value of the signed/unsigned/none signal is received from upper-half Level One buffer 951b into the upper-half Level Two consolidation buffer 953b. FIGS. 14 and 16A illustrate that the consolidation buffers convert the value of the signed/unsigned/none signal into a 1-of-2 signal comprising a "signed" wire and an "unsigned/none" wire. This consolidated 1-of-2 value is passed from the lower-half consolidation buffer 953a into a lower-half Level Three buffer 952i that stores the 1-of-2 value for later use by Level Four. Similarly, FIG. 14 illustrates that the upper-half consolidation buffer 953b passes its 1-of-2 output value into an upper-half Level Three buffer 952j that stores the 1-of-2 value for later use by Level Four.

The 1-of-4 S8/S16/S32/S64 partition size control signal is received from Level One buffer 950i into Level Two buffer 950k. This input signal is also received from lower-half Level One buffer 950i into the lower-half combined block HPG/partition control gates 960a, 963a, 960b, 964. The value of the 1-of-4 partition size control signal is also received from upper-half Level One buffer 950j into Level Two buffer 950l. The value of the partition size control signal is also received from Level One upper-half buffer 950j as an input into the upper-half Level Two combined block HPG/partition control gates 960c, 963b, 960d.

Each block, except Block 7, of Level Two comprises one combined block HPG/partition detection gate to determine the HPG signal generated out of that block. Because dits 3, 11, 19, and 27 will only be on an 8-bit partition boundary, if any, the 8-bit combined block HPG/partition detection gate 960 is used for such dits. Accordingly, the combined block HPG/partition detection gates for Block 0, Block 2, Block 4, and Block 6 are, respectively: 960a, 960b, 960c, and 960d. Dit 7 may lie on either an 8-bit or 16-bit partition boundary, if any. Accordingly, the 8- or 16-bit combined block HPG/partition detection gate 963 is used for Block 1 (963a) and Block 5 (963b) of Level Two. Because dit 15 may lie on an 8-bit, 16-bit, or 32-bit partition boundary, the 8- or 16- or 32-bit combined block HPG/partition detection gate 964 is used for Block 3 of Level Two.

The HPG signal generated by Level One for the least significant dit of each block of the intermediate sum is stored in a buffer 951, which is illustrated in FIG. 16. This HPG signal will be used by the final level of logic to determine whether the intermediate sum for the second-least significant dit of each block should be incremented due to a carry. The Level Two HPG buffers for the HPG signal for the least significant dits of Block One through Block 7 of Level Two are labeled in FIG. 14 as 951g through 951n, respectively.

The calculation for a carry into higher-order dits within a block must take into account the HPG signal for all dits of lesser significance within the block. For this reason, each block, Block 0 through Block 7, comprises a two-input block HPG gate 962 that formulates the block HPG signal generated by the two least significant dits within each block. The two-input block HPG gate for each of Block 0 through Block 7 is labeled in FIG. 14, respectively, as 962a through 962h. The outputs from these gates 962a–962h are used by Level Four to determine whether the third-least significant dit of each block of the intermediate sum should be incremented due to a carry.

Similarly, each block, Block 0 through Block 7, comprises a three-input block HPG gate 961 to determine whether a carry is generated into the MSD of each block of the intermediate sum. Gate 961 formulates a block HPG signal based on the HPG signals for the three least significant dits within each block. The three-input block HPG gate 961 for each of Block 0–through Block 7 is labeled in FIG. 14, respectively, as 961a through 961h.

The Level Two combined block HPG/partition control gates 960a–d, 963a–b, 964 generate an HPG signal for each block. Because the block HPG signals depend on the HPG signal for every dit within a block, the combined block HPG/partition control gates not only receive the partition size control signal as an input, as described above, but also receive as inputs the Level One HPG signals for every dit within the 4-dit block.

Each block, Block 0 through Block 7, also comprises a Level Two preliminary saturation detection gate 970. The Level Two preliminary saturation detection gate 970 for each block, Block 0 through Block 7, is labeled in FIG. 14, as 970a through 970h, respectively. Since preliminary saturation detection is performed only on the most significant dit position for each partition block, this gate 970 is used only in dit positions that could become most significant, depending on partition size. Partition size is not used in Level Two to qualify the saturation results. Instead, partition size, as it relates to saturation, is taken into account in the final logic stage.

As discussed above, each of said Level Two preliminary saturation detection gates 970a–970h comprises several inputs, including the signed/unsigned/none signal, the intermediate sum for the MSD, the value of the B input for the MSD, the HPG signal for the MSD, and the value of the ADD/SUB signal. Each such gate 970a–970h receives the 1-of-3 signed/unsigned/none signal from either buffer 951a or 951 b, as described above. The Block 0 preliminary saturation detection gate 970a receives the MSD intermediate sum input and the MSD HPG signal input from Level One gate 900c and the value of the B operand from buffer 952a. Gates 970b through 970h for the higher blocks receive their MSD intermediate sum inputs and their MSD HPG signal inputs from gates 900f, 900i, 900l, 900o, 900u, and 900x, respectively. Such gates 970b through 970h receive their B operand value inputs from buffers 952a through 952h, respectively. Finally, the preliminary saturation detection gates 970a–970h for each block receives the value of the ADD/SUB signal from Level One buffers 950a through 950h, respectively.

In sum, Level Two stores the intermediate sum value of each dit for use by higher logic levels. Level Two stores the HPG signal generated by Level One for the LSD for each block; this signal is later used to determine whether the value of the sum for the second-least significant dit within a block must be incremented due to a carry in. To perform this function for dits of higher significance within a block, a two-block HPG signal and a three-block HPG signal are generated for each block. In addition, a block HPG signal is generated for each block. This full-block signal takes partitioning into account. Finally, Level Two also performs preliminary saturation detection by looking at the MSD of the A and B operands for each block.

Level Three—Overview

The main functions of Level Three are 1) to resolve the contingent underflow and overflow indications generated by Level Two, and 2) to combine the block HPG signals computed in Level Two into a single HPG signal in order to reduce the complexity of logic in Level Four. These two separate functions require two different types of Level Three gates. Level Three therefore comprises Level Three block HPG gates 961, 962, 965 as well as Level Three combined block HPG/saturation determination gates 980–983.

Figure 24:
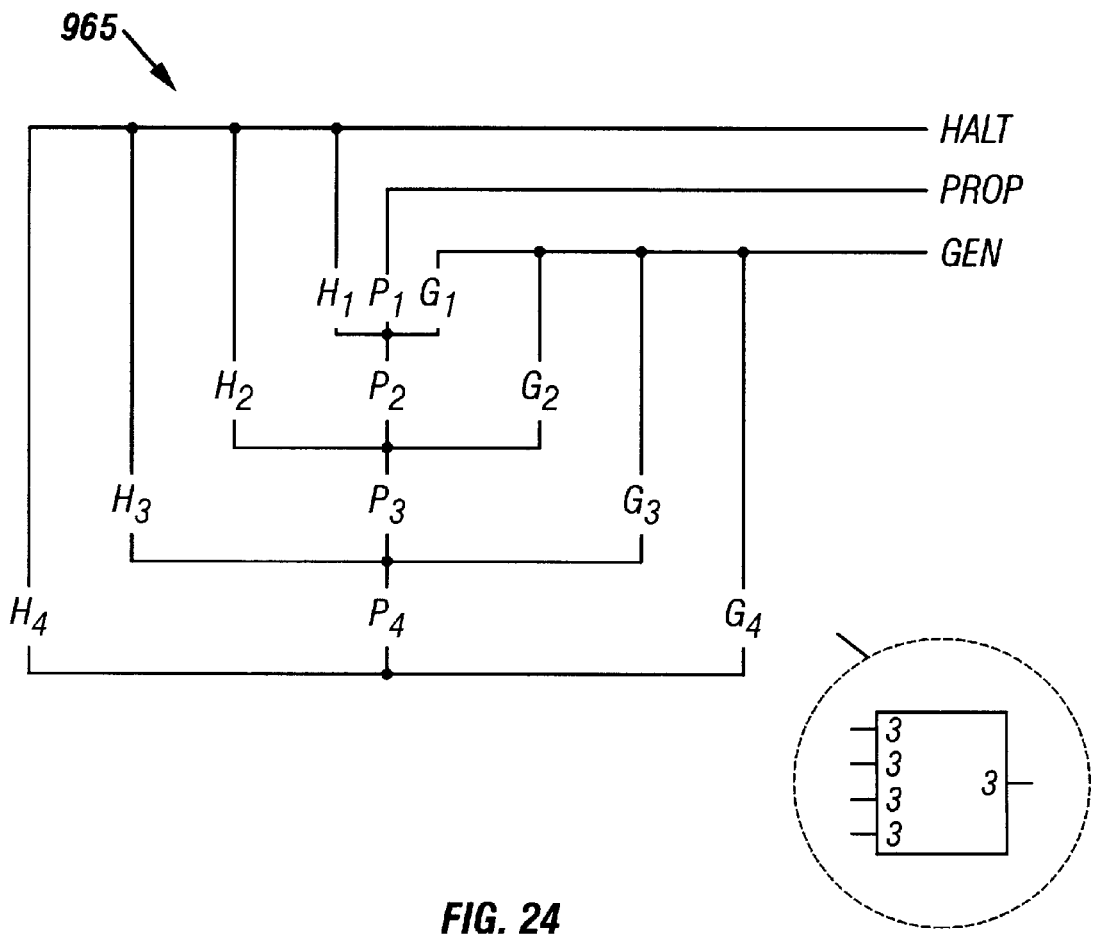
FIG. 24 is a shorthand description of a four-input block HPG gate.

FIGS. 19, 20, and 24 illustrate the gates 961, 962, 965 utilized to compute block HPG signals for dit positions other than those that could become the most significant in a partitioning. These gates take two, three, or four 1-of-3 block HPG signals generated by Level Two and produce a final combined 1-of-3 HPG signal for use by the final level. No saturation is needed in these gates 961, 962, 965 since they process dits that will never be the MSD for a partition grouping.

FIGS. 25, 26, 27, and 28 illustrate the Level Three combined block HPG/saturation determination gates 980, 981, 982, 983 of the present invention. The function of the combined block HPG/saturation determination gates 980, 981, 982, 983 is to resolve contingent overflow and underflow by determining the presence (G) or absence (H or P) of a carry into the most significant dit position. These gates 980, 981, 982, 983 also serve to combine the Level block HPG signals into a single HPG signal for each dit, to be used by Level Four. This latter function is the same function performed by the simple Level Three block HPG gates 961, 962, 965. Like the Level Two preliminary saturation detection gate 970 illustrated in FIG. 23, the combined block HPG/saturation determination gates 980, 981, 982, 983 are only used to process dits that could become the most significant, depending on partitioning. The combined block HPG/saturation determination gates 980, 981, 982, 983 must only consider the HPG status for dits less significant than the dit for which the block HPG signal is being generated. For this reason, the three smaller Level Three combined block HPG/saturation determination gates 981, 982, 983 have three, two, and one HPG input, respectively.

As with Level Two, the 1-of-4 intermediate sum generated by Level One is simply passed through buffers in Level Three. That is, the dits of the intermediate sum stored in Level Two buffers 950m14 950z and 950aa–950ar are passed into Level Three buffers 950au–950az, 950ba–950bz, respectively. Once Level Three generates them, the HPG signals generated for each dit, as well as the 1-of-3 resolved underflow/overflow indicator generated for the MSD of each block, are passed from Level Three to Level Four for further processing.

Level Three Logic Gates

FIGS. 19 and 20 illustrate the three-input and two-input block HPG gates 961, 962 that comprise Level Three. These gates are also used in Level Two and their operation is explained above in connection with the discussion of Level Two Logic gates. Unlike Level Two, Level Three also comprises a four-input block HPG gate 965 that is illustrated in FIG. 24. As used in Level Two, the block HPG gates 961, 962 determine the HPG signal based on the HPG signal of adjacent dits. As used in Level Three, the block HPG gates 961, 962, 965 are used to determine the HPG signal based on adjacent dits in conjunction with the block HPG signal from the adjacent blocks of lesser significance.

FIG. 14 illustrates that, as used in Level Three, the two-input block HPG gate 962 determines the HPG signal for a particular dit by combining the block HPG signal for all lesser significant dits within the 4-dit block (this was calculated in Level Two) with the block HPG signal for the block of lesser significance (this was also calculated in Level Two). Similarly, FIG. 14 also illustrates that, as used in Level Three, the three-input block HPG gate 961 determines the HPG signal for a particular dit by combining the block HPG signal for all lesser significant dits within the 4-dit block with the block HPG signal for the two blocks of lesser significance.

The four-input block HPG gate 965 illustrated in FIG. 24 calculates the carry into a particular dit by combining the HPG signal for the adjacent dits of lesser significance within the block with the block HPG signals for the three 4-dit blocks of lesser significance. FIG. 14 illustrates one exception to the foregoing general description of the functionality of gate 965. FIG. 14 illustrates that the exception lies in gate 965c. Gate 965c calculates a block HPG signal for the four least significant blocks of the intermediate sum and therefore does not receive as an input any dit-level HPG signals. FIG. 14 illustrates that this the output signal, HPG0, generated by gate 965c is used by the four most significant blocks of the present invention to determine whether a carry has been generated by the four least significant blocks of the intermediate sum.

FIG. 24 illustrates the operation of the four-input block HPG gate 965 in detail. FIG. 24 illustrates that the four-input block HPG gate 965 receives as inputs four 1-of-3 HPG signals. The first signal, noted as HPG1 in FIG. 24, comprises three wires labeled as H1, P1, and G1. FIG. 14 illustrates that the HPG1 signal delivers to gate 965 the block-level HPG signal for Block 0. The second HPG input into the four-input block HPG gate 965, noted as HPG2 in FIG. 24, comprises three wires labeled as H2, P2, and G2. FIG. 14 illustrates that the HPG2 signal delivers to gate 965 the block HPG signal from Block 1. The third HPG input into the four-input block HPG gate 965, noted as HPG3 in FIG. 24, comprises three wires labeled as H3, P3, and G3. FIG. 14 illustrates that the HPG3 signal delivers to gate 965 the block HPG signal from Block 2. The fourth HPG input into the four-input block HPG gate 965, noted as HPG4 in FIG. 14, comprises three wires labeled as H4, P4, and G4. FIG. 14 illustrates that, except for gate 965c, the HPG4 signal delivers to gate 965 the dit-level HPG signal for all dits of lesser significance within the 4-dit block. (For gate 965c, the HPG4 signal delivers to gate 965 the block HPG signal for Block 3).

FIG. 24 illustrates that if the H4 signal is asserted, signifying a halt signal from the adjacent dits within the block, then the HALT output signal is asserted. (For gate 965c, assertion of H4 indicates that a Halt signal has been asserted by Block 3). If the G4 signal is asserted, signifying a generate signal from the adjacent dit (or Block 3, for gate 965c), then a GEN signal output signal is asserted. If the P4 input signal is asserted, then the HPG3 signal must be evaluated. FIG. 14 illustrates that if P4 and H3 are asserted, a halt signal has propagated, from Block 2, across the immediately adjacent dits (or across Block 3 for gate 965c). In such a case, the four-input block HPG gate 965 asserts the HALT output signal. If P4 and G3 are asserted, then a generate signal has propagated, from Block 2, across the immediately adjacent dits (or across Block 3 for gate 965c).

In such a case, the four-input block HPG gate 965 asserts the GEN signal output. If P4 and P3 are both asserted, then HPG2 must be evaluated. As with HPG4 and HPG3, the four-input block HPG gate 965 generates a HALT output if H2 is asserted, generates a GEN output if G2 is asserted, and goes on to evaluate the HPG1 input signal if P2 is asserted. FIG. 24 illustrates that, if P4, P3, P2, and H1 are asserted, then the HALT output wire is asserted. If P4, P3, P2, and G1 are asserted, then the GEN output wire is asserted. Finally, if the P wire for all four input signals is asserted, then gate 965 will assert the PROP output wire.

Figure 28:
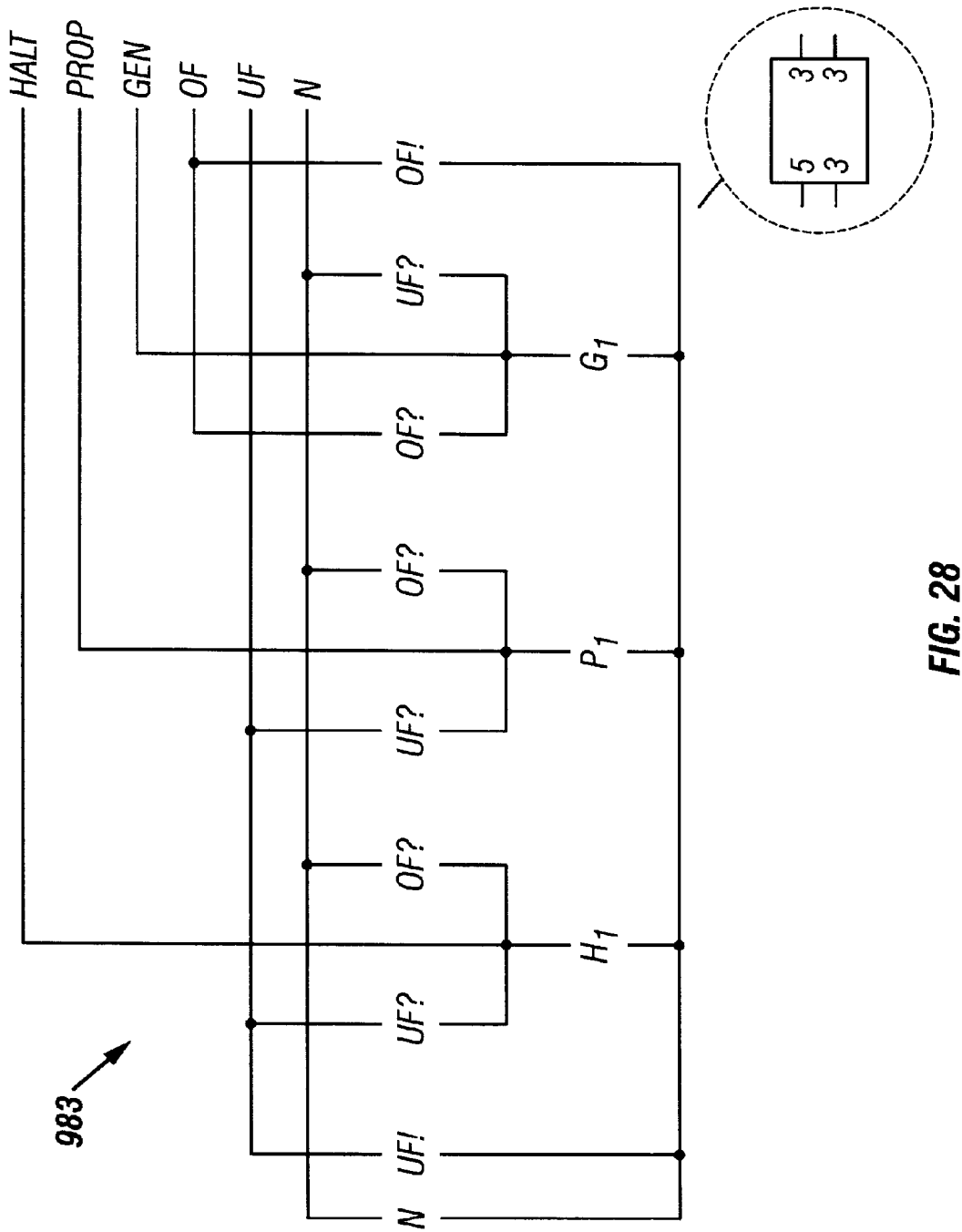
FIG. 28 is a shorthand representation of a one-input combined block HPG/saturation determination gate.

In addition to the block HPG gates 961, 962, 965 discussed above, Level Three also comprises combined block HPG/saturation determination gates 980, 981, 982, 983. The smallest of these gates, Gate 983, determines the block HPG signal and saturation for the most significant dit of Block 0 and Block 4. Gate 983 is illustrated in FIG. 28. FIG. 28 illustrates that Gate 983 receives as inputs a 1-of-3 HPG signal, labeled in FIG. 28 as HPG1, and a 1-of-5 preliminary saturation signal, labeled in FIG. 28 as N/UF!/UF?/OF!/OF?. FIG. 28 further illustrates that Gate 983 performs two distinct functions, with two distinct outputs, within the same gate. Gate 983 acts as an HPG buffer and also performs final saturation determination. FIG. 28 illustrates that Gate 983 therefore produces two output signals: a 1-of-3 HPG signal and a 1-of-3 final saturation indicator, labeled in FIG. 28 as OF/UF/N. The HPG output signal acts as a buffer fort he HPG input signal. The final saturation indicator takes the combined HPG signal into account when determining the value of the final saturation indicator, based on the preliminary saturation signal input.

Regarding saturation determination, FIG. 28 illustrates that, if the N wire of the 1-of-5 preliminary saturation signal input is asserted, then the N wire of the 1-of-3 final saturation indicator output is asserted. If the UF! wire of the 1-of-5 preliminary saturation signal input is asserted, then the UF wire of the 1-of-3 final saturation indicator output is asserted. If the OF! Wire of the 1-of-5 preliminary saturation signal input is asserted, then the OF wire of the 1-of-3 final saturation indicator output is asserted.

For each of the three foregoing input scenarios (i.e., N, OF!, and UF!), the gate 983 determines the final saturation indicator output, as discussed above, without regard to the HPG input. Accordingly, for said inputs (i.e., N OF! and UF!) gate 983 must also determine the state of the block HPG output signal, based on the value of the HPG input. In contrast to gates 980, 981, and 982, Gate 983 receives only one HPG signal as an input. Because no block HPG processing is necessary in such a case, FIG. 28 illustrates that Gate 983 merely acts as a buffer for the HPG signal. FIG. 28 illustrates that, if H1 is asserted, the H output wire is asserted. Similarly, the P output wire is asserted if the P1 input wire is asserted, and the G output wire is asserted if the G1 input wire is asserted Gate 983 also performs. This same HPG buffer processing, along with the additional saturation determination logic described below, for the OF? and UF? inputs.

Regarding additional saturation determination logic, FIG. 28 illustrates that, if the UF? or OF? wire is asserted, then the value of the HPG signal input determines which wire of the 1-of-3 final saturation indicator output is asserted. If H1 and UF? are asserted, then the UF output wire is asserted. Similarly, if the P1 wire and the UF? wire are asserted, then the UF output wire is asserted. These conditions indicate that there is no carry into the MSD, which has caused a contingent underflow to become a definite underflow. If the H1 wire and the OF? wire are asserted, then the N wire is asserted. Similarly, if the P1 wire and OF? wire are asserted, then the N wire is asserted. These conditions indicate that a carry has not propagated into the MSD, so that a contingent overflow has not materialized into an actual overflow. If the G1 wire and the OF? wire are asserted, then the OF output wire is asserted. This condition indicates that a carry into the MSD has caused a contingent overflow to become a definite overflow. In contrast, if the G1 and the UF? wire are asserted, then the N wire is asserted. This condition indicates that a carry into the MSB has prevented a contingent underflow from becoming a definite underflow.

Figure 27:
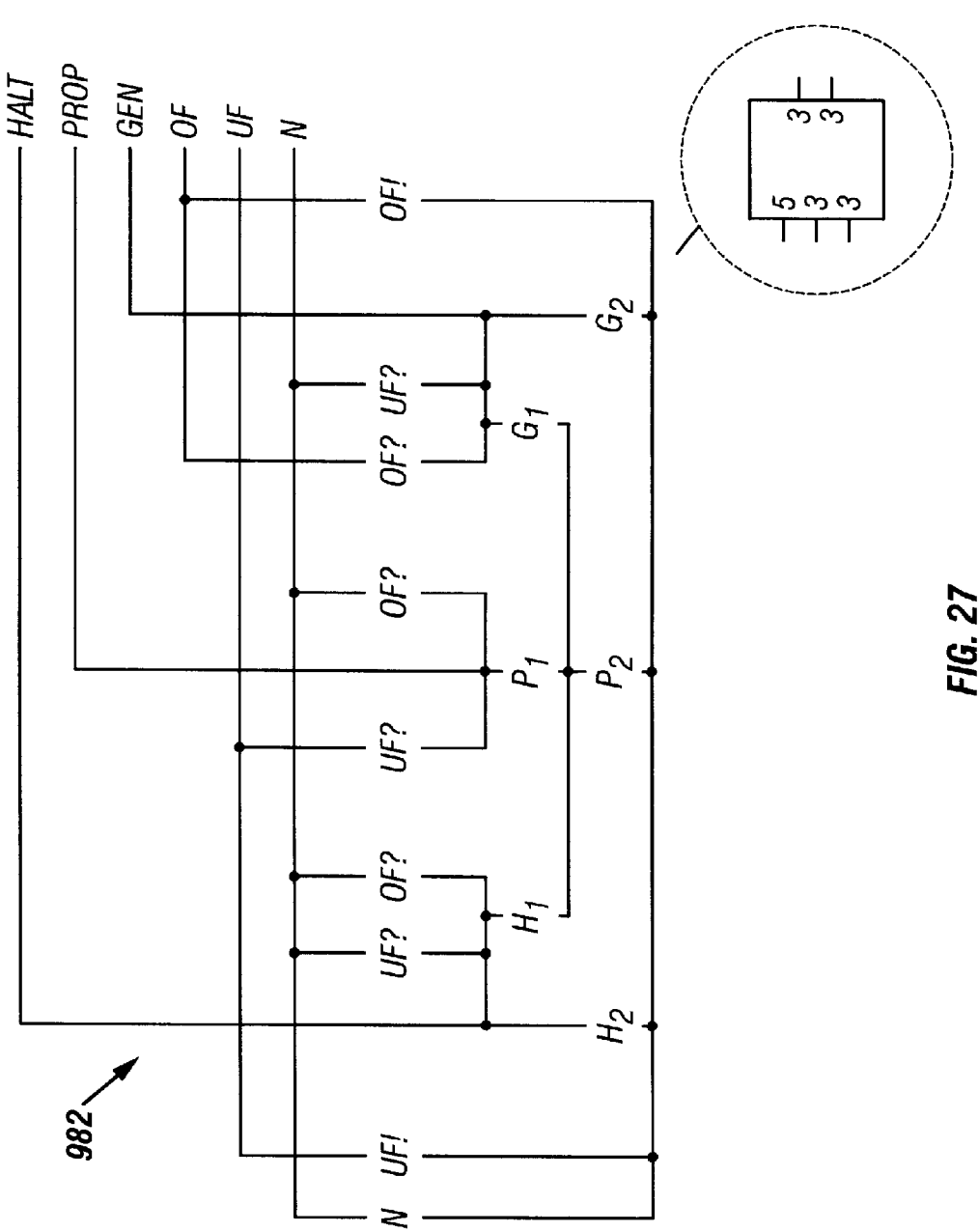
FIG. 27 is a shorthand representation of a two-input combined block HPG/saturation determination gate.

FIG. 27 illustrates the Level Three combined block HPG/saturation determination gate 982 that accepts two block HPG signals and one 1-of-5 preliminary saturation signal as inputs. FIG. 14 illustrates that the first 1-of-3 HPG input signal, labeled as HPG1 in FIG. 27, is the block HPG signal generated by the block of next-least significance than the block in which the dit of interest lies. FIG. 14 illustrates that the second 1-of-3 HPG input signal, labeled as HPG2 in FIG. 27, is the HPG signal generated by dit(s) of lesser significance within the same block. FIG. 27 further illustrates that Gate 982 performs two distinct functions, with two distinct outputs, within the same gate. Gate 982 combines the HPG input signals to generate one combined block HPG output. As its second function, Gate 982 also performs final saturation determination. FIG. 27 illustrates that Gate 982 therefore produces two output signals: a 1-of-3 block HPG signal and a 1-of-3 final saturation indicator, labeled in FIG. 27 as OF/UF/N. The HPG output signal takes into account the block HPG signal generated by the dits of lesser significance within the block and also takes into account the block HPG signal generated by the block of lesser significance. The final saturation indicator takes the combined HPG signal into account when determining the value of the final saturation indicator, based on the preliminary saturation signal input.

Regarding saturation determination, FIG. 27 illustrates that, if the N wire of the 1-of-5 preliminary saturation signal input is asserted, then the N wire of the 1-of-3 final saturation indicator output is asserted. If the UF! wire of the 1-of-5 preliminary saturation signal input is asserted, then the UF wire of the 1-of-3 final saturation indicator output is asserted. If the OF! wire of the 1-of-5 preliminary saturation signal input is asserted, then the OF wire of the 1-of-3 final saturation indicator output is asserted.

Still referring to FIG. 27, for each of the three foregoing input scenarios (i.e., N, OF!, and UF!), gate 982 determines the final saturation indicator output, as described above, without regard to the HPG input. Accordingly, for said inputs (i.e., N, OF!, and UF!) the gate 982 must also determine the state of the HPG output signal, based on the value of the two HPG input values. FIG. 27 illustrates that, if H2 is asserted, or if P2 and H1 are asserted, the H output wire is asserted. Similarly, the P output wire is asserted when the P2 and P1 wires are both asserted. FIG. 27 illustrates that the G output wire is asserted when the G2 input wire is asserted and also when the P2 and G1 input wires are both asserted. This block HPG logic also occurs for the other two input scenarios (i.e., UF? and OF?), in conjunction with the additional saturation detection logic discussed below.

Regarding additional saturation detection logic, FIG. 27 illustrates that, if the UF? or OF? wire is asserted, then the value of the HPG signal inputs determine which wire of the 1-of-3 final saturation indicator output is asserted. FIG. 27 illustrates that the UF output wire is asserted when H2 and UF? are asserted and also when P2 and H1 and UF? are asserted. Similarly, the UF output wire is asserted if P2 and P1 and UF? are asserted. These conditions indicate that there is no carry into the MSD, which has caused a contingent underflow to become a definite underflow.

FIG. 27 also illustrates that, if the H2 wire and the OF? wire are asserted, or if the P2, H1, and OF? wires are asserted, then the N wire is asserted. Similarly, if the P2 wire and the P1 wire and OF? wire are asserted, then the N wire is asserted. These conditions indicate that a carry has not propagated into the MSD, so that a contingent overflow has not materialized into an actual overflow.

FIG. 27 further illustrates that, if the G2 wire and the OF? wire are asserted, or if the P2, G1, and OF? wires are asserted, then the OF output wire is asserted. These conditions indicate that a carry into the MSD has caused a contingent overflow to become a definite overflow. In contrast, if the G2 and the UF? wires are asserted, or if the P2 and G1 and UF? wires are asserted, then the N wire is asserted. These conditions indicate that a carry into the MSB has prevented a contingent underflow from becoming a definite underflow.

Figure 26:
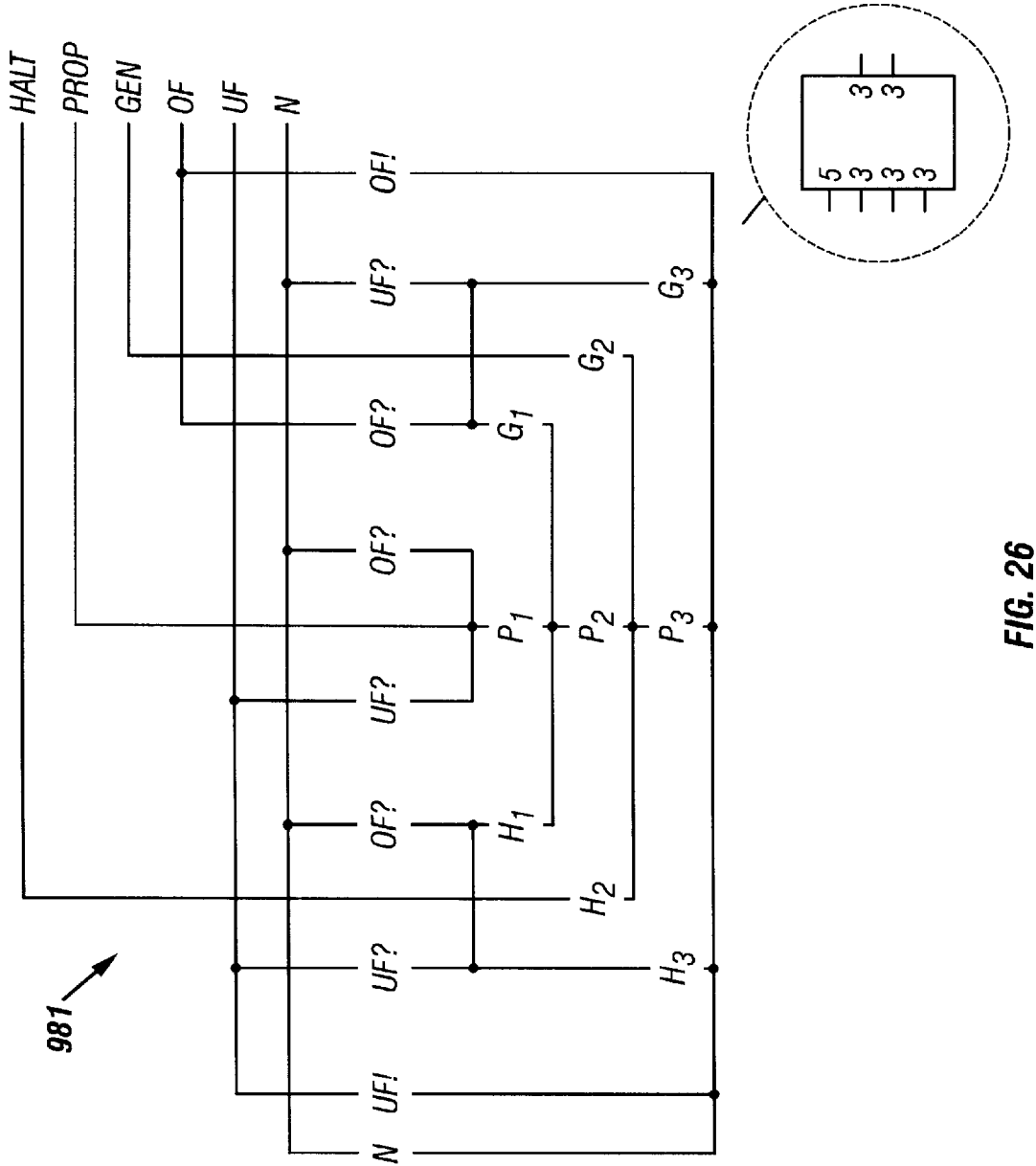
FIG. 26 is a shorthand representation of a three-input combined block HPG/saturation determination gate.

FIG. 26 illustrates the Level Three combined block HPG/saturation determination gate 981 that accepts three block HPG signals and one 1-of-5 preliminary saturation signal as inputs. FIG. 14 illustrates that the first 1-of-3 HPG input signal, labeled as HPG1 in FIG. 26, is the block HPG signal generated by the block N–2, where block N is the block in which the dit of interest lies. FIG. 14 illustrates that the second 1-of-3 HPG input signal, labeled as HPG2 in FIG. 26, is the block HPG signal generated by block N–1, the block immediately adjacent and less significant than block N. FIG. 14 further illustrates that the third 1-of-3 HPG input signal, labeled as HPG 3 in FIG. 26, is the HPG signal generated by dit(s) of lesser significance within block N.

FIG. 26 further illustrates that Gate 981 performs two distinct functions, with two distinct outputs, within the same gate. Gate 981 combines the three HPG input signals to generate one combined block HPG output. As its second function, Gate 981 also performs final saturation determination. FIG. 26 illustrates that Gate 981 therefore produces two output signals: a 1-of-3 block HPG signal and a 1-of-3 final saturation indicator, labeled in FIG. 26 as OF/UF/N. The HPG output signal takes into account the block HPG signal generated by the dits of lesser significance within the block and also takes into account the block HPG signal generated by the two blocks of lesser significance. The final saturation indicator takes the combined HPG signal into account when determining the value of the final saturation indicator, based on the preliminary saturation signal input.

FIG. 26 illustrates that Gate 981 operates in a similar fashion as Gates 983 and 982 discussed above. The saturation status is set for N, OF!, and UF! conditions without regard for the HPG input values. For UF? and OF? input conditions, saturation status is determined based on the value of the HPG input signals, as is illustrated in FIG. 26. Regarding the HPG output signal, an H output is asserted if an H input is encountered, a G output is asserted if a G input is encountered, and the HPG signal for the next dit is consulted if a P input signal is encountered. A P output will be asserted if P3, P2, and P1 are all asserted.

Figure 25:
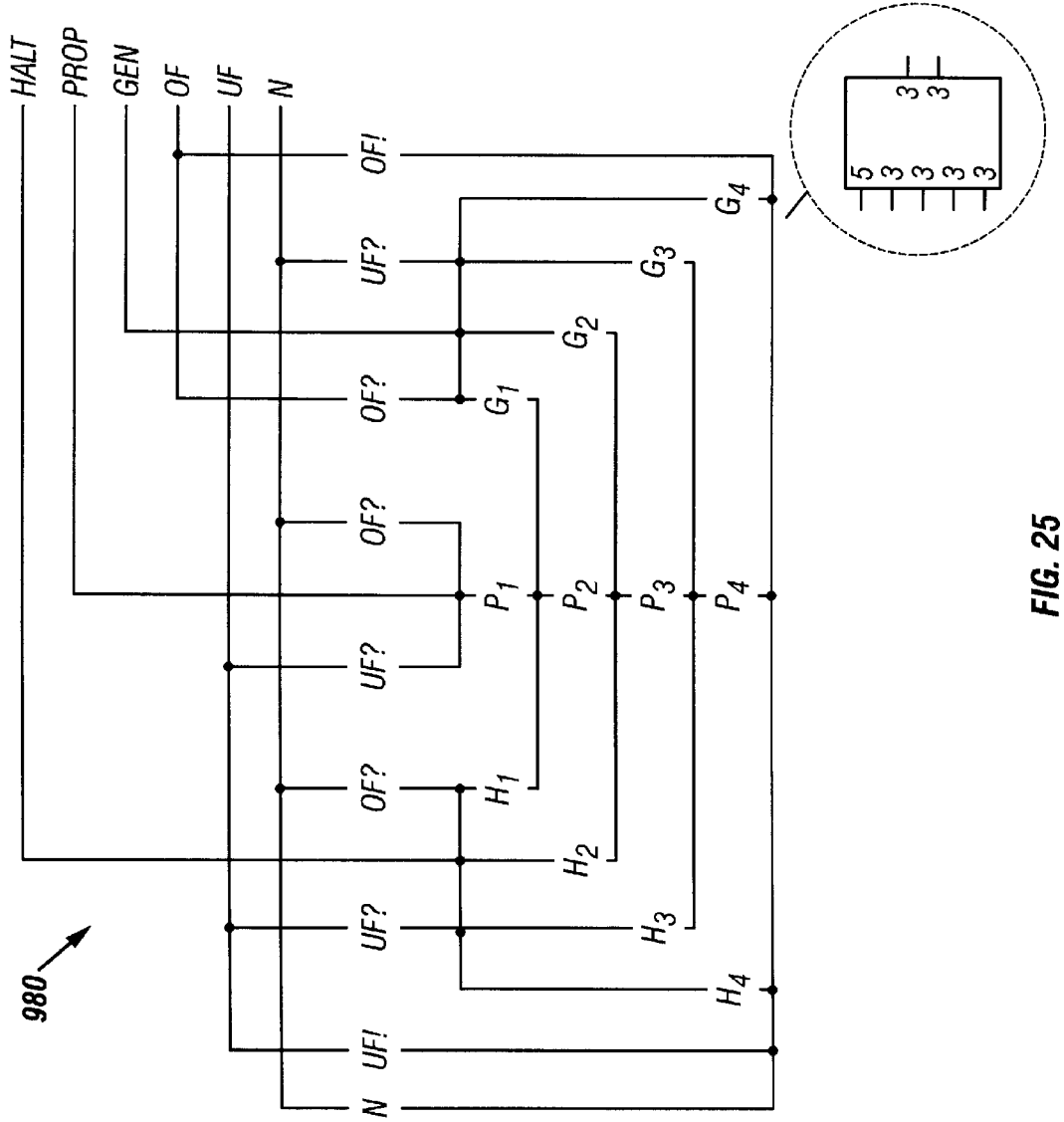
FIG. 25 is a shorthand representation of a four-input combined block HPG/saturation determination gate.

FIG. 25 illustrates the Level Three combined block HPG/saturation determination gate 980 that accepts four block HPG signals and one 1-of-5 preliminary saturation signal as inputs. FIG. 14 illustrates that the first 1-of-3 HPG input signal, labeled as HPG1 in FIG. 25, is the block HPG signal generated by the block N–3, where block N is the block in which the dit of interest lies. FIG. 14 illustrates that the second 1-of-3 HPG input signal, labeled as HPG2 in FIG.

25, is the block HPG signal generated by block N−2. FIG. 14 also illustrates that the third 1-of-3 HPG input signal, labeled as HPG3 in FIG. 25, is the block HPG signal generated by block N−1, the block immediately adjacent and less significant than block N. FIG. 14 further illustrates that the fourth 1-of-3 HPG input signal, labeled as HPG4 in FIG. 25, is the HPG signal generated by dit(s) of lesser significance within block N.

FIG. 25 further illustrates that Gate 980 performs two distinct functions, with two distinct outputs, within the same gate. As with the other combined block/saturation determination gates 981, 982, 983 discussed above, Gate 980 combines the three HPG input signals to generate one combined block HPG output and also performs final saturation determination. FIG. 25 illustrates that Gate 980 therefore produces two output signals: a 1-of-3 block HPG signal and a 1-of-3 final saturation indicator, labeled in FIG. 25 as OF/UF/N. The HPG output signal takes into account the block HPG signal generated by the dits of lesser significance within the block and also takes into account the block HPG signal generated by the three blocks of lesser significance. The final saturation indicator takes the combined HPG signal into account when determining the value of the final saturation indicator, based on the preliminary saturation signal input.

FIG. 25 illustrates that Gate 980 operates in a similar fashion as Gates 981, 982, and 983, discussed above. The saturation status is set for N, OF!, and UF! conditions without regard for the HPG input values. For UF? and OF? input conditions, saturation status is determined based on the value of the HPG input signals, as is illustrated in FIG. 25. Regarding the HPG output signal, an H output is asserted if an H input is encountered, a G output is asserted if a G input is encountered, and the HPG signal for the next dit is consulted if a P input signal is encountered. A P output will be asserted if P4, P3, P2, and P1 are all asserted.

Level Three Configuration

FIG. 14 illustrates the configuration of the logic gates for Level Three. As with Levels One and Two, Level Three is conceptually grouped into eight blocks, Block 0 through Block 7, each of which comprises the logic gates associated with processing four dits of the intermediate sum. Block 0 processes the least four significant dits of the intermediate sum, Dit 0 through Dit 3. Block 1 through Block 7 process successively more significant four-dit blocks of the intermediate sum.

As with Level Two, Level Three does not perform any processing of the intermediate sum. Instead, Level Three focuses on block HPG processing and final saturation determination. For this reason, FIG. 14 illustrates that the intermediate sum generated for each dit of the A and B operands in Level One is passed from Level Two buffers 950*m*–950*z*, 950*aa*14 950*ar* into Level Three buffers 950*au*–950*az*, 950*ba*–950*bz*. Each of said Level Three buffers 950*au*–950*az*, 950*ba*–950*bz* pass their 1-of-4 sum values to Level Four gates 990, 991*a*, 991*b*, 992, 993*a*–993*c*, 994, 995*a*–995*c*, 996, 997*a*–997*c*, 998, 999, 99A*a*, 99A*b*, 99B, 99C*a*–99C*c*, 99D, 99E*a*–99E*c*, 99F, 99G*a*–99G*c*, 99H, respect Two of the input signals into the adder 101 are not used at all by Level Three, and are merely stored by Level Three in buffers until they are passed to Level Four. FIG. 14 illustrates that the 1-of-2 compressed value of the signed/unsigned/none input into the adder 101 is received from the lower-half consolidation buffer 953*a* into Level Three buffer 952*i*. The compressed 1-of-2 value is passed from Level Three buffer 952*i* into the Level Four gates 990–998 of the lower half of the adder. For the upper half, FIG. 14 illustrates that the compressed 1-of-2 value is passed from the upper-half consolidation buffer 953*b* to upper half Level Three buffer 952*j*. From upper-half Level Three buffer 952*j*, the 1-of-2 compressed value of the signed/unsigned/none input is passed to the Level Four gates 999–99H of the upper half of the adder 101.

Also unused by Level Three, and therefore merely stored by Level Three buffers, is the value of the S8/S16/S32/S64 partition control signal. The value of this signal is passed from lower-half Level Two buffer 950*k* into lower-half Level Three buffer 950*as*, which passes the value of the partition control signal to the Level Four gates 990–998 of the lower half of the adder 101. FIG. 14 also illustrates that the value of the partition control signal is also passed from upper-half Level Two buffer 950*l* into upper level Three buffer 950*at*, which passes the value of the partition control signal to the Level Four gates 999–99H of the upper half of the adder 101.

Regarding block HPG processing for Block 0 of Level Three, FIG. 14 illustrates that the HPG signals indicating whether or not there is a carry into Dits 1, 2, or 3 are calculated at Level Two. This is possible because there is never a carry into the least significant block. These HPG signals are stored in Level Three buffers 951*o*, for Dit 1, and 951*p*, for Dit 2. The HPG signal generated for Dit 3 by Level Two is sent from Level Two gate 961*a* to Level Three gate 983*a*. As described above, while Gate 983 uses the HPG signal in order to perform saturation determination logic, Gate 983*a* does not perform block HPG processing but merely acts as a buffer for the HPG signal. And, of course, there is no HPG input into Dit 0, since it is the least significant dit. Accordingly, Block 0 does not perform any block HPG processing at Level Three.

FIG. 14 illustrates that the same situation is true of Block 4, because the adder's 101 use of the HPG0 signal allows Block 4 to act as the LSD of the upper half of the adder 101. Accordingly, there is never a carry into Block 4 in Level Three logic. Although Block 4 conceptually could have a carry propagate into it from lower blocks, this condition is not accounted for in Level Three Logic. Instead, in order to simplify the Level Three block HPG processing performed in the upper half of the adder, FIG. 14 illustrates that Level Three gate 965*c* generates a block HPG indicator, HPG0. The HPG0 indicator is a block HPG signal that combines the block HPG signals for Block 0, Block 1, Block 2, and Block 3. The HPG0 signal is an input into the Level Four gates for the upper half of the adder. Because the HPG0 signal exists, the Level Three combined block HPG/saturation detection gates 980*b*, 981*b*, 982*b*, 983*b* of the upper half of the adder 101 and the simple HPG gates 962*k*, 962*l*, 961*k*, 961*l*, 965*d*, 965*e* of the upper half of the adder 101 need not receive as inputs the block HPG signals generated by the blocks of the lower half.

For the foregoing reason, the Level Three Block 4 logic does not perform block HPG processing. Instead, the block HPG signal generated by Level One to indicate whether or not there is a carry into Dit 17 is passed from Level Two buffer 951*k* to Level Three buffer 951*t*. Similarly, the block HPG signal generated by Level Two for Dit 18 is passed from gate 962*e* into Level Three buffer 951*u*. The block HPG signal generated by Level Two for Dit 19 is passed from Level Two gate 961*e* into Level Three gate 983*b*, which merely acts as a buffer for the HPG signal.

In contrast to Block 0 and Block 4, all other Level Three blocks do perform block HPG processing for their three most significant dits. FIG. 14 illustrates that Blocks 1, 2, 3, 5, 6, and 7 each comprise three gates that perform block HPG processing, each gate processing the block HPG signal for one of the three most significant dits within each block. In contrast, FIG. 14 illustrates that the HPG signal for the LSD of each of Block 1, 2, 3, 5, 6, and 7 is generated at Level Two.

FIG. 14 illustrates that the block HPG signals generated by Level Two for each block, except Block 3, are stored in Level Three buffers. These signals are used by Level Four to determine whether or not a carry has been generated by one block into the least significant dit of the block of next-higher significance. FIG. 14 illustrates that the block HPG signal for Block 0, comprising the combined block HPG signal for Dit 0 through Dit 3 and therefore called herein HPG03, is generated by Level Two gate 960a and is stored in Level Three buffer 951q. (Signal HPG03 is also passed to all lower half Level Three simple HPG gates 962i, 962j, 961i, 961j, 965a, 965b f or dits of higher significance and to all lower half Level Three block HPG/saturation determination gates 982a, 981 a, 980a for dits of higher significance, so that it may be used by those gates for block HPG processing.) Similarly, FIG. 14 illustrates that the block HPG signal for Block 1, comprising the combined block HPG signal for Dit 4 through Dit 7 and therefore called herein HPG47, is generated by Level Two gate 963a and is stored in Level Three buffer 951r. (Signal HPG47 is also passed to all lower half Level Three simple HPG gates 961i, 961j, 965a, 965b for dits of higher significance and to all lower half Level Three block HPG/saturation determination gates 981a, 980a for dits of higher significance, so that it may be used by those gates for block HPG processing.) By the same token, FIG. 14 illustrates that the block HPG signal for Block 2, comprising the combined block HPG signal for Dit 8 through Dit 11 and therefore called herein HPG811, is generated by Level Two gate 960b and is stored in Level Three buffer 951s. (Signal HPG811 is also passed to Level Three simple HPG gates 965a, 965b and to Three block HPG/saturation determination gate 980a, so that it may be used by those gates for block HPG processing in Block 3.) FIG. 14 illustrates that the block HPG signal for Block 4, comprising the combined block HPG signal for Dit 16 through Dit 19 and therefore called herein HPG1619, is generated by Level Two gate 960c and is stored in Level Three buffer 951v. (Signal HPG1619 is also passed to all upper half Level Three simple HPG gates 962k, 962l, 961k, 961l, 965d, 965e for dits of higher significance and to all upper half Level Three block HPG/saturation determination gates 982b, 981b, 980b for dits of higher significance, so that it may be used by those gates for block HPG processing.) FIG. 14 also illustrates that the block HPG signal for Block 5, comprising the combined block HPG signal for Dit 20 through Dit 23 and therefore called herein HPG2023, is generated by Level Two gate 963b and is stored in Level Three buffer 951w. (Signal HPG2023 is also passed to all upper half Level Three simple HPG gates 961k, 961l, 965d, 965e for dits of higher significance and to all upper half Level Three block HPG/saturation determination gates 981b, 980b for dits of higher significance, so that it may be used by those gates for block HPG processing.) Finally, FIG. 14 also illustrates that the block HPG signal for Block 6, comprising the combined block HPG signal for Dit 24 through Dit 27 and therefore called those HPG2427, is generated by Level Two gate 960d and is stored in Level Three buffer 951x. (Signal HPG2427 is also passed to upper half Level Three simple HPG gates 965d, 965e for dits in Block 7 and to Level Three block HPG/saturation determination gate 980b, so that it may be used by those gates for block HPG processing within Block 7).

The block HPG signal for Block 3, generated by Level Two gate 964, is not stored in a Level Three buffer, as are the other block HPG signals discussed above. Instead, the Block 3 HPG signal, along with HPG03, HPG47, and HPG811, are inputs into a Level Three gate, 965c, which determines the HPG0 combined block HPG signal for all four lower blocks of the intermediate sum. FIG. 14 illustrates that the four 1-of-3 input HPG signals into gate 965c arrive from Level Two gates 960a, 963a, 960b, and 964. FIG. 14 illustrates that HPG0 is an input to the Level Four gates for all dits comprising the four higher blocks of the intermediate sum.

Regarding the determination of the HPG signal for the three most significant dits within each of Block 1, 2, 3, 5, 6, and 7, FIG. 14 illustrates that the three block HPG gates for each block N each receive as an input the Level Two block HPG signal(s) generated by all block(s) of lesser significance within the half (upper or lower) of the adder 101 in which the gate of interest lies. FIG. 14 illustrates that the three block HPG gates for each block N also receive the Level Two block HPG signal generated by the dits of lesser significance within the block N. The Level Three block HPG gates use these Level Two block HPG signals to generate a single HPG signal in order to reduce complexity in the final level of logic. The configuration of the three block HPG gates for each of Blocks 1, 2, 3, 5, 6, and 7 is discussed separately below.

FIG. 14 illustrates that the configuration of the three Level Three block HPG gates for both Block 1 and for Block 5 is identical. Each of Block 1 and Block 5 acts as the second-least significant block within one half of the adder 101. Each of Block 1 and Block 5 comprises two simple block HPG gates 962 and one two-block combined block HPG/saturation determination gate 982. These gates are labeled in FIG. 14 as gates 962i, 962j, and 982a, respectively, for Block 1. These gates are labeled in FIG. 14 as gates 962k, 962l, and 982b, respectively, for Block 5.

Regarding block HPG processing in Block 1, gate 962i receives as inputs the HPG03 block HPG signal for Block 0, as well as the HPG signal generated by Dit 4. The Dit 4 HPG signal is received by gate 962i from Level Two buffer 951h. Gate 962i, which is illustrated in detail in FIG. 20, then produces a combined HPG signal that indicates whether or not there is a carry into Dit 5 of the intermediate sum. This output from gate 962i is passed to Level Four gate 993b. Similarly, gate 962j receives the Block 0 HPG signal, HPG03. Gate 962j also receives from Level Two gate 962b the combined HPG signal for Dit 4 and Dit 5. Gate 962j then produces a combined HPG signal that indicates whether or not there is a carry into Dit 6 of the intermediate sum. This output from gate 962j is passed to Level Four gate 993c. Similar block HPG processing is also performed in Gate 982a to combine the HPG03 signal with the block HPG signal generated for Dits 4–6 by gate 961b in order to produce a combined HPG signal that indicates whether or not there is a carry into Dit 7 of the intermediate sum. The block HPG output from Gate 982a is passed to Level Four gate 994. Gate 982a also performs saturation determination logic that produces a 1-of-3 final saturation indicator. Details of this saturation determination logic are discussed below.

Regarding block HPG processing in Block 5, gate 962k receives as inputs the HPG1619 block HPG signal for Block 4, as well as the HPG signal generated by Dit 20. The Dit 20 HPG signal is received by gate 962k from Level Two buffer 951l. Gate 962k, which is illustrated in detail in FIG. 20, then produces a combined HPG signal that indicates whether or not there is a carry into Dit 21 of the intermediate sum.

This output from gate 962k is passed to Level Four gate 99Cb. Similarly, gate 962l receives the Block 4 HPG signal, HPG1619. Gate 9621 also receives from Level Two gate 962f the combined HPG signal for Dit 20 and Dit 21. Gate 962l then produces a combined HPG Signal that indicates whether or not there is a carry into Dit 22 of the intermediate sum. This output from gate 962l is passed to Level Four gate 99Cc. Similar block HPG processing is also performed in Gate 982b to combine the HPG1619 signal with the block HPG signal generated for Dits 20–22 by gate 961f in order to produce a combined HPG signal that indicates whether or not there is a carry into Dit 23 of the intermediate sum. The block HPG output from Gate 982b is passed to Level Four gate 99D. Gate 982b also performs saturation determination logic that produces a 1-of-3 final saturation indicator. Details of this saturation determination logic are discussed below.

Still regarding Level Three block HPG processing, FIG. 14 illustrates that the configuration of the three Level Three block HPG gates for both Block 2 and for Block 6 is identical. Each of Block 2 and Block 6 acts as the third-least significant block within one half of the adder 101. Each of Block 2 and Block 6 comprises two simple block HPG gates 961 and one three-block combined block HPG/saturation determination gate 981. These gates are labeled in FIG. 14 as gates 961i, 961j, and 981a, respectively, for Block 2. These gates are labeled in FIG. 14 as gates 961k, 961l, and 981b, respectively, for Block 6.

Regarding Level Three block HPG processing in Block 2, gate 961i receives as inputs the HPG03 block HPG signal for Block 0 and the HPG47 block HPG signal for Block 1, as well as the HPG signal generated by Dit 8 to produce a combined HPG signal that indicates whether or not there is a carry into Dit 5 of the intermediate sum. Gate 961i is illustrated in detail in FIG. 19. The block HPG output from gate 961i is passed to Level Four gate 995b. Similarly, gate 961j receives the Block 0 HPG signal, HPG03, and the Block 1 HPG signal, HPG47. Gate 961j also receives from Level Two gate 962c the combined HPG signal for Dit 8 and Dit 9. Gate 961j then produces a combined HPG signal that indicates whether or not there is a carry into Dit 10 of the intermediate sum. This output from gate 961j is passed to Level Four gate 995c. Similar block HPG processing is also performed in Gate 981 a to combine the HPG03 and HPG47 signals with the block HPG signal generated for Dits 8–10 by Level Two gate 961c. The block HPG output signal generated by Gate 981 a is a combined HPG signal that indicates whether or not there is a carry into Dit 11 of the intermediate sum. The block HPG output from Gate 981a is passed to Level Four gate 996. Gate 981 a also performs saturation determination logic that produces a 1-of-3 final saturation indicator. Details of this saturation determination logic are discussed below.

Regarding Level Three block HPG processing in Block 6, gate 961k receives as inputs the HPG1619 block HPG signal for Block 4 and the HPG2023 block HPG signal for Block 5, as well as the HPG signal generated by Dit 24 to produce a combined HPG signal that indicates whether or not there is a carry into Dit 25 of the intermediate sum. Gate 961k is illustrated in detail in FIG. 19. The block HPG output from gate 961k is passed to Level Four gate 99Eb. Similarly, gate 961l receives the Block 4 HPG signal, HPG1619, and the Block 5 HPG signal, HPG2023. Gate 961l also receives from Level Two gate 962g the combined HPG signal for Dit 24 and Dit 25. Gate 961l then produces a combined HPG Signal that indicates whether or not there is a carry into Dit 26 of the intermediate sum. This output from gate 961l is passed to Level Four gate 99Ec. Similar block HPG processing is also performed in Gate 981b to combine the HPG1619 and HPG2023 signals with the block HPG signal generated for Dits 24–26 by Level Two gate 961g. The block HPG output signal generated by Gate 981b is a combined HPG signal that indicates whether or not there is a carry into Dit 27 of the intermediate sum. The block HPG output from Gate 981b is passed to Level Four gate 99F. Gate 981b also performs saturation determination logic that produces a 1-of-3 final saturation indicator. Details of this saturation determination logic are discussed below.

Still addressing Level Three block HPG logic, FIG. 14 illustrates that the configuration of the three Level Three block HPG gates for both Block 3 and for Block 7 is identical. Each of Block 3 and Block 7 acts as the most significant block within one half of the adder 101. Each of Block 3 and Block 7 comprises two simple block HPG gates 965 and one four-block combined block HPG/saturation determination gate 980. (Block 3 also comprises an additional simple block HPG gate, 965c, that determines the value of the HPG0 signal, but it is discussed elsewhere in this disclosure). These gates are labeled in FIG. 14 as gates 965a, 965b, and 980a, respectively, for Block 3. These gates are labeled in FIG. 14 as gates 965d, 965e, and 980b, respectively, for Block 7.

Regarding Level Three block HPG processing in Block 3, gate 965a receives as inputs the HPG03 block HPG signal for Block 0, the HPG47 block HPG signal for Block 1, and the HPG811 block HPG signal for Block 3 as well as the HPG signal generated by Dit 12. Gate 965a produces a combined HPG signal that indicates whether or not there is a carry into Dit 13 of the intermediate sum. Gate 965a is illustrated in detail in FIG. 24. The block HPG output from gate 965a is passed to Level Four gate 997b. Similarly, gate 965b receives HPG03, HPG47, and HPG811. Gate 965b also receives from Level Two gate 962d the combined HPG signal for Dit 12 and Dit 13. Gate 965b then produces a combined HPG Signal that indicates whether or not there is a carry into Dit 14 of the intermediate sum. This output from gate 965b is passed to Level Four gate 997c. Similar block HPG processing is also performed in Gate 980a to combine the HPG03, HPG47, and HPG811 signals with the block HPG signal generated for Dits 12–14 by Level Two gate 961d. The block HPG output signal generated by Gate 980a is a combined HPG signal that indicates whether or not there is a carry into Dit 15 of the intermediate sum. The block HPG output from Gate 980a is passed to Level Four gate 998. Gate 980a also performs saturation determination logic that produces a 1-of-3 final saturation indicator. Details of this saturation determination logic are discussed below.

Regarding Level Three block HPG processing in Block 7, gate 965d receives as inputs the HPG1619 block HPG signal for Block 4, the HPG2023 block HPG signal for Block 5, and the HPG2427 block HPG signal for Block 6 as well as the HPG signal generated by Dit 28. Gate 965d produces a combined HPG signal that indicates whether or not there is a carry into Dit 29 of the intermediate sum. Gate 965d is illustrated in detail in FIG. 24. The block HPG output from gate 965d is passed to Level Four gate 99Gb. Similarly, gate 965e receives HPG1619, HPG2023, and HPG2427. Gate 965e also receives from Level Two gate 962h the combined HPG signal for Dit 28 and Dit 29. Gate 965e then produces a combined HPG Signal that indicates whether or not there is a carry into Dit 30 of the intermediate sum. This output from gate 965e is passed to Level Four gate 99Gc. Similar block HPG processing is also performed in Gate 980b to combine the HPG1619, HPG2023, and HPG2427 signals with the block HPG signal generated for Dits 28–30 by Level Two gate 961h. The block HPG output signal generated by Gate 980b is a combined HPG signal that indicates whether or not there is a carry into Dit 31 of the intermediate sum. The block HPG output from Gate 980b is passed to Level Four gate 99H. Gate 980b also performs saturation determination logic that produces a 1-of-3 final saturation indicator. Details of this saturation determination logic are discussed immediately below.

The saturation determination logic of Level Three is related to the concept of partitioning. For each potential partition, one dit will be the most significant dit for the partition. The most significant dit of a partition is referred to herein as a "header dit." For 8-bit partitioning, Dits 3, 7, 15, 19, 23, 27, and 31 serve as header dits. For 16-bit partitioning, Dits 7, 15, 23, and 31 serve as header dits. For 32-bit partitioning, Dits 15 and 31 serve as header dits. Although the present invention 101 does not support saturation for 64-bit partitioning, the header dit for a 64-bit partition is Dit 31.

Level Three combined block HPG/saturation detection gates 983a, 983b, 982a, 982b, 981a, 981b, 980a, and 980b all perform saturation detection logic as described above in the paragraphs detailing the operation of the Level Three logic gates. FIG. 14 illustrates that the final saturation indicator output signal from each of said gates is the final saturation indicator value for a header dit. FIG. 14 illustrates that the value of the final saturation indicator from each of said gates 983a, 983b, 982a, 982b, 981a, 981b, 980a, 980b is passed to the Level Four gates that process each dit within the header dit's partition grouping. For instance, FIG. 14 illustrates that gate 981a. passes the value of its final saturation indicator to Level Four gates 995a–995c and 996, which perform Level Four processing for dits within Block 2. Because Dit 11 can only act as a header dit for an 8-bit partition, Gate 981a does not pass the value of its final saturation indicator to the dits of less significant blocks. In contrast, Dit 15 can act as the header dit for an 8-bit, 16-bit, or 32-bit partition. FIG. 14 illustrates that Gate 980a therefore passes the value of its final saturation indicator to all Level Four gates comprising the lower half of the adder 101.

Level Four—Overview

The major function of Level Four logic is to formulate the final sum for each partition grouping, taking saturation into account. To do this, each Level Four gate must accomplish two different tasks. First, each Level Four gate must comprehend the pertinent saturation signal in a partition-specific manner. Second, in order to properly calculate the intermediate sum in cases where saturation is not necessary, the Level Four gate must process the relevant HPG input signals in order to add either zero or one to the value of the intermediate sum generated, in Level One, for each dit.

Level Four Logic Gates and Configuration

Figure 29:
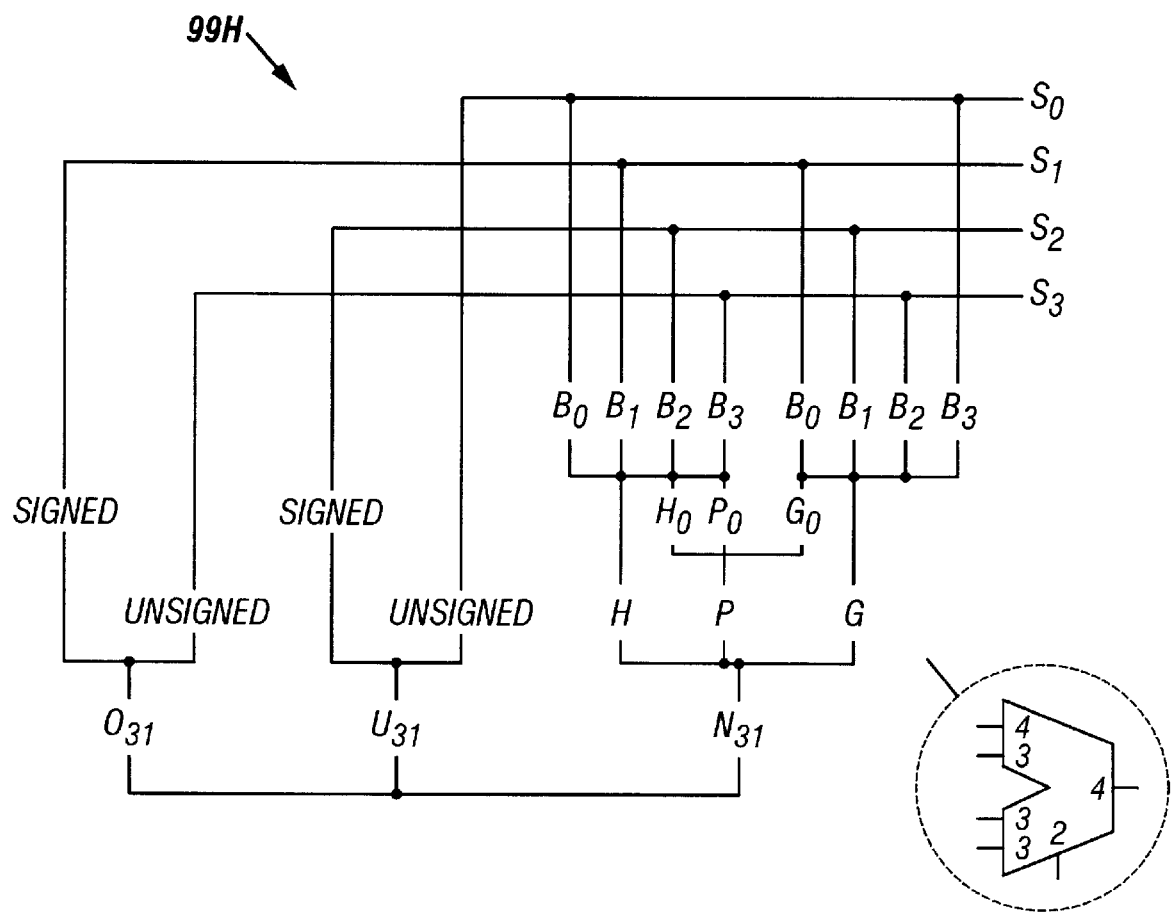
FIG. 29 is a shorthand representation of the Level Four gate for Dit 31.
Figure 30:
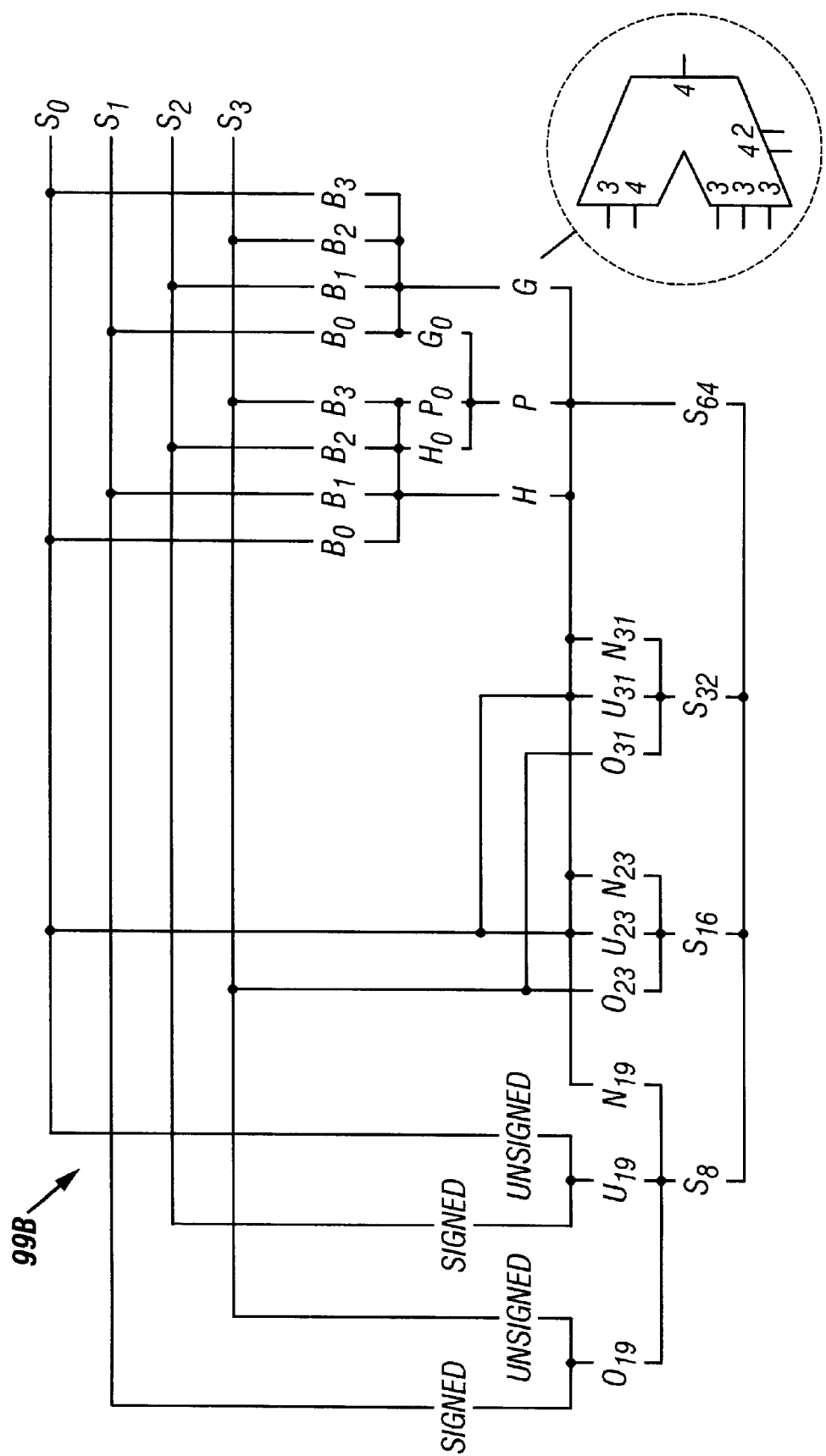
FIG. 30 is a shorthand representation of the Level Four gate for Dit 19.

FIGS. 29 and 30 illustrate representative Level Four gates 99H, 99B. Every Level Four gate resembles either Gate 99H or 99B, with some variations. One constant feature among all Level Four gates is the capability to determine whether, under non-saturation conditions, the intermediate sum for the particular dit of interest should be incremented. Each Level Four gate receives at least one, and up to two, HPG signals. Both FIGS. 29 and 30 illustrate this feature. If there is no saturation, then the value of the HPG signal(s) is considered. If a Halt signal is encountered, then the intermediate sum is not incremented; its unaltered value is simply asserted as the gate output. FIGS. 29 and 30 illustrate that, if a G signal is encountered, then the value of the intermediate sum is incremented by one. If a P signal is encountered in an upper-half Level Four gate, then the next level of HPG signals is examined. If both HPG input signals in an upper-half Level Four gate assert a P value, then the value of the intermediate sum is passed through as the output of the gate unaltered. Similarly, if the HPG signal in a lower-half Level Four gate asserts a P value, then the value of the intermediate sum is passed through as the output of the gate unaltered.

Aside from the sum-increment logic described above, the variations among Level Four gates may be considerable, but they are consistent. All Level Four gates may have one, two or three final saturation indicators as inputs. In addition, Level Four gates for all potential header dits must distinguish between signed and unsigned saturation in cases where they behave as the most-significant dit of a partition. All Level Four gates for dits that may act as header dits must therefore receive the 1-of-2 compressed signed/unsigned-none indicator from Level Three buffers 952i or 952j. In contrast, Level Four gates for dits that will never act as a header dit need not have circuitry to distinguish between signed and unsigned saturation. Also, Level Four gates may receive either one or two block-level HPG signals. Level Four gates for the lower half of the adder receive only one block-level HPG signal, while upper-half Level Four gates receive two signals: a block-level HPG signal generated by upper-half blocks of lesser significance, and the HPGO signal.

FIG. 29 illustrates the Level Four gate 99H that processes Dit 31. Regardless of partitioning, Dit 31 (as well as Dits 28 through 30) receive one saturation signal from Level Three. FIG. 14 illustrates that the Level Four gates 99G*a*–99G*c*, 99H for Block 7 all receive the final saturation indicator generated by Level Three gate 980b for Dit 31. This Dit 31 final saturation indicator is referred to FIG. 29 as OUN31. FIG. 29 illustrates that, if the "N" wire of OUN31 is asserted, then the final sum value for Dit 31 is formed by incrementing (or not) the intermediate sum value, depending on the values of the two block HPG signal inputs. This logic, discussed above, performs an increment if there has been a carry into the dit. FIG. 28 further illustrates that, if either overflow (O31 is asserted) or underflow (U31 is asserted) is indicated, then an additional input must be considered in order to determine whether signed or unsigned saturation is being performed. FIG. 28 indicates that this additional signal is the 1-of-2 compressed signed/unsigned-none signal that is passed to upper-half Level Four gates from Level Three buffer 952j. This compressed signal is required in the case of Dit 31 because Dit 31 behaves as a header dit regardless of partitioning. In contrast, this signal is not required as inputs into the Level Four gates for Dits 28–30, 99G*a*–99G*c* (these gates are not individually pictured), because Dits 28–30 will never function as header dits and therefore need not distinguish between signed and unsigned saturation. After the signed/unsigned distinction is made in a Level Four gate (if required), the appropriate constant saturation value is driven to the gate output. FIG. 29 illustrates that the output sum value for Dit 31 for signed overflow is a decimal value of one. FIG. 29 further illustrates that the Dit 31 sum values for unsigned overflow, signed underflow, and unsigned overflow are, respectively, decimal values of three, two, and zero.

Although not individually pictured, the foregoing discussion makes it clear that the Level Four gate 99G for Dits 30, 29, and 28 will resemble the gate 99H for Dit 31, with some variation. Like Gate 99H, Gate 99G also receives as inputs the HPGO signal as well as a block HPG signal indicating the carry status generated by all dits of lesser significance within the upper half of the adder 101. Regardless of partitioning, the Level Four gate for dits 28–30 99G need only consider the final saturation status for Dit 31. Gate 99G therefore only receives one final saturation indicator, OUN31. Because Dits 28 through 30 will never act as header dits, they need not consider the compressed signed/unsigned-none indicator. If neither underflow nor overflow has occurred (i.e., the N31 wire is asserted), then the gate 99G will determine the sum value by taking the HPG indicators into account and incrementing the sum value, if necessary, by one. If the U31 signal is asserted, the appropriate constant saturation value, zero, is driven to the gate 99G output. If the o31 signal is asserted, the appropriate constant saturation value, three, is driven to the gate 99G output. FIG. 30 illustrates a more complex Level Four gate 99B that is used to process Dit 19 within Block 4 of the intermediate sum. In contrast to the Block 7 Level Four gates 99G, 99H described above, the dit processed by Gate 99B, Dit 19, may have several different partition-dependent interpretations. Dit 19 may be the header dit of an 8-bit partition. Dit 19 may further be a dit of intermediate significance in a saturating 16-or 32-bit partition. Finally, Dit 19 may be a dit of intermediate significance in a nonsaturating 64-bit partition. In the first three cases, saturation information comes from the Level Three final saturation indicators for three distinct dits: Dit 19 for an 8-bit partition, Dit 23 for a 16-bit partition, and Dit 31 for a 32-bit partition. FIG. 30 illustrates that Gate 99B utilizes the S8/S16/S32/S64 partition size control signal to choose the appropriate final saturation indicator. FIG. 30 illustrates that the OUN23 input will be utilized if the S16 wire is asserted, that the OUN31 input will be utilized if the S32 wire is asserted, and the OUN19 input will be utilized in the S8 wire is asserted. FIG. 30 shows that, in the latter case, the signed/unsigned-none input must also be considered before determining the final output value of the gate 99B. In each case of 8-, 16-, or 32-bit partitioning, if the selected saturation signal indicates no saturation, the final sum is formed as described above, with the intermediate sum being incremented if a carry into the dit is indicated. If overflow is indicated for any situation where Dit 19 does not act as a header dit, then the appropriate constant saturation value, three, is driven to the gate 99B output. If underflow is indicated for such a situation, then the appropriate underflow saturation constant, zero, is driven to the gate 99B output. In contrast, if underflow or overflow is indicated for 8-bit partitioning, then the signed/unsigned-none indicator comes into play. For signed overflow, the value of the sum must reflect the saturation value of $2^{N-1}-1$. FIG. 30 illustrates that this result is effected by forcing the output of the partition MSD to a decimal value of one when S8, O19, and "signed" are all asserted. By the same token, for signed underflow, the value of the sum must reflect the saturation value of $-2^{N-1}$. FIG. 30 illustrates that this result is effected by forcing the output of the partition MSD to a decimal value of two when S16, U19, and "signed" are all asserted. For unsigned overflow and underflow, the usual constants of zero (for underflow) and three (for overflow) are asserted as the output values of the gates 99B.

For each dit of the intermediate sum, Level Four must determine which final saturation indicator, if any, is relevant. As discussed above, each Level Four gate receives multiple final saturation indicator values; that is, each Level Four gate receives a final saturation indicator from each more significant block within the half of the adder (upper vs. lower) in which the gate lies. Using the value of the partition size control indicator, the Level Four gates may determine which saturation signal is relevant.

From the foregoing discussion, it becomes apparent that the gate 99A that processes Dit 18 and Dit 19 are similar to gate 99B, with slight variation. Because neither Dit 18 nor 19 can act as a header dit, the signed/unsigned-none indicator is not relevant. Instead, for any partition grouping, the common sum-increment logic will be performed if the S64 wire is asserted and also if any of the other partition size wires are asserted along with the N wire of the relevant final saturation indicator for that asserted partition size. In the case of overflow or underflow for any partition size, the value of zero will be asserted for an underflow and a value of three will be asserted for an overflow.

FIG. 14 illustrates that the Dit 16 Level Four gate 999 has another slight variation that distinguishes it from Block 4 Level Four Gate 99A as well as from Gate 99A. This variation stems from the fact that Dit 16 is the LSD for the upper half of the adder 101. For this reason, Dit 16 receives only one block HPG signal, HPGO. This allows gate 999 to consider only one HPG signal during sum-increment logic.

The foregoing discussion permits one to understand the operation of the various Level Four gates not pictured: 990–998, 99C–99F. Certain features of these gates are set forth in Table 14 below. In Table 14, the "Gate" column identifies the Level Four gate of interest as it is labeled in FIG. 14. The "Dit(s)" column identifies the dit(s) of the intermediate sum that are processed by that particular gate. The "Header" column indicates the partition size(s), if any, for which the dit of interest acts as a header dit. The "#HPG" column identifies how many HPG block inputs are received by the gate of interest. The "Partition/Final Sat. Ind." sets forth: all partition sizes for which the dit of interest may act as an intermediate dit, and which header dit's final saturation indicator is used within the gate for each of said partition sizes. Partition sizes within this column that contain asterisks beside them indicate the partition sizes for which the dit of interest may act as a header dit. These asterisks indicate that the gate must use the signed/unsigned-none indicator to determine the final output when that partition size is selected. Table 14 illustrates that, as discussed above, Gates 998 and 99H need not receive the partition size control input because Dit 15 and Dit 31 acts as only as a header dit, for purposes of saturation, regardless of partition size. (Of course, the final saturation indicator will be ignored if 64-bit partition size is selected, since the present invention 101 does not provide saturation capability for a 64-bit partition).

TABLE 14

| Gate | Dit(s) | Header | # HPG | Partition/Final Sat. Ind. | |
|---|---|---|---|---|---|
| 990 | 0 | None | None | 8-bit | Dit 3 |
|  |  |  |  | 16-bit | Dit 7 |
|  |  |  |  | 32-bit | Dit 15 |
| 991 | 1,2 | None | One | 8-bit | Dit 3 |
|  |  |  |  | 16-bit | Dit 7 |
|  |  |  |  | 32-bit | Dit 15 |
| 992 | 3 | 8-bit | One | 8-bit* | Dit 3 |
|  |  |  |  | 16-bit | Dit 7 |
|  |  |  |  | 32-bit | Dit 15 |
| 993 | 4,5,6 | None | One | 8-bit | Dit 7 |
|  |  |  |  | 16-bit | Dit 7 |
|  |  |  |  | 32-bit | Dit 15 |
| 994 | 7 | 8-bit or 16-bit | One | 8-bit* | Dit 7 |
|  |  |  |  | 16-bit* | Dit 7 |
|  |  |  |  | 32-bit | Dit 15 |
| 995 | 8,9,10 | None | One | 8-bit | Dit 11 |
|  |  |  |  | 16-bit | Dit 15 |
|  |  |  |  | 32-bit | Dit 15 |

TABLE 14-continued

| Gate | Dit(s) | Header | # HPG | Partition/Final Sat. Ind. | |
|---|---|---|---|---|---|
| 996 | 11 | 8-bit | One | 8-bit* | Dit 11 |
|  |  |  |  | 16-bit | Dit 15 |
|  |  |  |  | 32-bit | Dit 15 |
| 997 | 12,13, 14 | None | One | No partition size input necessary - all partition sizes use Dit 15 Final Saturation Indicator | |
| 998 | 15 | 8-bit or 16-bit or 32-bit | One | No partition size input necessary - all partition sizes* use Dit 15 Final Saturation Indicator | |
| 999 | 16 | None | HPG0 only | 8-bit | Dit 19 |
|  |  |  |  | 16-bit | Dit 23 |
|  |  |  |  | 32-bit | Dit 31 |
| 99A | 17,18 | None | Two - HPG0 plus another | 8-bit | Dit 19 |
|  |  |  |  | 16-bit | Dit 23 |
|  |  |  |  | 32-bit | Dit 31 |
| 99B | 19 | 8-bit | Two - HPG0 plus another | 8-bit* | Dit 19 |
|  |  |  |  | 16-bit | Dit 23 |
|  |  |  |  | 32-bit | Dit 31 |
| 99C | 20,21, 22 | None | Two - HPG0 plus another | 8-bit | Dit 23 |
|  |  |  |  | 16-bit | Dit 23 |
|  |  |  |  | 32-bit | Dit 31 |
| 99D | 23 | 8-bit or 16-bit | Two - HPG0 plus another | 8-bit* | Dit 23 |
|  |  |  |  | 16-bit* | Dit 23 |
|  |  |  |  | 32-bit | Dit 31 |
| 99E | 24,25, 26 | None | Two - HPG0 plus another | 8-bit | Dit 27 |
|  |  |  |  | 16-bit | Dit 31 |
|  |  |  |  | 32-bit | Dit 31 |
| 99F | 27 | 8-bit | Two - HPG0 plus another | 8-bit* | Dit 27 |
|  |  |  |  | 16-bit | Dit 31 |
|  |  |  |  | 32-bit | Dit 31 |
| 99G | 28,29, 30 | None | Two - HPG0 plus another | No partition size input necessary - all partition sizes use Dit 31 Final Saturation Indicator | |
| 99H | 31 | 8-bit or 16-bit or 32-bit or 64-bit | Two - HPG0 plus another | No partition size input necessary - all partition sizes* use Dit 31 Final Saturation Indicator | |

In sum, the Level Four gates all perform sum-increment logic. In order to perform such logic, each Level Four gate receives at least one HPG signal. Except, that is, Gate 990 does not receive an HPG signal because there is never a carry into the LSD that it processes. Each Level Four gate also performs some variant of saturation logic. All dits except those that lie in the MSD for each half must determine which header dit's final saturation indicator input should be utilized. To do this, each Level Four gate receives the S/8/S16/S32/S64 partition size control indicator. Except, that is, for Gates 997, 998, 99G, and 99H. Said gates 997, 998, 99G, and 99H only receive one final saturation indicator and therefore do not need to utilize the partition size control indicator to determine which saturation indicator to use.

To summarize the present invention 101, this application discloses an adder/subtractor in four logic levels. The first logic level performs preliminary sum or difference logic, depending on the value of the ADD/SUB input. The preliminary sum or difference for each dit calculated by Level One is stored in buffers in Level Two and Level Three. At Level Four, the preliminary sum for each dit is incremented by one if there is a carry into the dit. In order to allow Level Four to determine whether there is a carry into each dit, Levels Two and Three perform carry look-ahead logic that generates block HPG signals. Level Two generates a dit-level block HPG signal indicating the carry status generated by each dit of lesser significance within the block in which the dit of interest lies. Level Two also generates a block-level HPG signal for each of Block 0 through Block 6. Level Three combines the block-level HPG signals generated for Block 0 though Block 4 in order to produce a block HPG signal, HPG0, for the lower half of the adder. Level Three also combines the dit-level HPG signals with the block-level HPG signals for blocks of lesser significance in order to calculate one final HPG signal for each dit that indicates the carry status generated by all less significant dits within the half of the adder in which the dit of interest lies.

In addition to the block HPG processing discussed above, Level Two also performs preliminary saturation detection logic. To do this, Level Two preliminary saturation detection gates inspect the value of the intermediate sum for the MSD for each block. Given this sum, and the value of the B operand that was used by Level One to generate the sum, Level Two derives a 1-of-5 preliminary saturation indicator that indicates whether an underflow or overflow will definitely occur, will definitely not occur, or might occur. Level Three then uses this preliminary saturation indicator, along with the final HPG indicator for the MSD of each block, to determine whether saturation logic is necessary. The final saturation indicator calculated for the MSD of each block is passed by the Level Three gate for each header dit down to all dits of lesser significance within the header dit's partition grouping.

Using the intermediate sums from Level One and the final saturation indicators from Level Three, the Level Four gates either perform sum-increment logic to increment the value of the intermediate sum when there is a carry into the dit and the result is not saturated, or deliver a constant saturation output value if the result should be saturated due to an underflow or overflow.

Other embodiments of the invention will be apparent to those skilled in the art after considering this specification or practicing the disclosed invention. The specification and examples above are exemplary only, with the true scope of the invention being indicated by the following claims.

We claim:

1. An apparatus that performs an arithmetic operation, comprising:

first and second operands, wherein each said operand comprises a plurality of dits that comprise two bits, a plurality of blocks that comprise 4 dits, wherein each said block has a most significant dit (MSD), and at least one partition that comprises one of the following: an 8-bit group, a 16-bit group, a 32-bit group, or a 64-bit group;

a first plurality of N-NARY logic circuits that perform an arithmetic operation that produces an intermediate sum of said operands or difference between said operands, wherein said intermediate sum or difference further comprises a plurality of 4-dit blocks wherein each said block has a MSD, and at least one said partition, said first plurality of N-NARY logic circuits also comprises dit-level and block-level carry propagate logic;

a second plurality of N-NARY logic circuits that produce a plurality of block-level 1-of-N preliminary saturation signals where N=5 that indicate whether a contingent or definite block-level overflow or underflow will occur, each said block-level 1-of-N preliminary saturation signal corresponds to one said block of said intermediate sum;

a third plurality of N-NARY logic circuits that resolve contingent block-level underflows and contingent block-level overflows determined by said second plurality of N-NARY logic circuits and produce a plurality of 1-of-N final saturation signals where N=3 that indicates whether a definite block-level overflow or underflow will occur; and a fourth plurality of N-NARY logic circuits that receive said intermediate sum or difference and one or more said final saturation signals and produce a final sum, difference, constant saturation value for signed or unsigned operation overflows, or constant saturation value for signed or unsigned operation underflows.

2. The apparatus of claim 1, further comprising a partition control indicator input that indicates the size of said partitions of said first and second operands, wherein the value of said partition control indicator input further controls which one, if any, of said final saturation signals is used to produce said final sum, difference, constant saturation value for signed or unsigned operation overflows, or constant saturation value for signed or unsigned operation underflows.

3. The apparatus of claim 1, wherein said arithmetic operation further comprises signed addition, and the value of each said 1-of-N preliminary saturation signal corresponding to a block of said intermediate sum and said second operand is as follows: definite block-level overflow when the intermediate sum block MSD=2 and the second operand block MSD=1, contingent block-level overflow when the intermediate sum block MSD=1 and the second operand block MSD=0 or 1, definite block-level underflow when the intermediate sum block MSD=0 and the second operand block MSD=2, contingent block-level underflow when the intermediate sum block MSD=1 and the second operand block MSD=2 or 3, and no underflow or overflow for all other values of the intermediate sum and second operand block MSDs.

4. The apparatus of claim 1, wherein said arithmetic operation further comprises signed subtraction, said first operand further comprises the subtrahend and said second operand further comprises the minuend, and the value of each said 1-of-N preliminary saturation signal corresponding to a block of said intermediate difference is as follows: definite block-level overflow when minuend block MSD=1 and subtrahend block MSD=2, contingent block-level overflow when either minuend block MSD=0 and subtrahend block MSD=2 or minuend block MSD=1 and subtrahend block MSD=3, definite block-level underflow when minuend block MSD=2 and subtrahend block MSD=1, contingent block-level underflow when either minuend block MSD=3 and subtrahend block MSD=1 or minuend block MSD=2 and subtrahend block MSD=0, and no underflow or overflow for all other values of the block MSD of both operands.

5. The apparatus of claim 1, wherein said arithmetic operation further comprises unsigned addition, and the value of each said 1-of-N preliminary saturation signal corresponding to a block of both said operands is as follows: definite block-level overflow when the sum of the block MSD of both said operands $\geq 4$, contingent block-level overflow when the sum of the block MSD of both said operands=3, and no underflow or overflow for all other values of the sum of the block MSD of both said operands.

6. The apparatus of claim 1, wherein said arithmetic operation further comprises unsigned subtraction, said first operand further comprises the subtrahend and said second operand further comprises the minuend, and the value of each said 1-of-N preliminary saturation signal corresponding to a block of both said operands is as follows: definite block-level underflow when the difference between the minuend block MSD and subtrahend block MSD $\leq -1$, contingent block-level underflow when the block MSD of both said operands is identical, and no underflow or overflow for all other values of the block MSD of both operands.

7. The apparatus of claim 1, wherein each said contingent block-level underflow and overflow is resolved as follows:

carry generated at or propagated into the block MSD: contingent overflow=definite overflow and contingent underflow =no overflow or underflow; or no carry generated at or propagated into the block MSD: contingent overflow=no overflow or underflow and contingent underflow=definite underflow.

8. A system that performs an arithmetic operation, comprising:

first and second operands, wherein each said operand comprises a plurality of dits that comprise two bits, a plurality of blocks that comprise 4 dits wherein each said block has a most significant dit (MSD), and at least one partition that comprises one of the following: an 8-bit group, a 16-bit group, a 32-bit group, or a 64-bit group;

a first plurality of N-NARY logic circuits that performs an arithmetic operation and produces an intermediate sum of said operands or difference between said operands, wherein said intermediate sum or difference further comprises a plurality of 4-dit blocks wherein each said block has a most significant dit (MSD), and at least one said partition, said first plurality of N-NARY logic circuits also comprises dit-level and block-level carrypropagate logic;

a second plurality of N-NARY logic circuits comprising preliminary saturation detection logic that produces a plurality of block-level 1-of-N preliminary saturation signals where N =5 that indicates whether a contingent or definite block-level overflow or underflow will occur, each said block-level 1-of-N preliminary saturation signal corresponds to one said block of said first and second operands;

a third plurality of N-NARY logic circuits that resolves contingent block-level underflows and contingent block-level overflows determined by said preliminary saturation logic and produces a plurality of 1-of-N final saturation signals where N=3 that indicate whether a definite block-level overflow or underflow will occur; and a fourth plurality of N-NARY logic circuits that receives said intermediate sum or difference and one or more said final saturation signals and produces a final sum, difference, constant saturation value for signed or unsigned operation overflows, or constant saturation value for signed or unsigned operation underflows.

9. The system of claim 8, further comprising a partition control indicator input that indicates the size of said partitions of said first and second operands, wherein the value of said partition control indicator input further controls which one, if any, of said final saturation signals is used to produce said final sum, difference, constant saturation value for signed or unsigned operation overflows, or constant saturation value for signed or unsigned operation underflows.

10. The system of claim 8, wherein said arithmetic operation further comprises signed addition, and the value of each said 1-of-N preliminary saturation signal corresponding to a block of said intermediate sum and said second operand is as follows: definite block-level overflow when the intermediate sum block MSD=2 and the second operand block MSD=1, contingent block-level overflow when the intermediate sum block MSD=1 and the second operand block MSD=0 or 1, definite block-level underflow when the intermediate sum block MSD=0 and the second operand block MSD=2, contingent block-level underflow when the intermediate sum block MSD=1 and the second operand block MSD=2 or 3, and no underflow or overflow for all other values of the intermediate sum and second operand block MSDs.

11. The system of claim 8, wherein said arithmetic operation further comprises signed subtraction, said first operand further comprises the subtrahend and said second operand further comprises the minuend, and the value of each said 1-of-N preliminary saturation signal corresponding to a block of said intermediate difference is as follows: definite block-level overflow when minuend block MSD=1 and subtrahend block MSD=2, contingent block-level overflow when either minuend block MSD=0 and subtrahend block MSD=2 or minuend block MSD=1 and subtrahend block MSD=3, definite block-level underflow when minuend block MSD=2 and subtrahend block MSD=1, contingent block-level underflow when either minuend block MSD=3 and subtrahend block MSD=1 or minuend block MSD=2 and subtrahend block MSD=0, and no underflow or overflow for all other values of the block MSD of both operands.

12. The system of claim 8, wherein said arithmetic operation further comprises unsigned addition, and the value of each said 1-of-N preliminary saturation signal corresponding to a block of both said operands is as follows: definite block-level overflow when the sum of the block MSD of both said operands $\geq 4$, contingent block-level overflow when the sum of the block MSD of both said operands=3, and no underflow or overflow for all other values of the sum of the block MSD of both said operands.

13. The system of claim 8, wherein said arithmetic operation further comprises unsigned subtraction, said first operand further comprises the subtrahend and said second operand further comprises the minuend, and the value of each said 1-of-N preliminary saturation signal corresponding to a block of both said operands is as follows: definite block-level underflow when the difference between the minuend block MSD and subtrahend block MSD$\leq -1$, contingent block-level underflow when the block MSD of both said operands is identical, and no underflow or overflow for all other values of the block MSD of both operands.

14. The system of claim 8, wherein each said contingent block-level underflow and overflow is resolved as follows:
carry generated at or propagated into the block MSD: contingent overflow=definite overflow and contingent underflow=no overflow or underflow; or no carry generated at or propagated into the block MSD: contingent overflow=no overflow or underflow and contingent underflow=definite underflow.

15. A method that makes an apparatus that performs an arithmetic operation, comprising:
providing first and second operands, wherein each said operand comprises a plurality of dits that comprise two bits, a plurality of blocks that comprise 4 dits wherein each said block has a most significant dit (MSD), and at least one partition that comprises one of the following: an 8-bit group, a 16-bit group, a 32-bit group, or a 64-bit group;
providing a first plurality of N-NARY logic circuits that performs an arithmetic operation and produces an intermediate sum of said operands or difference between said operands, wherein said intermediate sum or difference further comprises a plurality of 4-dit blocks wherein each said block has a most significant dit (MSD), and at least one said partition, said first plurality of N-Nary logic circuits also comprises dit-level and block-level carrypropagate logic;
providing a second plurality of N-NARY logic circuits comprising preliminary saturation detection logic that produces a plurality of block-level 1-of-N preliminary saturation signals where N =5 that indicates whether a contingent or definite block-level overflow or underflow will occur, each said block-level 1-of-N preliminary saturation signal corresponds to one said block of said first and second operands;
providing a third plurality of N-NARY logic circuits that resolves block-level contingent underflows and contingent block-level overflows determined by said preliminary saturation logic and produces a plurality of 1-of-N final saturation signals where N=3 that indicate whether a definite block-level overflow or underflow will occur; and
providing a fourth plurality of N-NARY logic circuits that receives said intermediate sum or difference and one or more said final saturation signals and produces a final sum, difference, constant saturation value for signed or unsigned operation overflows, or constant saturation value for signed or unsigned operation underflows.

16. The method of claim 15, further comprising providing a partition control indicator input that indicates the size of said partitions of said first and second operands, wherein the value of said partition control indicator input further controls which one, if any, of said final saturation signals is used to produce said final sum, difference, constant saturation value for signed or unsigned operation overflows, or constant saturation value for signed or unsigned operation underflows.

17. The method of claim 15, wherein said arithmetic operation further comprises signed addition, and the value of each said 1-of-N preliminary saturation signal corresponding to a block of said intermediate sum and said second operand is as follows: definite block-level overflow when the intermediate sum block MSD=2 and the second operand block MSD=1, contingent block-level overflow when the intermediate sum block MSD=1 and the second operand block MSD=0 or 1, definite block-level underflow when the intermediate sum block MSD=0 and the second operand block MSD=2, contingent block-level underflow when the intermediate sum block MSD=1 and the second operand block MSD=2 or 3, and no underflow or overflow for all other values of the intermediate sum and second operand block MSDs.

18. The method of claim 15, wherein said arithmetic operation further comprises signed subtraction, said first operand further comprises the subtrahend and said second operand further comprises the minuend, and the value of each said 1-of-N preliminary saturation signal corresponding to a block of said intermediate difference is as follows: definite block-level overflow when minuend block MSD=1 and subtrahend block MSD=2, contingent block-level overflow when either minuend block MSD=0 and subtrahend block MSD=2 or minuend block MSD=1 and subtrahend block MSD 3, definite block-level underflow when minuend block MSD=2 and subtrahend block MSD=1, contingent block-level underflow when either minuend block MSD=3 and subtrahend block MSD=1 or minuend block MSD=2 and subtrahend block MSD=0, and no underflow or overflow for all other values of the block MSD of both operands.

19. The method of claim 15, wherein said arithmetic operation further comprises unsigned addition, and the value of each said 1-of-N preliminary saturation signal corresponding to a block of both said operands is as follows: definite block-level overflow when the sum of the block MSD of both said operands $\geq 4$, contingent block-level overflow when the sum of the block MSD of both said operands =3, and no underflow or overflow for all other values of the sum of the block MSD of both said operands.

20. The method of claim 15, wherein said arithmetic operation further comprises unsigned subtraction, said first operand further comprises the subtrahend and said second operand further comprises the minuend, and the value of each said 1-of-N preliminary saturation signal corresponding to a block of both said operands is as follows: definite block-level underflow when the difference between the minuend block MSD and subtrahend block MSD≦−1, contingent block-level underflow when the block MSD of both said operands is identical, and no underflow or overflow for all other values of the block MSD of both operands.

21. The method of claim 15, wherein each said contingent block-level underflow and overflow is resolved as follows:

carry generated at or propagated into the block MSD: contingent overflow=definite overflow and contingent underflow=no overflow or underflow; or no carry generated at or propagated into the block MSD: contingent overflow=no overflow or underflow and contingent underflow =definite underflow.

22. A method that performs an arithmetic operation, comprising:

providing first and second operands, wherein each said operand comprises a plurality of dits that comprise two bits, a plurality of blocks that comprise 4 dits wherein each said block has a most significant dit (MSD), and at least one partition that comprises one of the following: an 8-bit group, a 16-bit group, a 32-bit group, or a 64-bit group;

performing an arithmetic operation to produce an intermediate sum of said operands or difference between said operands, wherein said intermediate sum or difference further comprises a plurality of 4-dit blocks wherein each said block has a most significant dit (MSD), and at least one said partition, said arithmetic operation includes determining dit-level and block-level carry propagate information;

detecting block-level preliminary saturation status and producing a plurality of block-level 1-of-N preliminary saturation signals where N=5 that indicates whether a contingent or definite block-level overflow or underflow will occur, each said block-level 1-of-N preliminary saturation signal corresponds to one said block of said first and second operands;

resolving contingent block-level underflows and contingent block-level overflows and producing a plurality of 1-of-N final saturation signals where N=3 that indicate whether a definite block-level overflow or underflow will occur; and producing a final sum, difference, constant saturation value for signed or unsigned operation overflows, or constant saturation value for signed or unsigned operation underflows using said intermediate sum or difference and one or more said final saturation signals.

23. The method of claim 22, further comprising indicating the size of said partitions of said first and second operands using a partition control indicator input, wherein the value of said partition control indicator input further controls which one, if any, of said final saturation signals is used to produce said final sum, difference, constant saturation value for signed or unsigned operation overflows, or constant saturation value for signed or unsigned operation underflows.

24. The method of claim 22, wherein said arithmetic operation further comprises signed addition, and the value of each said 1-of-N preliminary saturation signal corresponding to a block of said intermediate sum and said second operand is as follows: definite block-level overflow when the intermediate sum block MSD=2 and the second operand block MSD=1, contingent block-level overflow when the intermediate sum block MSD=1 and the second operand block MSD=0 or 1, definite block-level underflow when the intermediate sum block MSD=0 and the second operand block MSD=2, contingent block-level underflow when the intermediate sum block MSD=1 and the second operand block MSD=2 or 3, and no underflow or overflow for all other values of the intermediate sum and second operand block MSDs.

25. The method of claim 22, wherein said arithmetic operation further comprises signed subtraction, said first operand further comprises the subtrahend and said second operand further comprises the minuend,and the value of each said 1-of-N preliminary saturation signal corresponding to a block of said intermediate difference is as follows: definite block-level overflow when minuend block MSD=1 and subtrahend block MSD=2, contingent block-level overflow when either minuend block MSD=0 and subtrahend block MSD=2 or minuend block MSD=1 and subtrahend block MSD=3, definite block-level underflow when minuend block MSD=2 and subtrahend block MSD=1, contingent block-level underflow when either minuend block MSD=3 and subtrahend block MSD=1 or minuend block MSD=2 and subtrahend block MSD=0, and no underflow or overflow for all other values of the block MSD of both operands.

26. The method of claim 22, wherein said arithmetic operation further comprises unsigned addition, and the value of each said 1-of-N preliminary saturation signal corresponding to a block of both said operands is as follows: definite block-level overflow when the sum of the block MSD of both said operands≧4, contingent block-level overflow when the sum of the block MSD of both said operands= 3, and no underflow or overflow for all other values of the sum of the block MSD of both said operands.

27. The method of claim 22, wherein said arithmetic operation further comprises unsigned subtraction, said first operand further comprises the subtrahend and said second operand further comprises the minuend, and the value of each said 1-of-N preliminary saturation signal corresponding to a block of both said operands is as follows: definite block-level underflow when the difference between the minuend block MSD and subtrahend block MSD≦−1, contingent block-level underflow when the block MSD of both said operands is identical, and no underflow or overflow for all other values of the block MSD of both operands.

28. The method of claim 22, wherein each said contingent block-level underflow and overflow is resolved as follows:

carry generated at or propagated into the block MSD: contingent overflow=definite overflow and contingent underflow=no overflow or underflow; or no carry generated at or propagated into the block MSD: contingent overflow=no overflow or underflow and contingent underflow=definite underflow.

* * * * *